(12) United States Patent
Winkeler, III et al.

(10) Patent No.: US 7,277,971 B2
(45) Date of Patent: Oct. 2, 2007

(54) METHOD AND APPARATUS FOR COMMUNICATING DATA OVER A BUS ACCORDING TO REDEFINABLE CONFIGURATIONS

(75) Inventors: Albert F. Winkeler, III, St. Peters, MO (US); Kirk D. Ellett, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 553 days.

(21) Appl. No.: 10/609,215

(22) Filed: Jun. 26, 2003

(65) Prior Publication Data
US 2007/0192521 A1    Aug. 16, 2007

(51) Int. Cl.
*G06F 13/00*     (2006.01)
*H04J 15/00*     (2006.01)

(52) U.S. Cl. ............... 710/104; 710/300; 710/301; 370/464

(58) Field of Classification Search .......... 710/10–11, 710/22, 104–106, 300–301; 370/464
See application file for complete search history.

(56) References Cited

U.S. PATENT DOCUMENTS

| | | | | |
|---|---|---|---|---|
| 4,443,850 A | * | 4/1984 | Harris | 710/23 |
| 4,837,677 A | * | 6/1989 | Burrus et al. | 710/308 |
| 6,222,537 B1 | * | 4/2001 | Smith et al. | 715/762 |
| 6,938,118 B1 | * | 8/2005 | Blixt et al. | 711/105 |
| 6,996,638 B2 | * | 2/2006 | Brice et al. | 710/36 |
| 2002/0055834 A1 | * | 5/2002 | Andrade et al. | 703/27 |
| 2003/0145129 A1 | * | 7/2003 | Nagalkar | 709/321 |
| 2004/0093438 A1 | * | 5/2004 | Odom | 710/22 |

OTHER PUBLICATIONS

"Microsoft Press Computer Dictionary". Second Edition. Microsoft Press. 1994. p. 404. ISBN 1-55615-597-2.*
'Versa Module Europa'. "The Free On-Line Dictionary of Computing". Online Mar. 10, 1997. Retrieved from Internet Jan. 10, 2007. <http://foldoc.orgh/index.cgi?Versa+Module+Europa>.*
'VMEbus'. "The Free On-Line Dictionary of Computing". Online Jun. 1, 1995. Retrieved from Internet Jan. 10, 2007. <http://foldoc.orgh/index.cgi?VMEbus>.*

* cited by examiner

*Primary Examiner*—Mark H. Rinehart
*Assistant Examiner*—Thomas J. Cleary
(74) *Attorney, Agent, or Firm*—Harness, Dickey & Pierce, P.L.C.

(57) ABSTRACT

A data processing apparatus comprising: (1) a plurality of data processing boards; (2) a bus connecting the boards with each other; and wherein each board comprises a communication utility for communicating data over the bus to another board through a plurality of channels, and wherein at least one of the channels has a user-redefinable configuration. For enhancing the user-definability of the apparatus, it is preferred that a user interface is provided through which the user can define one or more communication parameters.

49 Claims, 54 Drawing Sheets

| Return Value: | Routine Name: | Arguments: | Description: |
|---|---|---|---|
| char* | vcuAllocateBuffer(.) | int channel | Allocates a buffer with proper caching properties, sized for the specified channel |
| unsigned int | vcuClearErrno(.) | none | Returns the first recorded VCU error # and clears it from the error system |
| void | vcuCommInit(.) | none | Starts the VCU service |
| void | vcuCommHalt(.) | none | Forcefully halts all VCU-related tasks |
| int | vcuDataSize(.) | int channel | Returns the maximum message size, in bytes, for the specified channel |
| unsigned int | vcuErrno(.) | none | Returns the first recorded VCU error # |
| int | vcuFree(.) | int channel, const char *data | Marks the specified memory location in the socket Rx memory pool as usable (see detailed description) |
| void | vcuFreeBuffer(.) | int channel, char *buffer | Frees a buffer allocated with the vcuAllocateBuffer(.) routine |
| int | vcuHasPushQueueMessage(.) | int channel | Returns the number of messages in the push queue for the specified channel |
| int | vcuHasRxQueueMessage(.) | int channel | Returns the number of messages queued for the specified channel |
| int | vcuIfaceHasRxDataQueueMessage(.) | none | Returns the number of vcuRecv(.) replies queued |
| int | vcuIfaceHasRxRqstQueueMessage(.) | none | Returns the number of vcuRecv(.) calls queued |
| int | vcuIfaceHasTxQueueMessage(.) | none | Returns the number of vcuSend(.) calls queued |
| int | vcuIfaceHasTxReplyQueueMessage(.) | none | Returns the number of vcuSend(.) replies queued (used for push configs) |
| int | vcuIfaceHasTxStatusQueueMessage(.) | none | Returns the number of vcuSend(.) status messages queued |
| int | vcuIsMemPairPoolEmpty(.) | none | Returns 0 if the mem pair pool (used for push configs) is not empty and a non-zero value if it is empty |
| int | vcuIsRxPoolEmpty(.) | int channel | Returns 0 if the receive pool for the specified channel is not empty and a non-zero value if it is empty |

Figure 3(a)

| Return Value: | Routine Name: | Arguments: | Description: |
|---|---|---|---|
| int | vcuIsTxPoolEmpty | int channel | Returns 0 if the transmit pool for the specified channel is not empty and a non-zero value if it is empty |
| int | vcuPing(.) | int destination | Checks that a remote board is reachable via VCU. If more than one bit is set, a table is printed |
| void | vcuPrintChannelInfo(.) | int channel | Prints out the configuration information for the specified channel. If the argument is 0 (default), a table is printed |
| void | vcuPrintDebug(.) | int debugLevel | Triggers a printout of debugging data |
| int | vcuQueryForConfig(.) | int channel | Returns the configuration of the channel for internal VCU use (defined in vcuDefines.h) |
| unsigned int | vcuRecentErrno(.) | none | Returns the last recorded VCU error number |
| int | vcuRecv(.) | See Detailed Description | See Detailed Description |
| int | vcuRequestErrno(.) | int destination | Receives the VCU error # from a remote board. If more than one bit is set, a table is printed |
| int | vcuRequestTestPattern(.) | int destination, int channel, int msgSize | Requests a remote board to send a pre-defined test pattern of a requested size, and prints out success or error of delivery |
| int | vcuSend(.) | See Detailed Description | See Detailed Description |

Figure 3(b)

| Debug Level: | Description: |
|---|---|
| 1 | Prints out the use status of all Rx memory pools |
| 2 | Prints out the use status of all Tx memory pools |
| 3 | Prints out the use status of all Rx and Tx memory pools |
| 4 | Prints out detailed information about each slot of all Rx memory pools |
| 5 | Prints out detailed information about each slot of all Tx memory pools |
| 6 | Prints out detailed information about each slot of all Rx and Tx memory pools |
| 7 | Prints out the status of all Rx queues |
| 8 | Prints out the status of all push queues |
| 9 | Prints out detailed information about each slot of memPair memory pool |
| 101 | Prints out internal timing information if the system has been instrumented for timing |

Figure 4

| Configuration Type: | Sender Side: | Receiver Side: |
|---|---|---|
| Copy on Send | while(RUNNING){<br>  vcuSend(dest, chan, data, size);<br>} | while(RUNNING){<br>  vcuRecv(chan, pAddr, size);<br>  //Handle message at pAddr<br>  //(size in bytes length)<br>  vcuFree(chan, pAddr);<br>} |
| Copy to Pool on Receive | while(RUNNING){<br>  vcuSend(dest, chan, data, size);<br>} | while(RUNNING){<br>  vcuRecv(chan, pAddr, size);<br>  //Handle message at pAddr<br>  //(size in bytes length)<br>  vcuFree(chan, pAddr);<br>} |
| Copy to Buffer on Receive | while(RUNNING){<br>  vcuSend(dest, chan, data, size);<br>} | buf = vcuAllocateBuffer(chan)<br>while(RUNNING){<br>  vcuRecv(chan, buf, size);<br>  vcuFree(chan, buf);<br>}<br>vcuFreeBuffer(chan, buf); |
| Push to Pool on Receive | int pAddr = 0x0<br>int id = UNIQUE_VALUE<br>while(RUNNING){<br>  vcuSend(dest, chan, data, size, pAddr, id);<br>} | while(RUNNING){<br>  vcuRecv(chan, pAddr, size);<br>  //Handle message at pAddr<br>  //(size in bytes length)<br>  vcuFree(chan, pAddr);<br>} |
| Push to Buffer on Receive | int pAddr = 0x0<br>int id = UNIQUE_VALUE<br>while(RUNNING){<br>  vcuSend(dest, chan, data, size, pAddr, id);<br>  //Changes in pAddr indicated when data<br>  //was read<br>} | buf = vcuAllocateBuffer(chan)<br>while(RUNNING){<br>  vcuRecv(chan, buf, size);<br>  vcuFree(chan, buf);<br>}<br>vcuFreeBuffer(chan, buf); |
| Queue on Send | while(RUNNING){<br>  vcuSend(dest, chan, data, size);<br>} | buf = vcuAllocateBuffer(chan)<br>while(RUNNING){<br>  vcuRecv(chan, buf, size);<br>  vcuFree(chan, buf);<br>}<br>vcuFreeBuffer(chan, buf); |
| Copy to Self | while(RUNNING){<br>  vcuSend(dest, chan, data, size);<br>} | while(RUNNING){<br>  vcuRecv(chan, pAddr, size);<br>  //Handle message at pAddr<br>  //(size in bytes length)<br>  vcuFree(chan, pAddr);<br>} |
| Overwrite on Send | while(RUNNING){<br>  vcuSend(dest, chan, data, size);<br>} | while(RUNNING){<br>  vcuRecv(chan, pAddr, size);<br>  //Handle message at pAddr<br>  //(size in bytes length)<br>} |

Figure 5

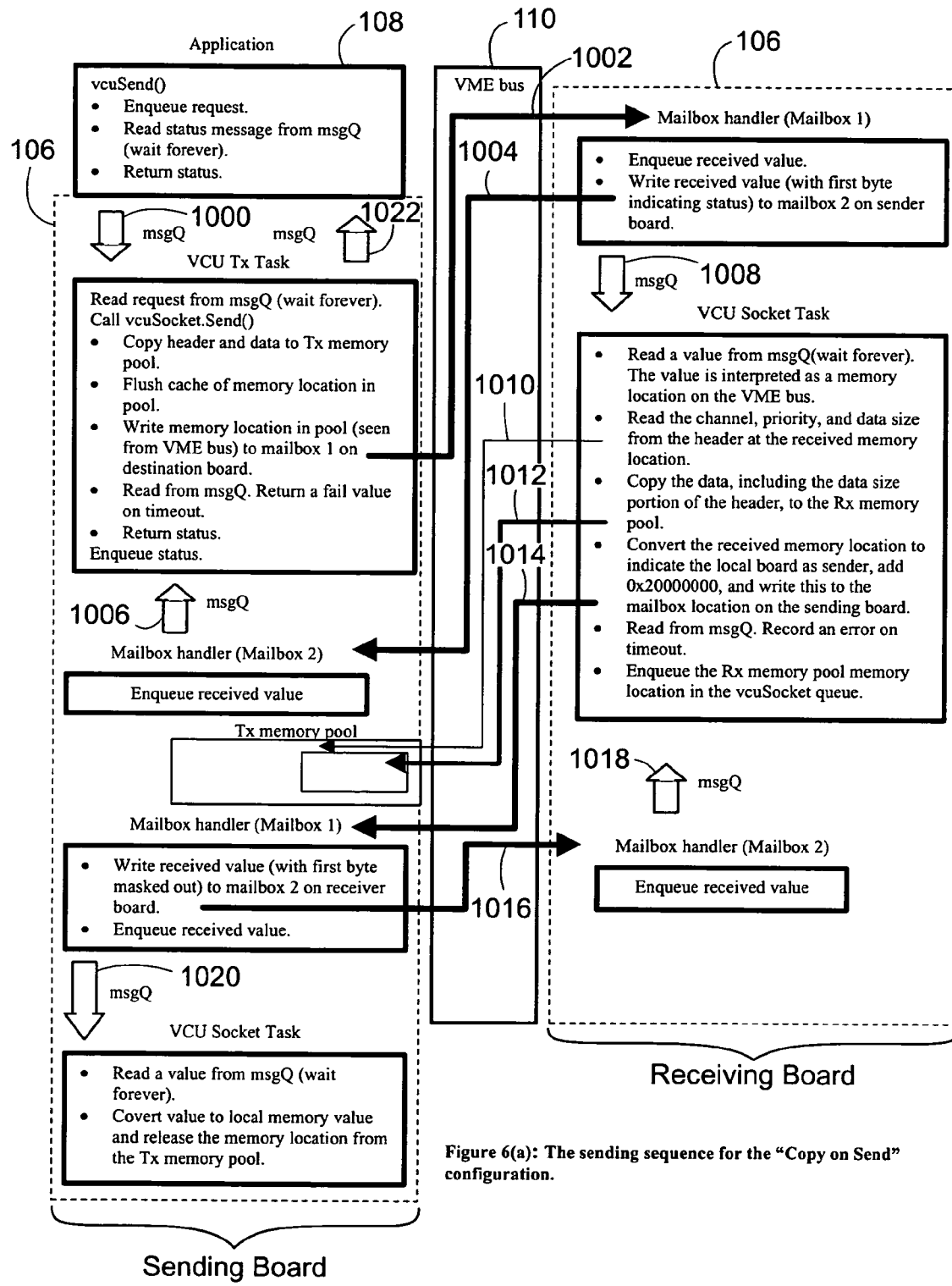
Figure 6(a): The sending sequence for the "Copy on Send" configuration.

(sending sequence for copy on send configuration with VCU Tx Task removed)

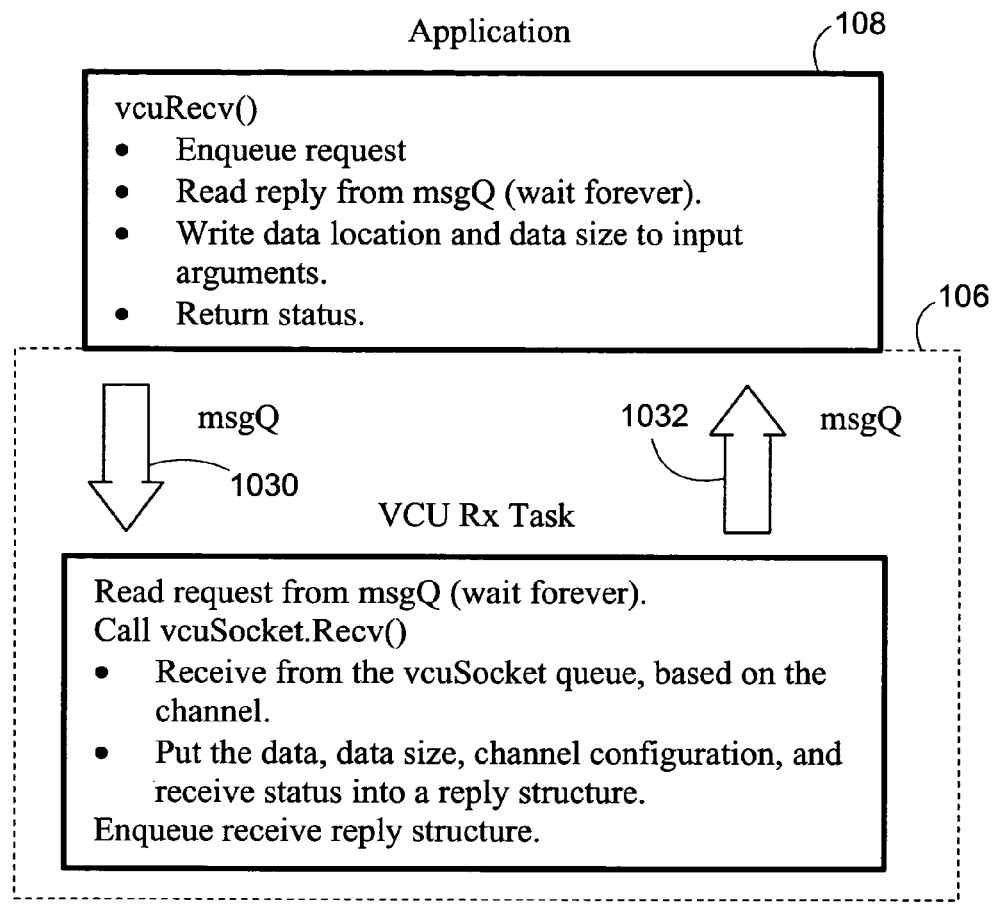
Figure 7(a): The receiving sequence for the "Copy on Send" configuration.

Application (108)

```
vcuRecv()
**Call vcuSocket.Recv()
            **Receive from the vcuSocket queue,
            based on the channel
            ***Write the value received into the
            appropriate argument.
            **Return status.
            **Set the message size to the value in the
            header of the message stored at the
            location indicated in the return value.
            **Set the message location in the input
            argument
```

Figure 7(b)
(receiving sequence for the copy on send configuration with the VCU Rx Task removed)

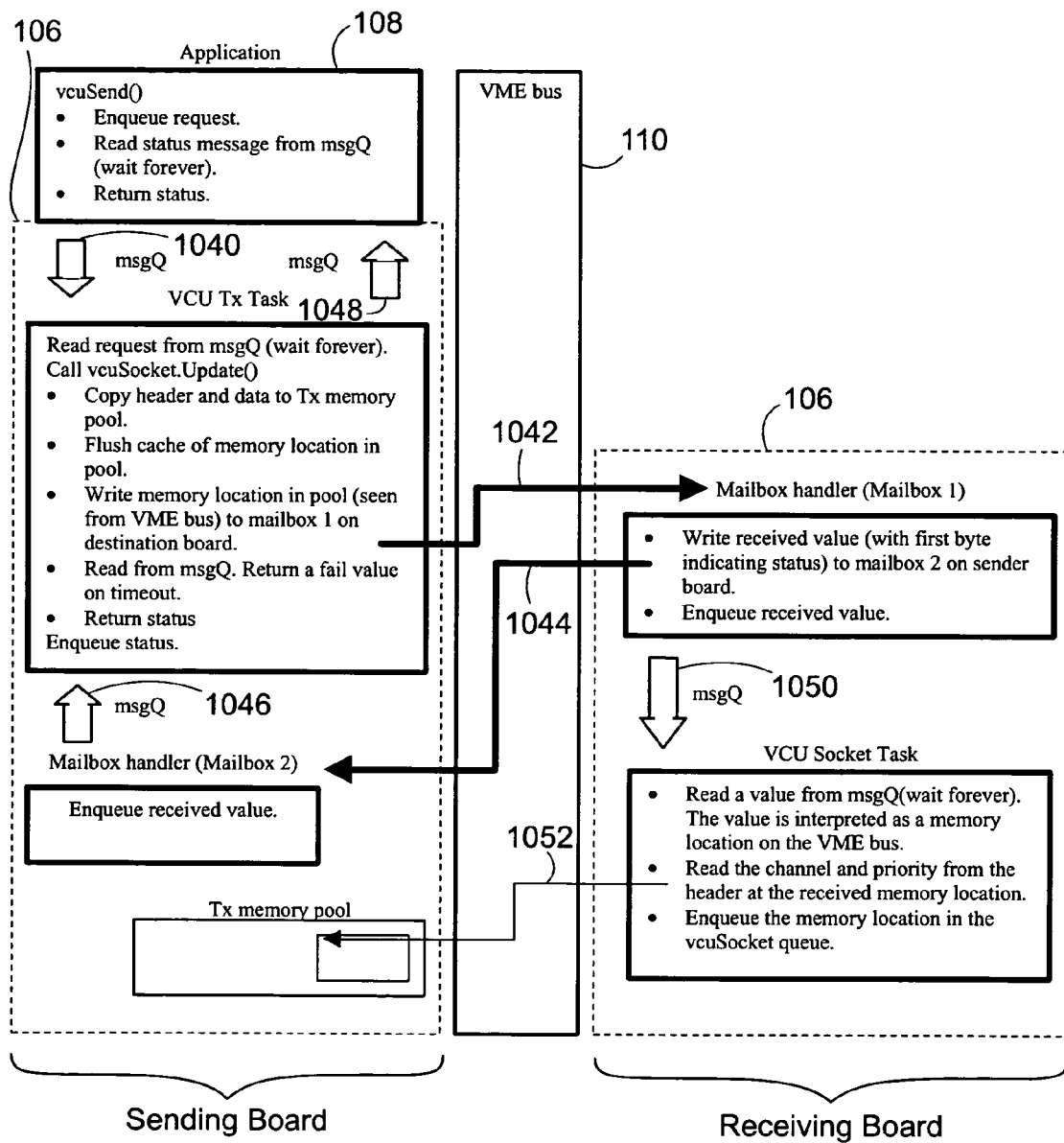
Figure 8(a): The sending sequence for the "Copy to Pool on Recv" configuration.

(sending sequence for copy to pool on receive configuration)

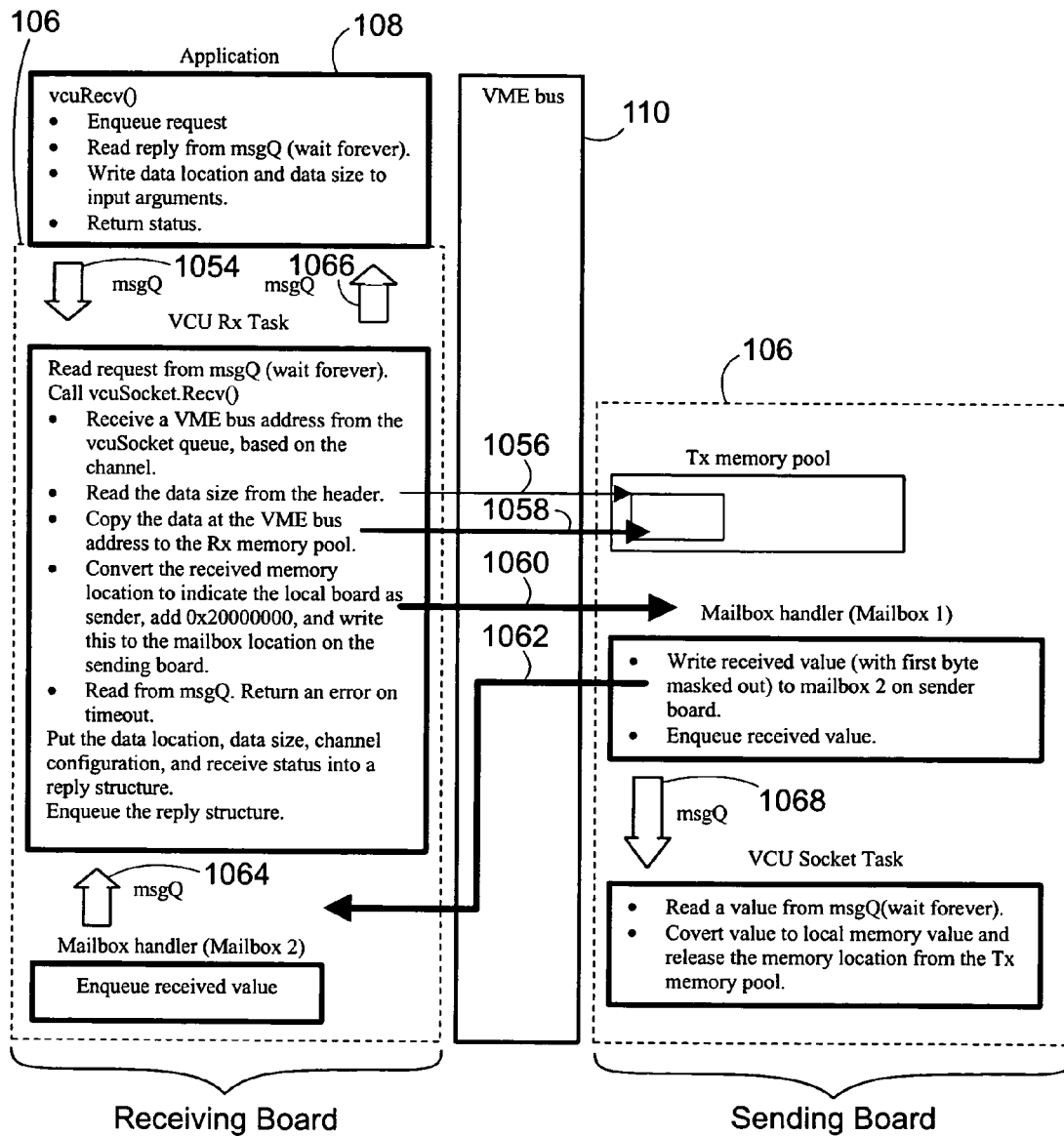
Figure 9(a): The receiving sequence for the "Copy to Pool on Recv" configuration.

(receiving sequence for copy to pool on receive configuration)

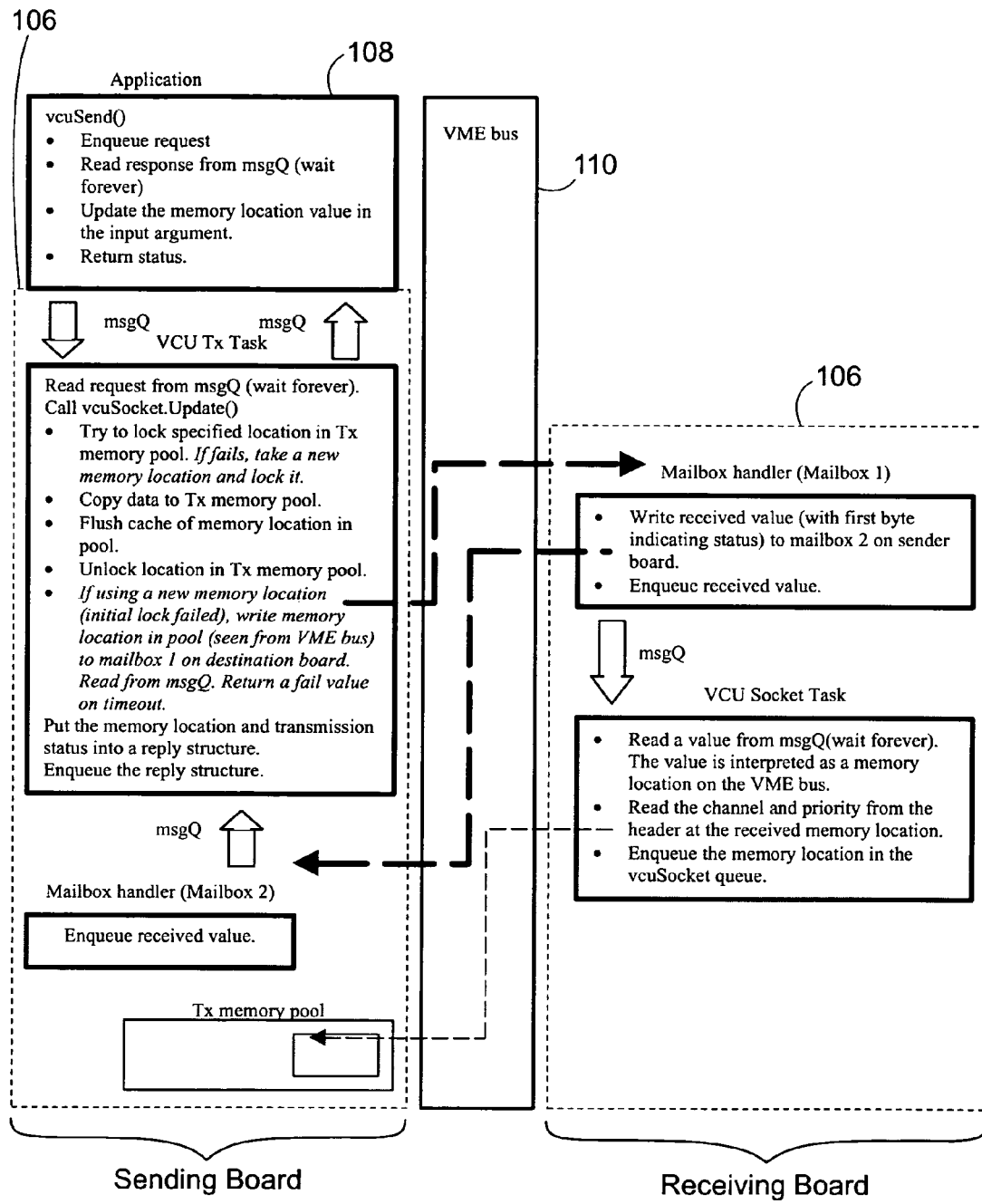
Figure 10: The sending sequence for the "Push to Pool on Recv" configuration

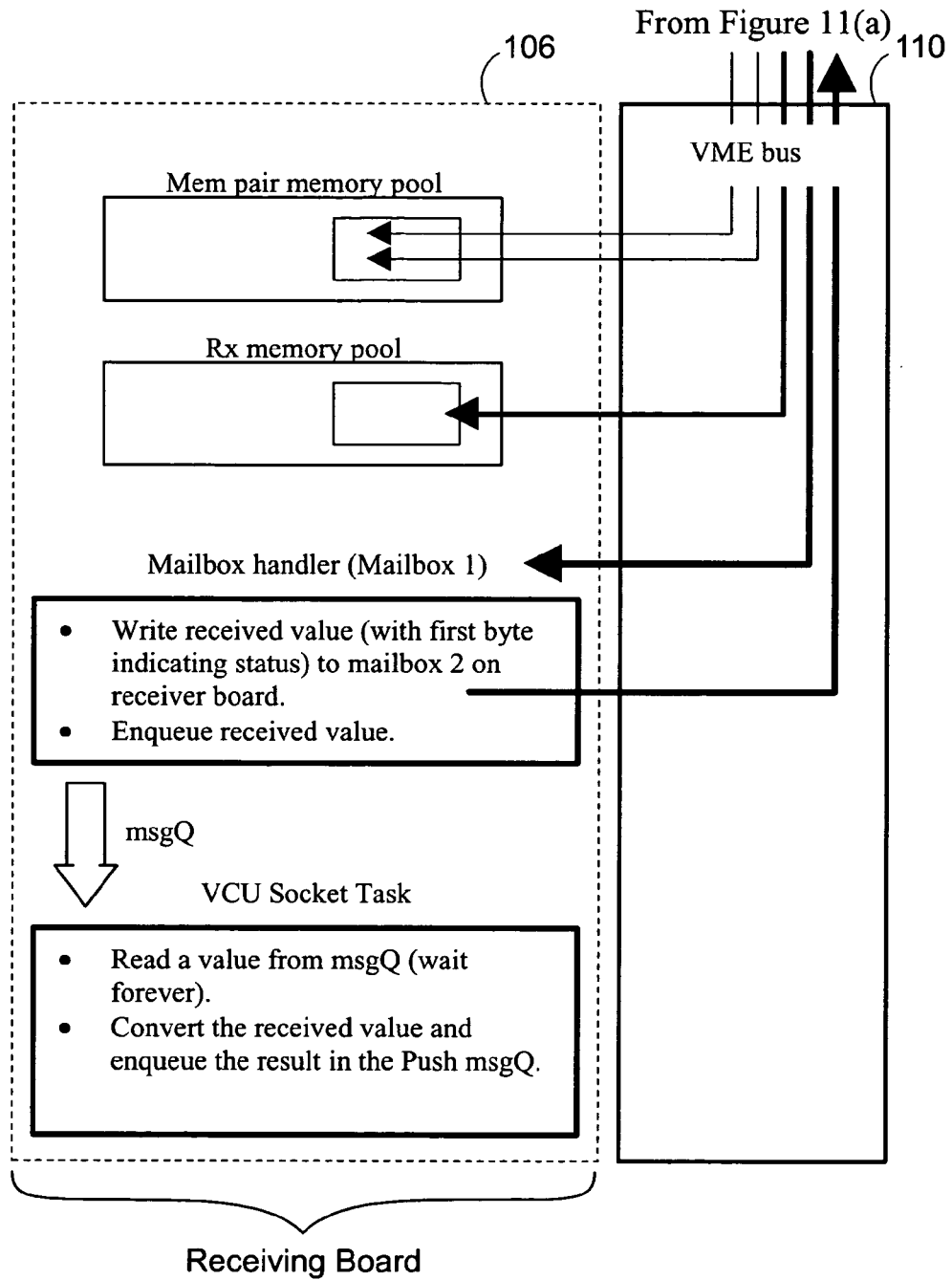
Figure 11(b): The receiving sequence for the "Push to Pool on Recv" configuration.

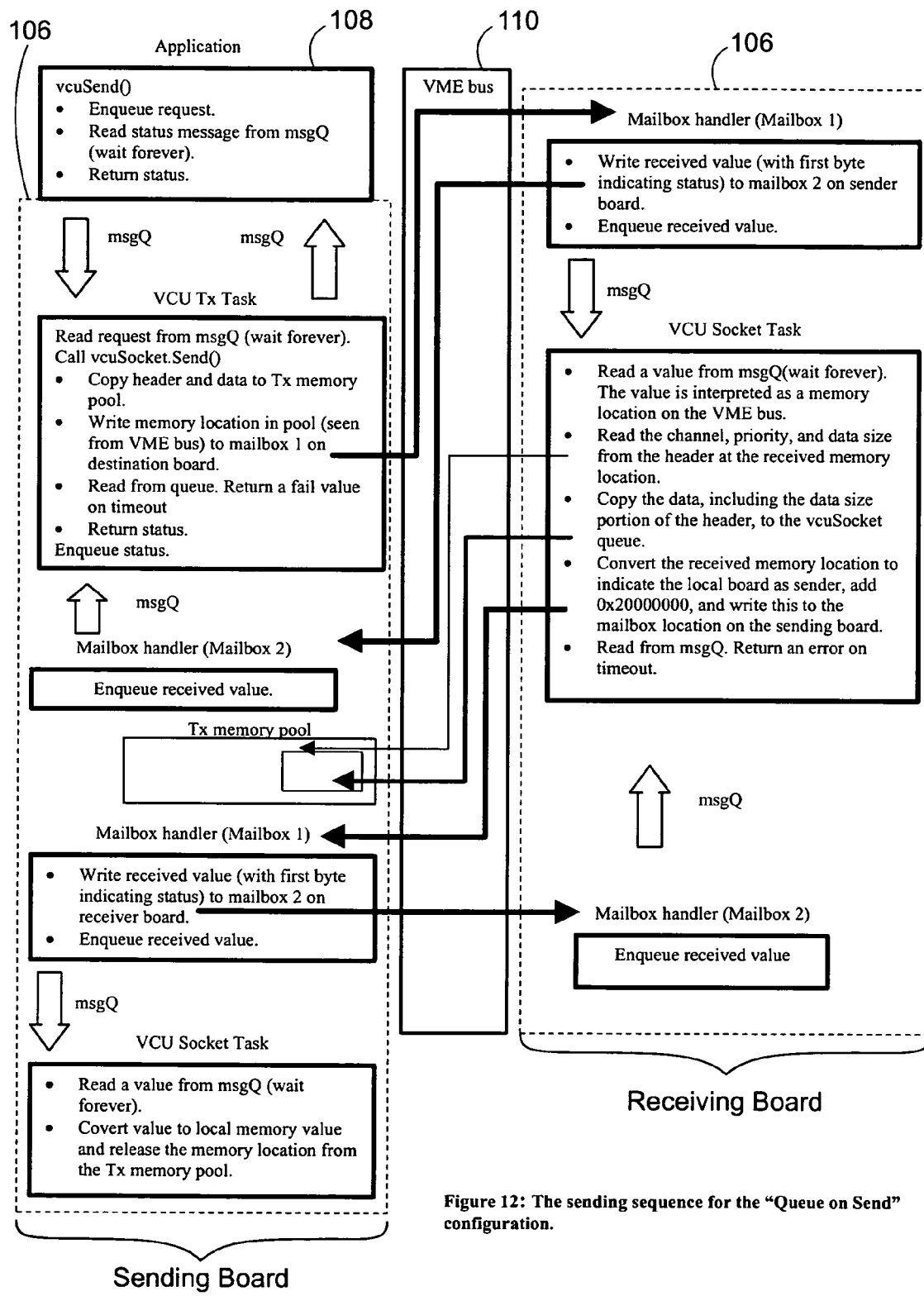
Figure 12: The sending sequence for the "Queue on Send" configuration.

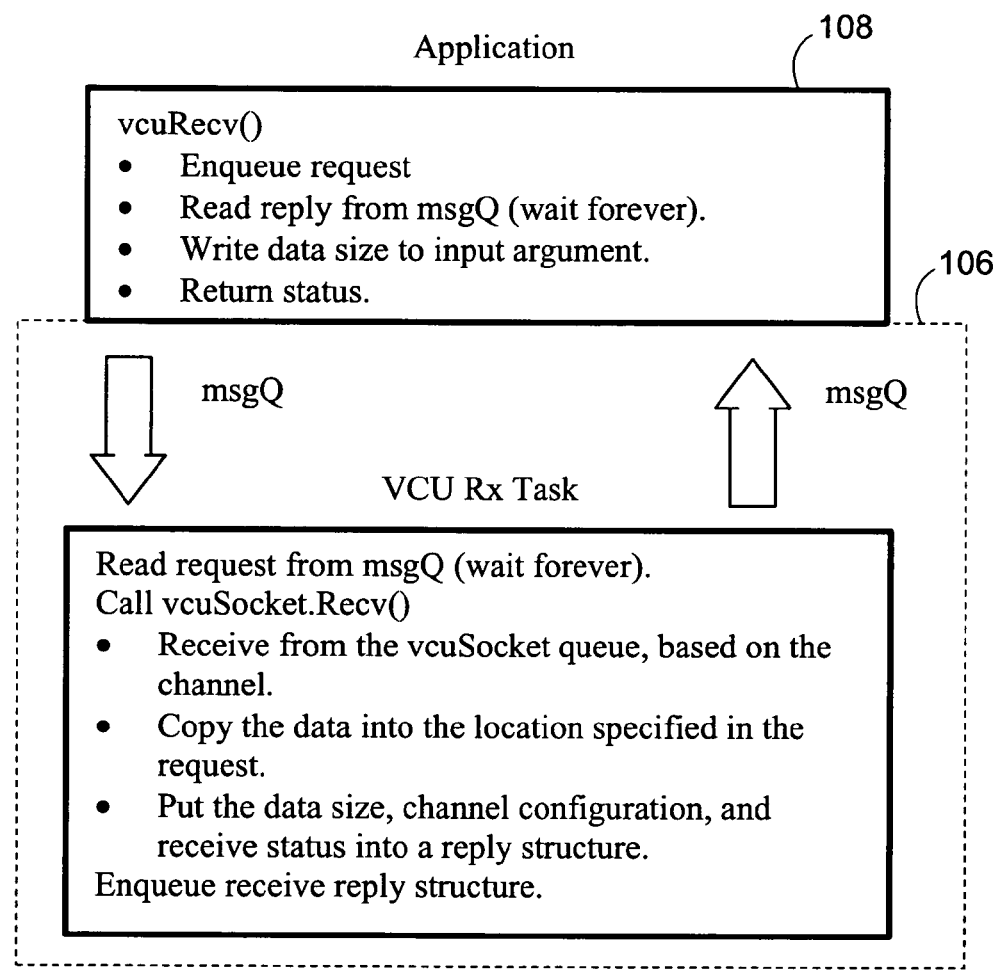
Figure 13: The receiving sequence for the "Queue on Send" configuration.

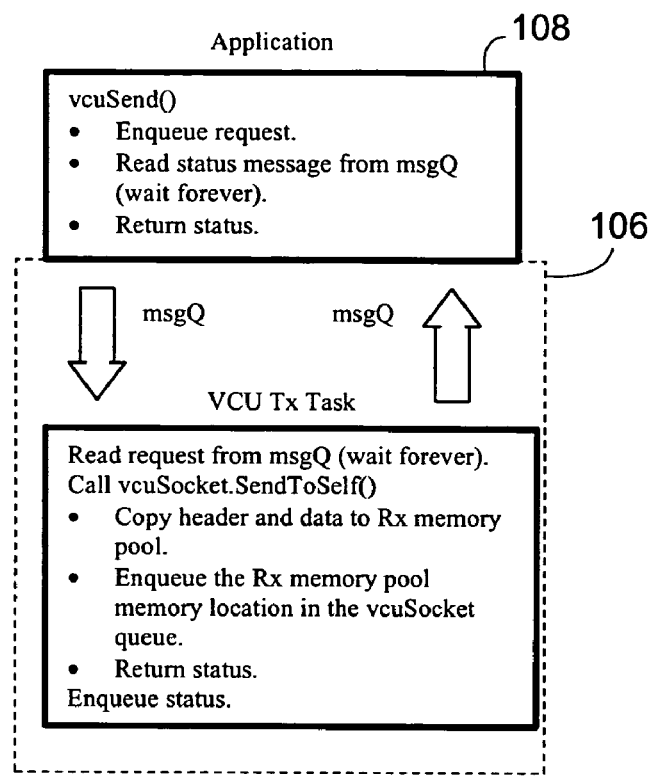
Figure 14: The sending sequence for the "Copy to Self" configuration.
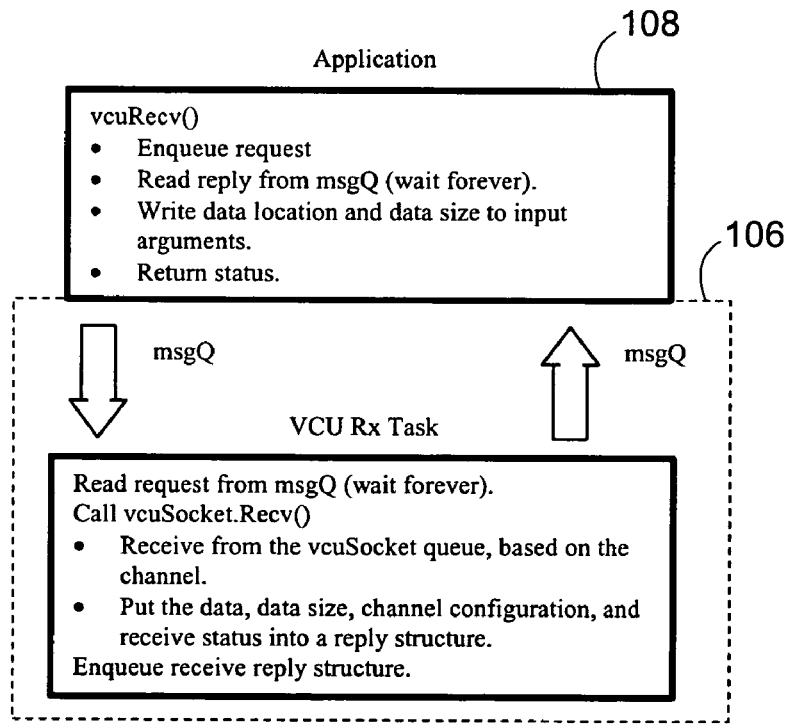
Figure 15: The receiving sequence for the "Copy to Self" configuration.

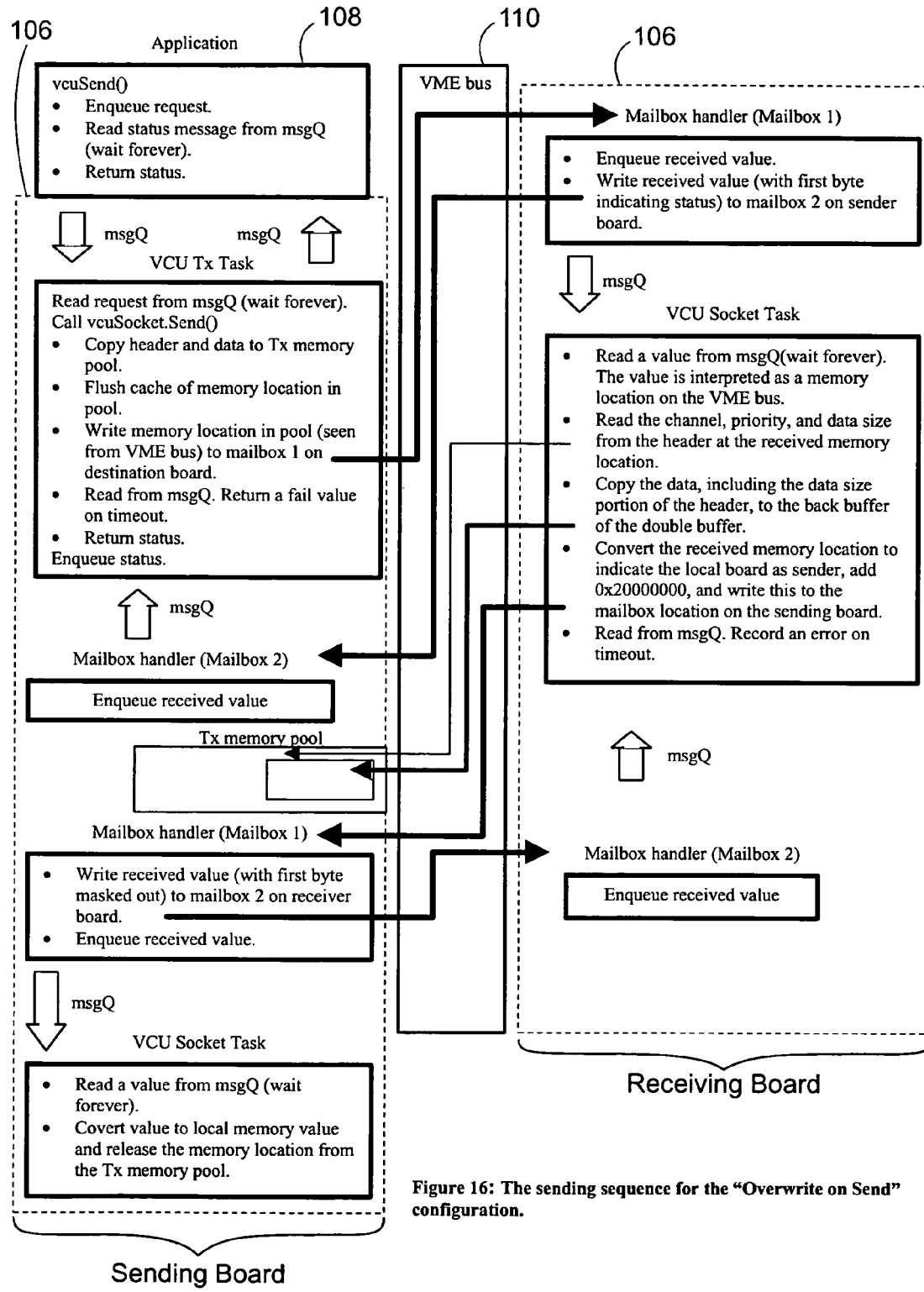
Figure 16: The sending sequence for the "Overwrite on Send" configuration.

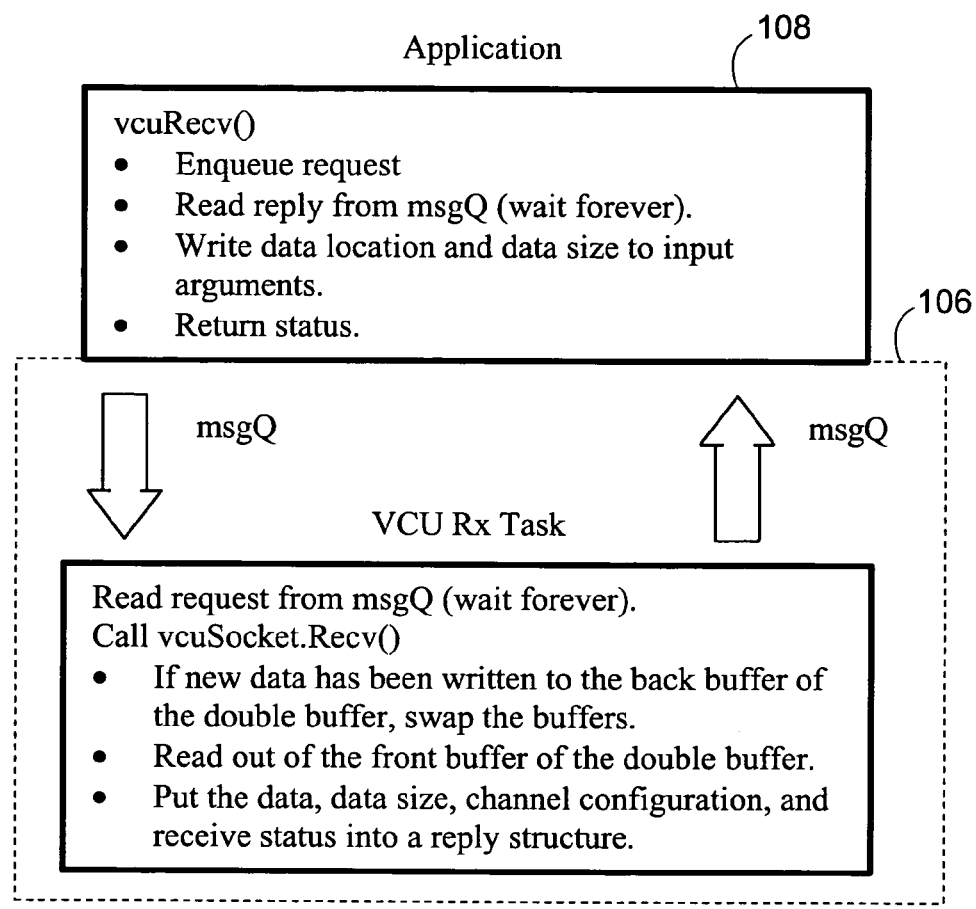
Figure 17: The receiving sequence for the "Overwrite on Send" configuration.

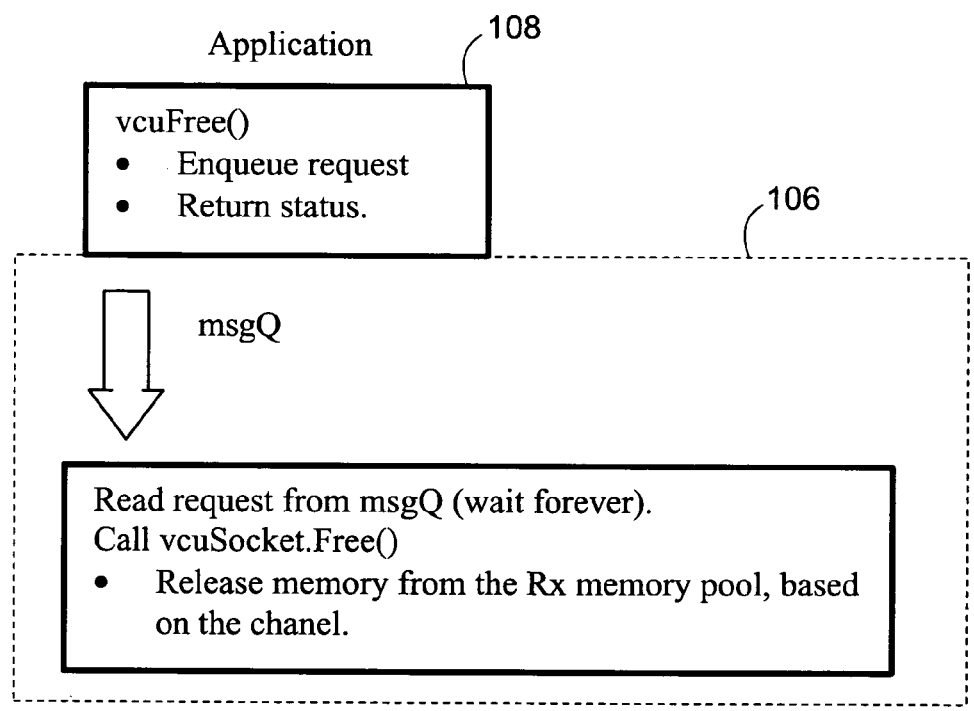
Figure 18: The freeing sequence for the receiver-side memory pool.

| VCU Configuration File Grammar: Backus-Naur Form (BNF) | |
|---|---|
| Top Level: | |
| <config_file>::=,channel_section> [<include_section>] [<handler_section>] [misc_section>] | |
| Description: | The configuration file should contain a channel declaration section and may optionally contain entries for include files, handler files, and other miscellaneous parameters. |
| Channel Declaration Section: | |
| <channel_section>::=Channels *number* <channel_statements> | |
| Description: | The channel declaration should begin with the keyword "Channels" followed by a number representing the number of channels in the system. This is then followed by said number of channel declaration statements. |
| Channel Declaration Statements: | |
| <channel_statements>::=<channel_statement> \| <channel_statement> <channel_statements> | |
| <channel_statement>::=Chan *number* <channel_data_type> *channel_name* <channel_type> | |
| <channel_data_type>::=[struct \| class] *custom_type* \| untyped *byte_count* | |
| <channel_type>::=recvbuf \| send \| pushbuf \|recvpool \| pushpool \|queue \| self] overwrite \| qself | |
| Description: | A channel statement provides the channel *number* followed by the channel data type which may be a structure or class of user-defined *custom_type*, or an untyped string of *byte_count* bytes. The last two tokens in a channel statement should be the user-defined *channel_name* and the channel_type. There also should be as many channel statements as the number of channels declared in the beginning of the channel declaration section. |
| Include File Section: | |
| <include_section>::= Include *number* <include_statements> | |
| <include_statements>::=,include_statement> \| <include_statement> <include_statements> | |
| <include_statement>::= Include *include_file* | |
| Description: | The include file section provides a number of filenames that should be "included" by the file vcuInterface.h generated by the VCU configuration utility. The section must begin with the keyword "Include" followed by a *number* representing the number of include files in the configuration file. This is then followed by said number of include statements. Each include statement starts with the keyword "Include" and is followed by the filename *include_file* which should be "included" by vcuInterface.h. |
| Handler File Section: | |
| <handler_section>::=Handlers *number* <handler_statements> | |
| <handler_statements>::=<handler_statement> \| <handler_statement> <handler_statements> | |
| <handler_statement>::=Hndlr *handlr_file* | |
| Description: | The handler file section provides a number of filenames that should be "included" by the file vcuConfig.cpp generated by the VCU configuration utility. The section must begin with the keyword "Handlers" followed by a *number* representing a number of handler files in the configuration file. This is then followed by said number of handler statements. Each handler statement starts with the keyword "Hndlr" and is followed by the filename *handler_file* which should be "included" by the vcuConfig.cpp file. |

Figure 20(a)

| VCU Configuration File Grammar: Backus-Naur Form (BNF) (cont.) |
|---|
| *Miscellaneous Parameters Section:* |
| <misc_section>::=[<pool_parameters] [<single_parameters>] [<multiple_parameters>] |
| <single_parameters>::=[<ackmailbox_parameter>] [<autoackoff_parameter>] [<autoackon_parameter>]<br>[datamailbox_parameter>] [<debugon_parameter>] [<mailboxqueuesize_parameter>]<br>[<mempairpoolsize_parameter>] [<partitionaddr_parameter>] [<partitionfactor_parameter>]<br>[<slavewinsize_parameter>] [<taskpriority_parameter>] |
| <multiple_parameters>::=<multiple_parameter>\|<multiple_parameter> <multiple_parameters> |
| <multiple_parameter>::=<dma_parameter>\|<dmastart_parameter>\|<event_parameter>\|\|<guaranteeddel_parameter>\|<br><rxpoolsize_parameter>\|<rxqueuesize_parameter>\|<txpoolsize_parameter> |
| Description:     Single parameter options should occur only once per configuration file, while multiple parameter options may occur several times, usually on a per-channel basis. |
| *Pool Parameters:* |
| <pool_parameters>::=BoardCount *number* [<norxpool_parameters>] [<notxpool_parameters>] |
| <norxpool_parameters>::=<norxpool_parameter>\|<norxpool_parameter><norxpool_parameters> |
| <notxpool_parameters>::=<notxpool_parameter>\|<notxpool_parameter><notxpool_parameters> |
| <norxpool_parameter>::=NoRxPool *chan_number board_processor_number* |
| <notxpool_parameter>::=NoTxPool *chan_number board_processor_number* |
| Description:     The pool parameters indicate which, if any, channel/board combinations should not allow receiving or transmitting respectively. The parameter list begins with the "BoardCount" keyword followed by the *number* of boards, or system processors, in the system. This is followed by one or more "NoRxPool" or "NoTxPool" keywords which tell the system which channel/board pairings, indicated by *chan_number* and *board_processor_number*, should not allow receiving and transmitting respectively. |
| *AckMailbox Parameter:* |
| <ackmailbox_parameter>::=AckMailbox *number* |
| Description:     This option indicates which mailbox, represented by number, should be used for automatic acknowledgements. This value must be different from the DataMailbox value, and defaults to 2. |
| *AutoAckOff Parameter:* |
| <autoackoff_parameter>::=AutoAckOff |
| Description:     This option indicates that auto acknowledgement should not be used in the VCU system. |
| *AutoAckOn Parameter:* |
| <autoackon_parameter>::=AutoAckOn *floating_point_number* |
| Description:     This option turns on the automatic acknowledgement feature of the VCU system. The floating_point_number indicates the timeout value in seconds before the message is assumed lost. This value defaults to 0.05 seconds. |
| *DataMailbox Parameter:* |
| <datamailbox_parameter>::=DataMailbox *number* |
| Description:     This indicates which mailbox, represented by number, should be used for inter-board communication. This value must be different from the AckMailbox value, and defaults to 1. |

Figure 20(b)

| VCU Configuration File Grammar: Backus-Naur Form (BNF) (cont.) |
|---|
| *Miscellaneous Parameters Section (cont.):* |
| Debug Parameter: |
| <debugon_parameter>::=DebugOn |
| Description: This option turns on the printing to console all values received in the data mailbox interrupt. |
| Mailbox Queue Size Parameter: |
| <mailboxqueuesize_parameter>::=MailboxQueueSize *size* |
| Description: This option sets the *size* of the message queue leaving the mailbox ISR. The default size is 8. |
| Memory Pair Pool Size Parameter: |
| <mempairpoolsize_parameter>::=MemPairPoolSize *size* |
| Description: This option sets the *size* of the memory pool for memory pairs used by all "push" channels on the board. The default size is 8. |
| Partition Address Parameter: |
| <partitionaddr_parameter>::=PartitionAddress *addr* |
| Description: This option sets the location of the memory partition created by the VCU for VME bus accessibility to the value specified in *addr*. |
| Partition Factor Parameter: |
| <partitionfactor_parameter>::=PartitionFactor *factor* |
| Description: This option sets the *factor* used in setting the size of the partition. |
| Slave Window Size Parameter: |
| <slavewinsize_parameter>::=SlaveWindowSize half \| SlaveWindowSize full |
| Description: This option sets the size of the VME slave windows for boards in the system. "Half" sets the size to 0x04000000 and "full" to 0x08000000, with the default being half. |
| Task Priority Parameter: |
| <taskpriority_parameter>::=TaskPriority *priority* |
| Description: This option sets the *priority* for the VCU socket task. |
| DMA Parameter: |
| <dma_parameter>::=DMA *chan_number* |
| Description: This option turns forces the indicated *chan_number* to always use DMA. |
| DMA Start Parameter: |
| <dmastart_parameter>::=DMAStart *chan_number message_size* |
| Description: This option forces the indicated *chan_number* to always use DMA for messages that have sizes that are greater than or equal to *message_size* bytes. |

Figure 20(c)

| VCU Configuration File Grammar: Backus-Naur Form (BNF) (cont.) |  |
|---|---|
| *Miscellaneous Parameters Section (cont.):* | |
| Event Parameter: | |
| | <event_parameter>::=Event *chan_number event_handler* |
| Description: | This option specifies the routine (*event_handler*) to be called when a board receives a message for the channel indicated by *channel_number*. |
| Guaranteed Delivery Parameter: | |
| | <guaranteeddel_parameter>::=GuaranteedDelivery *chan_number* |
| Description: | This option forces the indicated *chan_number* to block on certain queue and pool overflows rather than risk losing the message. |
| Receive Pool Size Parameter: | |
| | <rxpoolsize_parameter>::=RxPoolSize *chan_number size* |
| Description: | This option sets the *size* of the receiving memory pool for the indicated *chan_number*. The default value is 8. |
| Receive Queue Size Parameter: | |
| | <rxqueuesize_parameter>::=RxQueueSize *chan_number size* |
| Description: | This option sets the *size* of the receiving message queue for the indicated *chan_number*. The default value is 8. |
| Transmit Pool Size Parameter: | |
| | <txpoolsize_parameter>::=TxPoolSize *chan_number size* |
| Description: | This option sets the *size* of the transmitting memory pool for the indicated *chan_number*. The default value is 8. |

Figure 20(d)

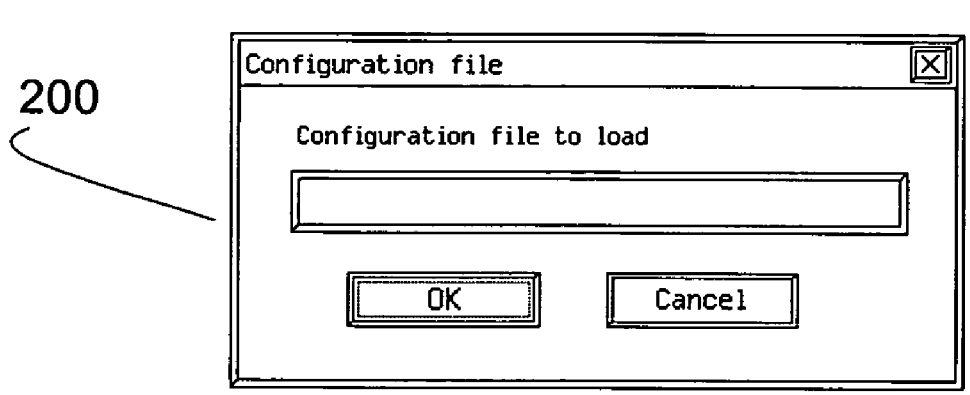
Figure 21: Initial Dialog Window for the GUI

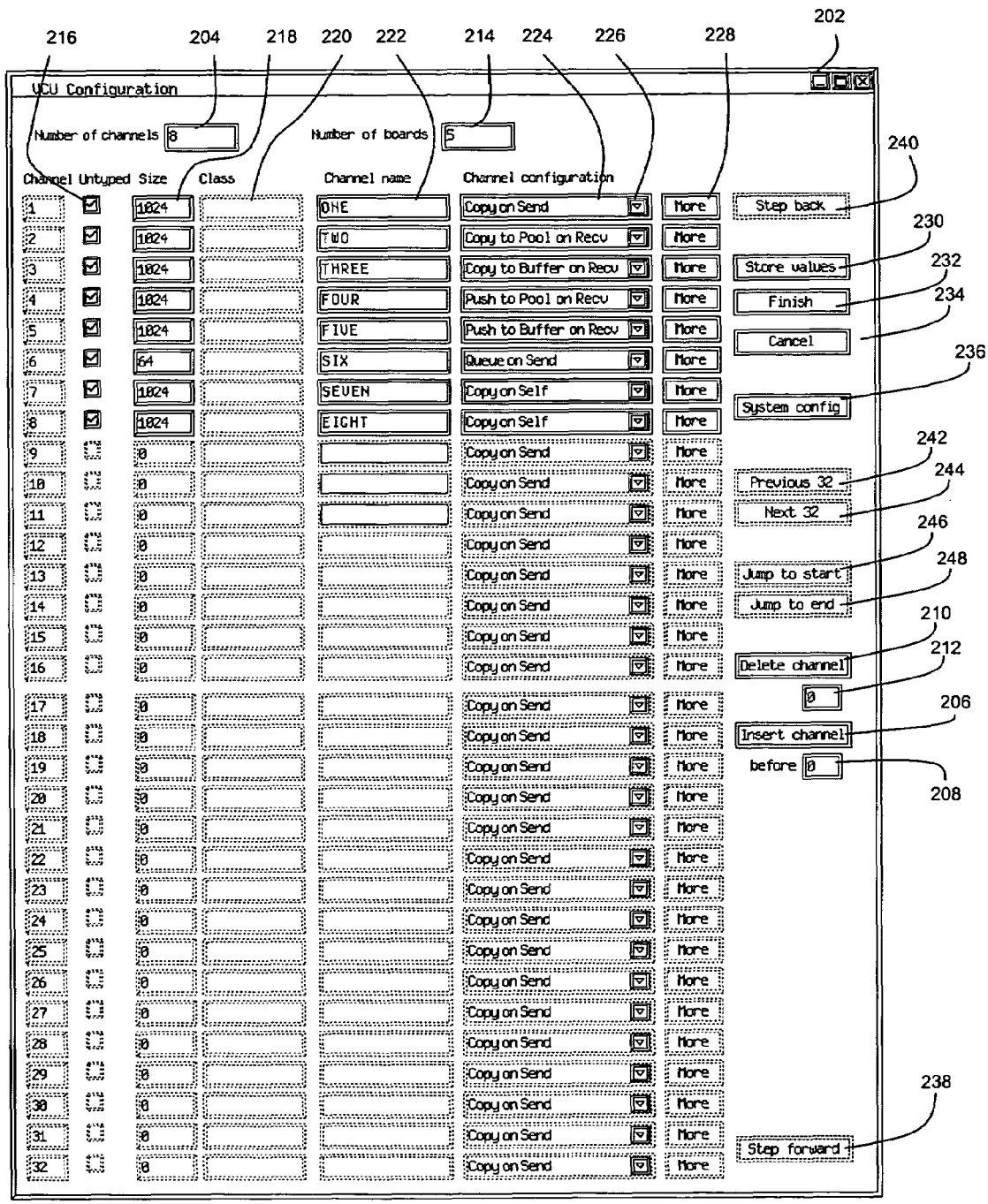
Figure 22: Primary dialog window of the GUI

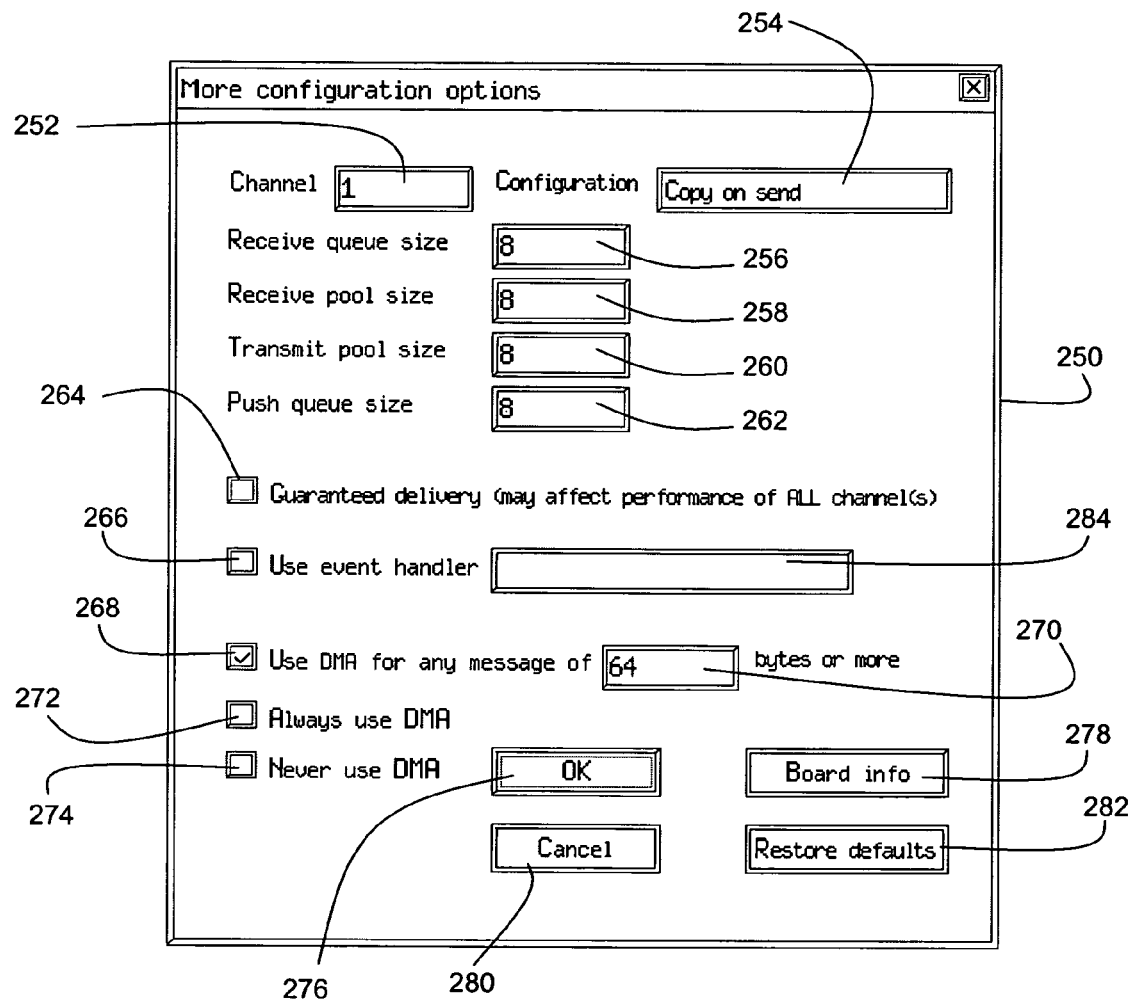
Figure 23: The "More configuration options" dialog window

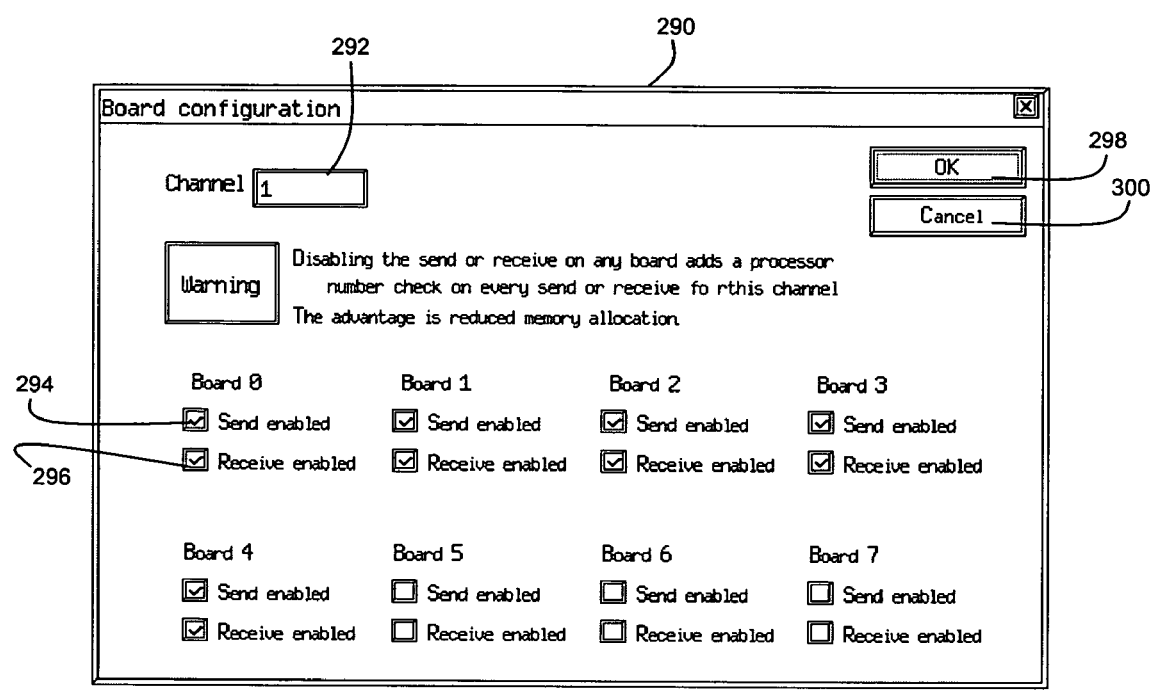
Figure 24: The "Board configuration" dialog window

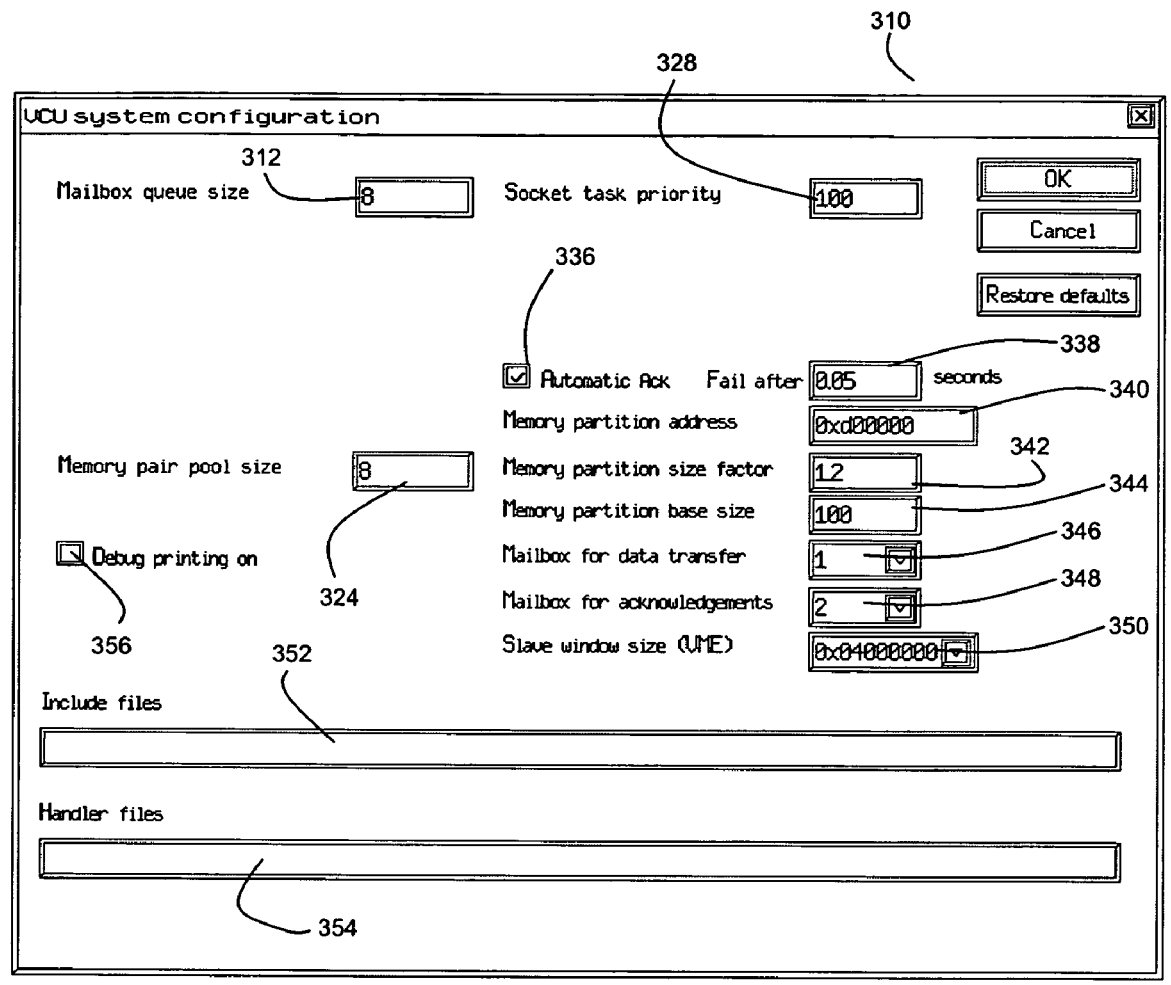
Figure 25: The "VCU system configuration" dialog window

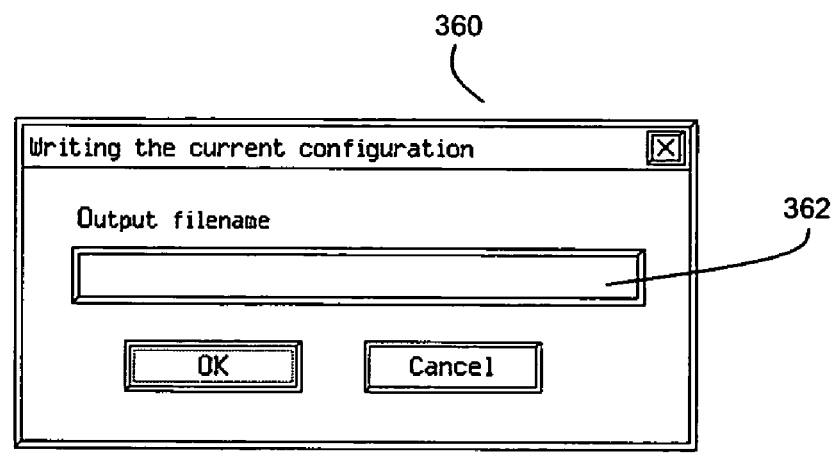
Figure 26: The "Writing the current configuration" dialog window
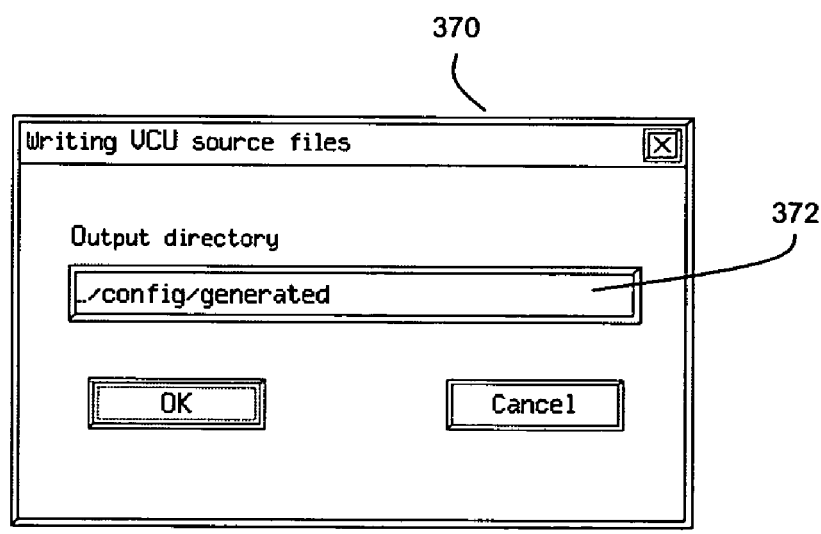
Figure 27: The "Writing the VCU source files" dialog window

| Configuration: | Receive Queue Size: | Receive Pool Size: |
|---|---|---|
| Copy on Send | Maximum difference between the number of remote vcuSend() and local vcuRecv() calls. On overflow, the message is lost or the entire system blocks | Maximum difference between the number of remote vcuSend() and local vcuRecv() calls. On overflow, the message is lost or the entire system blocks |
| Copy to Pool on Receive | Maximum difference between the number of remote vcuSend() and local vcuRecv() calls. On overflow, the message is lost or the entire system blocks. | Maximum difference between the number of vcuRecv() and vcuFree() calls. On overflow, vcuRecv() returns an error |
| Copy to Buffer on Receive | Maximum difference between the number of remote vcuSend() and local vcuRecv() calls. On overflow, the message is lost or the entire system blocks | N/A |
| Push to Pool on Receive | Maximum number of remote sources of vcuSend() calls (each source has a unique ID and keeps track of the transmit pool address it is using). On overflow, the message is lost or the entire system blocks. | Maximum difference between the number of vcuRecv() and vcuFree() calls. On overflow, vcuRecv() returns an error |
| Push to Buffer on Receive | Maximum number of remote sources of vcuSend() calls (each source has a unique ID and keeps track of the transmit pool address it is using). On overflow, the message is lost or the entire system blocks. | N/A |
| Queue on Send | Maximum difference between the number of remote vcuSend() and local vcuRecv() calls. On overflow, the message is lost or the entire system blocks | N/A |
| Copy to Self | Maximum difference between the number of vcuSend() and vcuRecv() calls. On overflow, vcuSend() returns an error | Maximum difference between the number of vcuRecv() and vcuFree() calls. On overflow, vcuRecv() returns an error |
| Overwrite on Send | N/A | N/A |

Figure 28

| Configuration: | Transmit Pool Size: | Push Queue Size: |
|---|---|---|
| Copy on Send | Maximum number of local sources of vcuSend() calls. On overflow, vcuSend() returns an error. | 0 |
| Copy to Pool on Receive | Maximum difference between the number of local vcuSend() and remote vcuRecv() calls. On overflow, vcuSend() returns an error. | 0 |
| Copy to Buffer on Receive | Maximum difference between the number of local vcuSend() and remote vcuRecv() calls. On overflow, vcuSend() returns an error. | 0 |
| Push to Pool on Receive | Twice the number of local sources of vcuSend() calls (each source has a unique ID and keeps track of the transmit pool address it is using). On overflow, vcuSend() returns an error. | Maximum number of local sources of vcuSend() calls. On overflow, vcuSend() returns an error |
| Push to Buffer on Receive | Twice the number of local sources of vcuSend() calls (each source has a unique ID and keeps track of the transmit pool address it is using). On overflow, vcuSend() returns an error. | Maximum number of local sources of vcuSend() calls. On overflow, vcuSend() returns an error |
| Queue on Send | Maximum number of local sources of vcuSend() calls. On overflow, vcuSend() returns an error. | 0 |
| Copy to Self | N/A | 0 |
| Overwrite on Send | Maximum number of local sources of vcuSend() calls. On overflow, vcuSend() returns an error. | 0 |

Channels 6
Chan 1 buttonPress          BUTTON_PRESS_CHANNEL         recvbuf
Chan 2 class EventInfo      EVENT_INFO_CHANNEL           send
Chan 3 struct NavData       NAV_DATA_CHANNEL             pushbuf
Chan 4 untyped 1024         BIG_RAW_DATA_CHANNEL         recvpool
Chan 5 untyped   32         SMALL_RAW_DATA_CHANNEL       pushpool
Chan 6 untyped    8         SMALL_FAST_CHANNEL           queue
Includes 3
Incl NavData.h
Incl EventInfo.h
Incl ButtonPress.h
MailboxQueueSize   10
DMA             1
NO_DMA          2
RxPoolSize      1      10
TxPoolSize      1      10

Figure 30: An example configuration file

| Keyword: | Parameters: | Meaning: |
|---|---|---|
| AckMailbox | 1 | "AckMailbox" indicates the mailbox used for the automatic acknowledgement. It should differ from the "DataMailbox" value. The default value is 2. |
| AutoAckOff | 0 | "AutoAckOff" turns off the automatic acknowledgement system for the VCU. With auto ack turned off, the VCU uses only one mailbox interrupt per board, but cannot guarantee that messages will not be lost. |
| AutoAckOn | 1 | "AutoAckOn" turns on the automatic acknowledgement system for the VCU. The parameter sets the delay for an acknowledgement from the receiving board before the message is assumed lost. The default value for the parameter is 0.05 (in seconds). |
| BoardCount | 1 | "BoardCount" specifies the number of boards in the system. This value is only used in conjunction with "NoRxPool" and "NoTxPool". |
| Chan | 4 (or 5) | "Chan" specifies a data type, channel name, and configuration type for one channel. Specifying "Chan" a second time for a channel resets the DMA size specs, even if they were changed from default by a "DmaStart" line. "Chan 0" is not allowed. Also, "Chan" cannot be specified before "Channels". |
| Channels | 1 | "Channels" specifies the number of channels in the VCU. It should not appear more than once in the configuration file. |
| DataMailbox | 1 | "DataMailbox" indicates the mailbox used by the VCU for inter-board communication. It must differ from the "AckMailbox" value. The default value is 1. |
| DebugOn | 0 | Turns on printing of all values received in the data mailbox interrupt |
| DMA | 1 | "DMA" specifies that the indicated channel should always use DMA. |
| DmaStart | 2 | "DmaStart" specifies that the indicated channel should use DMA for any message larger than that specified by the second parameter (the size being in bytes). |
| Event | 2 | "Event" specifies a routine that should be called as soon as a board receives data on the indicated channel. The first parameter is the channel, and the second parameter is the routine (the routine preferably cannot take any input argument and cannot return any value). |
| GuaranteedDelivery | 1 | "GuaranteedDelivery" indicates that the channel will block on certain queue and pool overflows, rather than lose the message. The queue and pool overflows in question are those that are unreportable as returns to vcuSend(), vcuRecv(), or vcuFree() calls. Blocking on these overflows blocks all incoming messages for the board in question and can result in other queues and pools overflowing. |
| Handlers | 1 | "Handlers" specifies the number of files to be included in the vcuConfig.cpp file. It should not be called twice. |
| Hndlr | 1 | "Hndlr" specifies a file to be included in the vcuConfig.cpp file. If too many or too few files are specified, the autoConfig code declares the configuration invalid. "Hndlr" should not be specified before "Handlers". |
| Includes | 1 | "Includes" specifies the number of files to be included in the file vcuInterface.h. "Includes" should not be called more than once. |
| Incl | 1 | "Incl" specifies a file to be included in the file vcuInterface.h. If too many or too few files are specified, the autoConfig code declares the configuration invalid. "Incl" should not be specified before "Includes". |
| MailboxQueueSize | 1 | "MailboxQueueSize" specifies the size of the msgQ leaving the mailbox ISR. The default value is 8. |
| MemPairPoolSize | 1 | "MemPairPoolSize" specifies the size of the memory pool for memory pairs (used in the "push..." configuration types). This is a board-wide memory pool, used by all channels. The default value is 8. |

Figure 31(a)

| Keyword: | Parameters: | Meaning: |
|---|---|---|
| No_DMA | 1 | "No_DMA" specifies that the indicated channel should never use DMA. |
| NoRxPool | 2 | "NoRxPool" specifies a channel and board where the VCU should not support receive operations. The first parameter is the channel and the second parameter is the board's system processor number. If NoRxPool is specified for any board in a channel, then the system processor numbers should be in the range of 0 to BoardCount-1. |
| NoTxPool | 2 | "NoTxPool" specifies a channel and board where the VCU should not support transmit operations. The first parameter is the channel and the second parameter is the board's system processor number. If NoTxPool is specified for any board in a channel, then the system processor numbers should be in the range of 0 to BoardCount-1. |
| PartitionAddress | 1 | "PartitionAddress" specifies the location of the memory partition created by the VCU for VME bus accessibility. |
| PartitionFactor | 1 | "PartitionFactor" specifies the factor used in setting the size of the partition. Buffers used to receive data in the "push to buffer on receive" configuration type are allocated from here, so these drive the size of the partition factor. The factor also allows for fragmented allocation because of the memory alignment specified in the allocation. |
| RxPoolSize | 2 | "RxPoolSize" specifies the size of the receiving memory pool for a channel. The first parameter is the channel, and the second parameter is the pool size. The default value is 8. |
| RxQueueSize | 2 | "RxQueueSize" specifies the size of the receiving queue for a channel. The first parameter is the channel, and the second parameter is the queue size. The default value is 8. |
| RxReplyQueueSize | 1 | "RxReplyQueueSize" specifies the size of the queue delivering responses from the VCU Rx Task to the vcuRecv() routine. |
| RxRqstQueueSize | 1 | "RxRqstQueueSize" specifies the size of the queue delivering vcuRecv() requests to the VCU Rx Task. |
| RxTaskCount | 1 | "RxTaskCount" specifies the number of tasks set aside to handle vcuRecv() calls. The first task handles all non-blocking calls, while the other tasks handle blocking calls. The minimum value should be 2 unless vcuRecv() will never be called as blocking. The default value is 4. |
| SlaveWindowSize | 1 | "SlaveWindowSize" specifies the size of the slave windows for boards in the system. The valid options are "half" and "full", which correspond to 0x04000000 and 0x08000000. The default value is "half". |
| TaskPriority | 2 | "TaskPriority" specifies the priority of the indicated task, "Socket", "Tx", "Rx", or "Debug". The default value is 100 for all tasks. |
| TxPoolSize | 2 | "TxPoolSize" specifies the size of the transmitting memory pool for a channel. The first parameter is the channel, and the second parameter is the pool size. The default value is 8. |
| TxReplyQueueSize | 1 | "TxReplyQueueSize" specifies the size of the queue that delivers update responses from the VCU Tx Task to the vcuSend() routine. |
| TxRqstQueueSize | 1 | "TxRqstQueueSize" specifies the size of the queue that delivers vcuSend() requests to the task that actually performs the data transmission (the VCU Tx Task). |
| TxStatusQueueSize | 1 | "TxStatusQueueSize" specifies the size of the queue that delivers status responses from the VCU Tx Task to the vcuSend() routine. |

Figure 31(b)

| Constant: | Value: | Meaning: |
|---|---|---|
| VCU_ERROR_NO_CODE | 0x1 | Mainly used internally, but also used as a return value for a multicast "vcuRequestErrno()" so this routine can be used to check whether any errors exist in the system |
| VCU_SUCCESS | 0x2 | The VCU command operated successfully |
| VCU_RECV_EMPTY | 0x3 | The non-blocking vcuRecv() command found no message. |
| VCU_BAD_CHANNEL | 0x4 | An unexpected channel was received. This can be directly, from an API call, or indirectly, from data corrupted when copied across the VME bus. |
| VCU_MSGQ_FULL | 0x5 | Used internally on a vcuSend() when the channel is configured for copy to self. |
| VCU_POOL_FULL | 0x6 | The vcuSend() or vcuRecv() call could not find sufficient memory space in the memory pool to perform the send or receive. |
| VCU_NO_RECV_TASK | 0x7 | The vcuRecv() call is a blocking call, but no task is available for a blocking receive call. To fix: configure the system to have more receive tasks. |
| VCU_ERR_ON_RECV | 0x10000 | The error occurred in a section of code responsible for receiving. The code is most likely specific to handling vcuRecv(). |
| VCU_ERR_ON_SEND | 0x20000 | The error occurred in code specific to handling vcuSend(). |
| VCU_ERR_ON_FREE | 0x30000 | The error occurred in code specific to handling vcuFree (). |
| VCU_ERR_ON_PING | 0x40000 | The error occurred in code specific to handling vcuPing(). |
| VCU_ERR_ON_TEST_PAT | 0x50000 | The error occurred in code specific to handling vcuRequestTestPattern(). |
| VCU_ERR_ON_CONFIG | 0x60000 | The error occurred at initialization |
| VCU_ERR_ON_ERRNO | 0x70000 | The error occurred in code specific to handling vcuRequestErrno(). These error numbers are not stored, so that stored errors can be differentiated from errors that occur at the time of the request |
| VCU_ERR_IN_SOCKET | 0x01000 | The error occurred in code in VcuSocket.cpp. |
| VCU_ERR_IN_RXQUEUE | 0x02000 | The error occurred during an RxQueues method. |
| VCU_ERR_IN_MAILBOX | 0x03000 | The error occurred in mailbox management, in the file VcuMailbox.cpp. |
| VCU_ERR_IN_INTERFACE | 0x04000 | The error occurred in the interface to the vcuSocket, in VcuComm.cpp. |
| VCU_ERR_IN_RX_TASK | 0x05000 | The error occurred in code in VcuComm.cpp in logic specific to Rx Task management. |
| VCU_ERR_IN_TX_TASK | 0x06000 | The error occurred in code in VcuComm.cpp in logic specific to Tx Task management. |
| VCU_ERR_IN_VME_COPY | 0x07000 | The error occurred in code responsible for copying data across the VME bus. |
| VCU_ERR_IN_RXPOOL | 0x08000 | The error occurred in a RxPools method. |
| VCU_ERR_IN_TXPOOL | 0x09000 | The error occurred in a TxPools method. |
| VCU_ERR_IN_PAIRPOOL | 0x0a000 | The error occurred in a MemPairPool method. |
| VCU_ERR_IN_ACK | 0x0b000 | The error occurred in code responsible for handling an automatic acknowledgement. |

Figure 33(a)

| Constant: | Value: | Meaning: |
|---|---|---|
| VCU_ERR_NO_MEMORY | 0x00010 | The error occurred when requested memory is unavailable. |
| VCU_ERR_MSGQ_RECV | 0x00020 | The error occurred while trying to receive from a msgQ. |
| VCU_ERR_DATA_SYNCH | 0x00030 | The error occurred when VcuSocket tried to free a memory pool slot already freed or during RequestDataPush() when the incorrect identifier came back. The latter requires rewriting the Push communication protocol. |
| VCU_ERR_INTERNAL | 0x00040 | The error occurred when the flow reached a section of code it should not have reached. |
| VCU_ERR_BAD_POOL_SLOT | 0x00050 | The error occurred when the VcuSocket tried to Free() memory that did not come from the pool specified. |
| VCU_ERR_BAD_MAILBOX | 0x00060 | The error occurred when the VcuSocket tried to TriggerRemoteBoard() to itself or a destination outside the system boundaries. |
| VCU_ERR_BAD_MCAST | 0x00070 | The error occurred because the VCU was reconfigured so that the destinations are not specified bitwise, or a multicast was attempted on a channel configured for updating ("push ...") |
| VCU_ERR_UNLOCK_FAILED | 0x00080 | The error occurred during Update() when the system was unable to unlock a memory slot it just locked. This should never occur. |
| VCU_ERR_MSGQ_FULL | 0x00090 | The error occurred when a send to a msgQ found the msgQ full. |
| VCU_ERR_MSGQ_SEND | 0x000a0 | The error occurred while trying to send to a msgQ. The error is not a full msgQ error. |
| VCU_ERR_BAD_CONFIG | 0x000b0 | The error occurred when the VCU tables were in conflict with the kernel configuration. |
| VCU_ERR_TRIG_FAILED | 0x000c0 | The error should only occur when automatic acknowledgement is enabled. The error means that the automatic ack was not received. vcuPing() can be tried to make sure that the board is accessible. The return value is VCU_SUCCESS for a successful vcuPing(). |
| VCU_ERR_MSG_TOO_BIG | 0x000d0 | The error occurred when the size of the message was larger than the capacity of the channel. |
| VCU_ERR_DEST_INVALID | 0x000e0 | The error occurred when a vcuPing() or vcuRequestTestPattern() found an invalid destination specified. |
| VCU_ERR_TASK_DIED | 0x000f0 | The error occurred when a receive task is found to be inaccessible. |
| VCU_ERR_VME_DMA | 0x00100 | The error occurred when a sysVmeDmaCopy() returned an error value. |
| VCU_ERR_ISR_USE | 0x00200 | The error occurred when vcuSend() was called from an ISR. |
| VCU_MBOX_FULL_QUEUE | 0xff | The error occurred when the receiver's mailbox ISR found its outgoing msgQ full. The message is lost, but the sender gets an error message. |
| VCU_MBOX_QUEUE_ERROR | 0xfe | The error occurred when the receiver's mailbox ISR found its outgoing msgQ broken (not just full). The message is lost, but the sender gets an error message. All further messages are likely to get the same response. |

Figure 33(b)

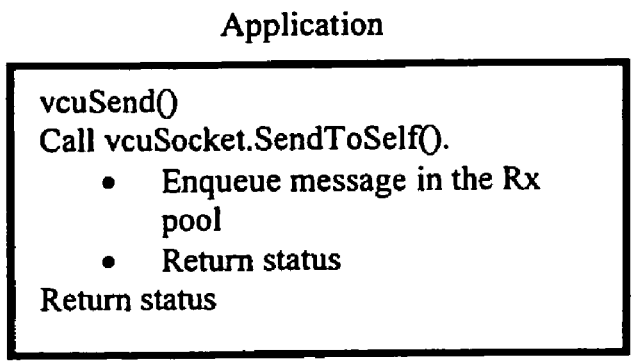
Figure 34: The sending sequence for the "Queue to self" configuration.
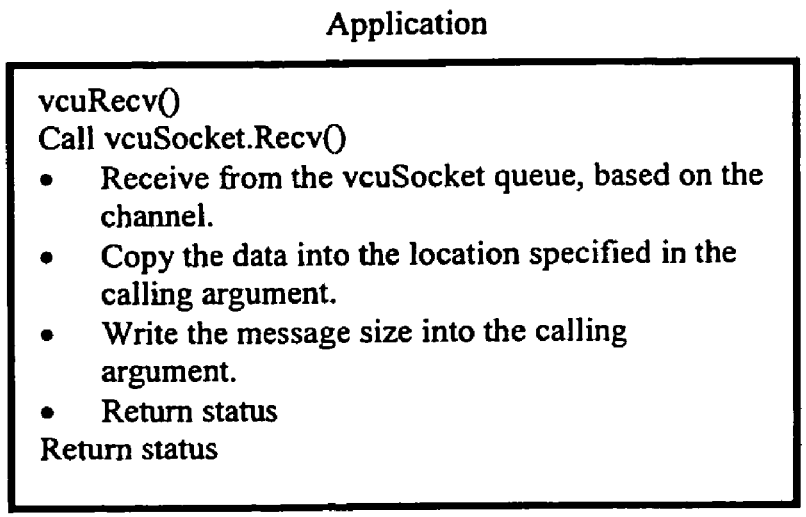
Figure 35: The receiving sequence for the "Queue to self" configuration

METHOD AND APPARATUS FOR COMMUNICATING DATA OVER A BUS ACCORDING TO REDEFINABLE CONFIGURATIONS

STATEMENT REGARDING FEDERALLY SPONSORED RESEARCH OR DEVELOPMENT

This disclosure was made with Government support under Contract Number F33615-00-C-6061 awarded by the Air Force Research Laboratory. The Government has certain rights in this disclosure.

FIELD

The field of the present disclosure relates to the communication of data over a data bus that interconnects a plurality of data processors, particularly data processors residing on different physical boards.

BACKGROUND

Efficiently moving data between data processing boards in a multi-board processing environment represents a challenging task. The development such an efficient communication utility for these data transfers becomes a particularly daunting task when a project that needs such data transfers is a continuously evolving project.

For example, at some point after a multi-board data processing system has been designed, or at least preliminarily designed, better hardware may be developed such that what was once a three board processing system may be reduced to a two board processing system. With the steady improvements being made in processing power from one year to the next, such evolutionary possibilities cannot be ignored.

Also, it may be the case that additional functionalities are added to the multi-board processing system that necessitate the addition of another data processing board. Further, it may be the case that testing of a multi-board data processing system reveals various shortcomings in how data is transferred. This consideration is particularly acute in systems wherein high speed processing of large volumes of data is necessary.

Accordingly, there is a need in the art for a communication utility that moves data between data processing boards over a data bus, wherein the communication utility is both high speed and easily configurable to accommodate changes in processing needs or the processing environment.

Furthermore, many multi-board processing systems are implemented in a manner that makes space a premium commodity. In one application of the present disclosure, a strike helmet for pilots such as the Strike Helmet 21 project by the assignee of the present disclosure, the data processing boards are seated in a Versa Module Europa (VME) chassis such that an insufficient number of hardware slots are available for a variety of communication methods (such as Fibre Channel). In cases such as this, in addition to providing flexibility for evolving communication frameworks, the implementation of a multi-board communication utility should also provide space efficiency to satisfy narrow size constraints.

SUMMARY

Having been unable to find an existing communication utility that satisfies some or all of these needs in the art, the inventors herein developed the present disclosure.

Accordingly, disclosed herein is a data processing apparatus comprising: (1) plurality of data processing boards; (3) a bus connecting the boards with each other; and wherein each board comprises a communication utility for communicating data over the bus to another board through a plurality of channels, and wherein at least one of the channels has a user-redefinable configuration.

The number of communication channels present in the apparatus is preferably redefinable by a user. Further, it is preferred that at least one channel, and preferably each channel, possess a configuration that is redefinable according to user input. Examples of user-redefinable aspects of the communication channel include: the channel's maximum data transfer size, the channel's memory allocation, and whether and under what conditions the channel uses direct memory access (DMA) for data transfers.

Moreover, it is preferred that at least one channel, and more preferably each channel, be user-redefinable with any of a plurality of available configuration types. Examples of available configuration types for the present disclosure include: (1) a copy on send configuration type, (2) a copy to pool on receive configuration type, (3) a copy to buffer on receive configuration type, (4) a push to pool on receive configuration type, (5) a push to buffer on receive configuration type, (6) a queue on send configuration type, (7) a copy to self configuration type, (8) a queue to self configuration type, and (9) an overwrite on send configuration type.

According to another aspect of the present disclosure, disclosed herein is a data processing apparatus comprising: (1) a first data processing board; (2) a second data processing board; (3) a bus connecting the boards with each other; and wherein each board comprises a communication utility for communicating data over the bus to the other board, and wherein the communication utility communicates data according to a redefinable configuration such that a bus utilization percentage in a range of at least 13% for 8 Kbyte transfers is achieved. This bus utilization percentage is measured from the time that the sending board calls vcuSend( ) to the time that the receiving board returns from vcuRecv( ) (that is, makes the data available to the application). Also, this bus utilization was achieved without the boards' cache snooping being enabled. When using a board with cache snooping capabilities, it is expected that a bus utilization of approximately 25% for 8 Kbyte transfers can be reached. With other known communication utilities, such as TCP/IP over a VME bus, the bus utilization percentage is much lower, around 5% for 8 Kbyte transfers.

According to another aspect of the present disclosure, disclosed herein is a method of configuring a communication utility for transporting data from a first processor to a second processor over a bus, the method comprising: (1) defining a configuration for a channel through which data is communicated over a bus by a communication utility interfacing at least a first processor with a second processor; and (2) in accordance with the defined channel configurations, compiling software for controlling the communication utility.

By encapsulating the configuration of the system, a developer is relieved of the need to be aware of the system's topology and channel transmission characteristics. With the present disclosure, it is preferred that the system topology and channel transmission characteristics be set at the configuration level.

Thus, the developer's task is made easier (1) because of the system's flexibility, and (2) because the differences between inter-board and intra-board communication and the differences between channel transmission characteristics are configured separately from the developer's software. That is, the topology and transmission characteristics of the channel(s) exist separately from the application(s) using the channel(s). Therefore, because they are not interwoven, a change to a channel does not require a change to the application using that channel. Further still, because the memory is not dynamically allocated in the present disclosure, delays attributable to such dynamism are not present. Yet the present disclosure memory allocation is still capable of retaining efficiency due to the flexible nature of its user-configurability.

The present disclosure may also provide a user interface for configuring each channel separately from the application software. That is, the application(s) using the present disclosure to communicate data need not be cognizant of the configurations of the various communication channels. Thus, according to yet another aspect of the present disclosure, disclosed herein is a device comprising: (1) a user interface through which a user provides configuration data; and (2) a processor configured to receive the configuration data from the user interface and generate a configuration file therefrom, the configuration file comprising configuration information for a plurality of channels over a bus that interconnects a plurality of data processing boards.

It is preferred that the user interface be a graphical user interface (GUI). Further, a preferred user interface provides features such as: allowing the user to define the number of channels through which data is communicated over the bus, displaying a list of available configuration types for each channel, displaying a user-definable maximum data transfer size for each channel, displaying a memory allocation for each channel, receiving a modification to a channel's memory allocation from the user, displaying the conditions under which a channel is to use DMA during data transfers over the bus, and receiving a modification to the conditions under which a channel is to use DMA during data transfers over the bus.

Further still, according to yet another aspect of the present disclosure, disclosed herein is a device comprising: (1) a user interface through which a user specifies a stored configuration file, the configuration file comprising configuration information for a plurality of channels over a bus that interconnects a plurality of data processing boards; and (2) a processor configured to retrieve the specified configuration file and generate software in accordance with the retrieved configuration file, the software for controlling data communications over the bus between the boards. Here, the user interface is a UNIX command line interface.

The software aspects of the present disclosure can be implemented on any form of computer-readable media, including but not limited to compact disks, floppy disks, processor memory, a network-accessible server, and the like.

Preliminary testing of a prototype of the present disclosure indicates that the present disclosure performs better than current communication utilities available in the art. These and other features and advantages of the present disclosure will be in part pointed out and in part apparent upon review of the following description, figures, and claims.

BRIEF DESCRIPTION OF THE DRAWINGS

FIGS. 3(a) and (b) list the various routines that can be operated by the communication utility for handling data transfers;

FIG. 4 is a table identifying the debugging levels for the preferred vcuPrintDebug( ) routine;

FIG. 5 is a table describing a plurality of preferred configuration types for the communication utility;

FIG. 6(a) is a block diagram illustrating a preferred sending sequence for the "copy on send" configuration;

FIG. 7(a) is a block diagram illustrating a preferred receiving sequence for the "copy on send" configuration;

FIGS. 6(b) and 7(b) are block diagrams illustrating preferred modified sending and receiving sequences for the "copy on send" configuration, wherein the VCU Tx Task and VCU Rx Task have been removed;

FIG. 8(a) is a block diagram illustrating a preferred sending sequence for the "copy to pool on receive" configuration;

FIG. 9(a) is a block diagram illustrating a preferred receiving sequence for the "copy to pool on receive" configuration;

FIG. 10 is a block diagram illustrating a preferred sending sequence for the "push to pool on receive" configuration;

FIG. 12 is a block diagram illustrating a preferred sending sequence for the "queue on send" configuration;

FIG. 13 is a block diagram illustrating a preferred receiving sequence for the "queue on send" configuration;

FIG. 14 is a block diagram illustrating a preferred sending sequence for the "copy to self" configuration;

FIG. 15 is a block diagram illustrating a preferred receiving sequence for the "copy to self" configuration;

FIG. 16 is a block diagram illustrating a preferred sending sequence for the "overwrite on send" configuration;

FIG. 17 is a block diagram illustrating a preferred receiving sequence for the "overwrite on send" configuration;

FIG. 18 is a block diagram illustrating a preferred freeing sequence for the receiving board's memory pool;

FIGS. 20(a)-(d) depict a grammar Backus-Naur form (BNF) for the parser of FIGS. 19(a) and (b);

FIG. 21 illustrates an initial dialog window for the preferred configuration GUI;

FIG. 22 illustrates the primary dialog window for the preferred configuration GUI;

FIG. 23 illustrates a preferred dialog window for defining various channel specific configurations according to user input;

FIG. 24 illustrates a preferred dialog window for user-definition of a plurality of board parameters;

FIG. 25 illustrates a preferred dialog window for user-definition of a plurality of system parameters;

FIG. 26 illustrates a preferred dialog window for user-definition of an output file for storing configuration parameters;

FIG. 27 illustrates a preferred dialog window for user-definition of an output directory for the configuration files;

FIG. 28 is a table describing preferred receive queue and receive pool sizes for the various configuration types;

FIG. 29 is a table describing preferred transmit pool and push queue sizes for the various configuration types;

FIG. 30 depicts an exemplary configuration file;

FIGS. 31(a) and (b) are tables listing and describing the preferred keywords for a configuration file;

FIGS. 33(a) and (b) are tables listing preferred error codes for the system;

FIG. 34 is a block diagram illustrating a preferred sending sequence for a "queue to self" configuration;

FIG. 35 is a block diagram illustrating a preferred receiving sequence for the "queue to self" configuration.

DETAILED DESCRIPTION OF THE VARIOUS EMBODIMENTS

Figure 1:
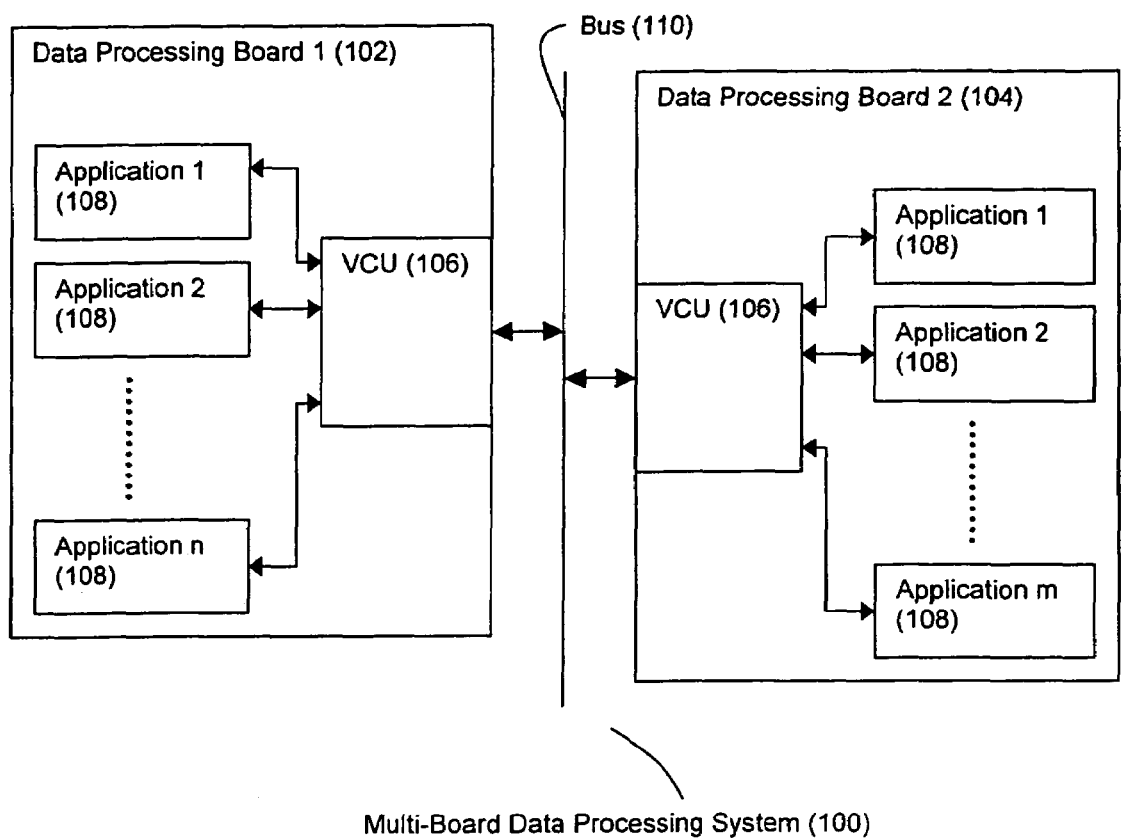
FIG. 1 illustrates an overview of a preferred multi-board data processing system.

System Overview: FIG. 1 illustrates an embodiment of the present disclosure. In FIG. 1, a multi-board data processing system 100 comprises a first data processing board 102 and second data processing board 104, wherein the two boards are interconnected via a bus 110. Each board has one or more data processing applications 108 running thereon. When data is to be transferred from one application to another (whether an interboard transfer or an intraboard transfer), the communication utility 106 resident on each board is used. The communication utilities 106 interface each board with one another via the bus 110. The data transferred over the bus can be of either a fixed size or a variable size. The communication utility 106 communicates data such that a bus utilization percentage is in a range from approximately 13% to approximately 25% for 8 Kbyte data transfers across the bus 110.

It is preferred that the data bus 110 be a Versa Module Europa (VME) bus, and that the boards be VME boards. In particular, it is preferred that the present disclosure use the Dy4 family of VME boards, such as the Dy4 179, 181, and 712 boards, which are publicly available from Force Computers, Inc. However, as would be understood by those of ordinary skill in the art, the system 100 can be implemented with data processing boards other than VME boards, including but not limited to PCI boards on which mailboxes and DMA can be implemented through either hardware or software, similar ISA boards, or any board types with parallel back planes and on which mailboxes and DMA can be configured through either hardware or software. However, VME boards are preferred because the inventors herein have found them to be more easily configurable with respect to mailboxes and DMA. Also, it is worth noting that while two boards are depicted in the system of FIG. 1, the present disclosure is capable of supporting more than two boards communicating with each other over the bus, and further as will be explained in more detail below, this number can be user-definable.

Figure 2:
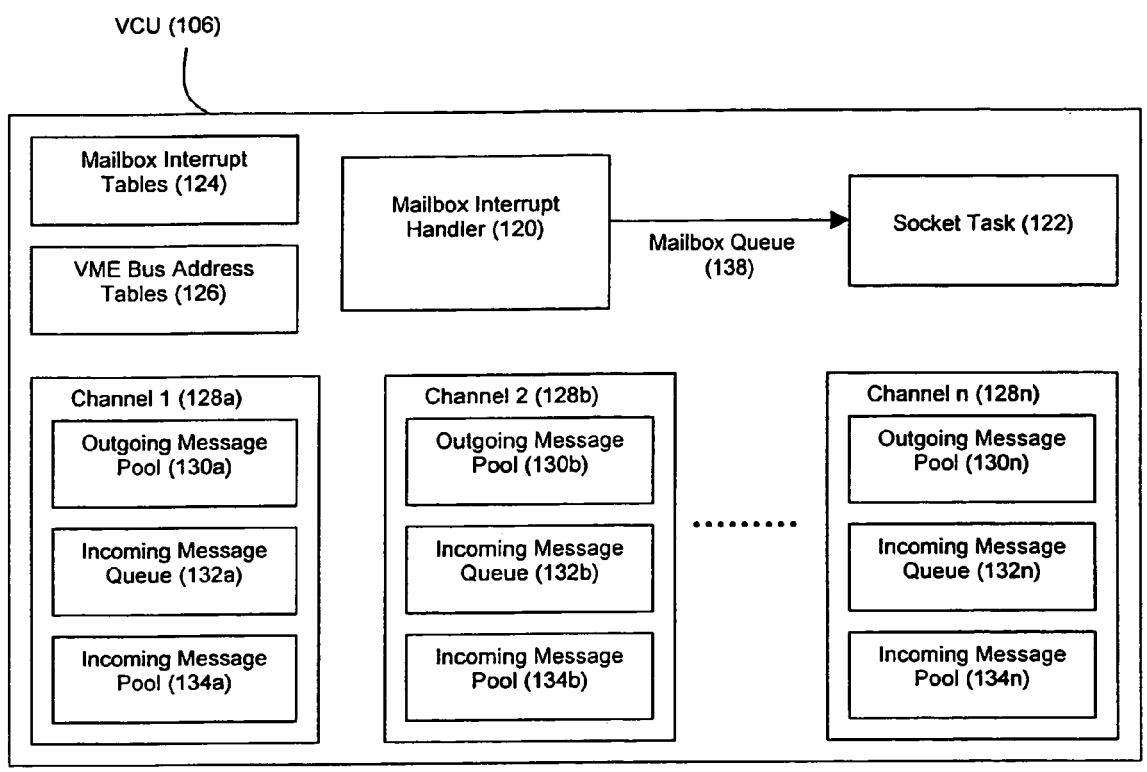
FIG. 2 illustrates an exploded block diagram of a preferred communication utility for the present disclosure.

FIG. 2 illustrates a block diagram overview of the processing modules and memory allocation for a preferred communication utility 106. The preferred communication utility 106 comprises a mailbox interrupt handler 120, a socket task 122 that receives a queue 138 of messages from the mailbox interrupt handler 120, mailbox interrupt tables 124, VME bus address tables 126, and a plurality of channels 128a through 128n.

The mailbox interrupt handler 120 is preferably an event interface with remote boards. Each board in system 100 preferably has a resident mailbox interrupt handler 120 that is triggered by a remote board to indicate an event (such as data available for transfer). The handler 120 uses a one-way mailbox queue 138 that is in communication with the socket task 122 to notify the socket task of events in the system 100.

The socket task 122 handles events. In quiescence, the socket tasks 122 waits for a message in the mailbox queue 138. As will be explained in more detail below, when such a message is found in the queue 138, the socket task 122 manages the actions required to handle the message.

The mailbox interrupt tables 124 contain the addresses of mailbox interrupts for all boards in the system 100. These addresses are useful for reference when communicating events to a remote board.

The VME bus address tables 126 contain the addresses of the VME bus slave windows of all boards in the system 100. These addresses are useful for reference when determining the source of a message.

The physical allocation of each channel 128a through 128n depends on each channel's configuration. However, commonly-used channel elements comprise an outgoing message pool 130i, an incoming message queue 132i, and an incoming message pool 134i. It should be understood that, depending on a particular channel's configuration, one or more of these elements may be present in the particular channel.

The outgoing message pools 130a through 130n are memory pools for storing messages being sent. In certain configuration types, such as the "copy to self" configuration type, the outgoing message pool is non-existent. The incoming message pools 132a through 132n are memory pools for storing messages after they have been pulled across the VME bus by the receiving board. In certain configuration types, such as the "copy to buffer on receive" configuration type and the "queue on send" configuration type, the incoming message pool is non-existent. The incoming message queues 134a through 134n are message queues for storing data addresses appropriate for processing by the vcuRecv( ) routine to be discussed in more detail below. After a sending board has called the vcuSend( ) routine, also to be discussed in more detail below, an interrupt is triggered on the receiving board, thereby resulting a data address being put into the channel's incoming message queue. On the receiving board, the vcuRecv( ) routine checks this queue to determine whether a message has arrived on the channel. The value of the address in the queue indicates the location of the message in a configuration-specific form that the vcuRecv( ) routine expects.

The socket task 122 handles messages for each channel using a variety of software routines. Of these routines, vcuSend( ), vcuRecv( ), and vcuFree( ) are the most prominent. Additional routines are shown and described in FIGS. 3(a) and 3(b). FIG. 4 depicts the debugging levels for the vcuPrintDebug( ) routine described in FIG. 3(b). With respect to the vcuCommInit( ) routine, that routine operates to (1) allocate memory for storing errors locally, (2) create a queue for sending error messages between boards, (3) creates a memory partition for the sections of memory that must be accessible between boards, and (4) spawns the VcuSocket task.

The embodiment of the present disclosure preferably uses three variations of the vcuSend( ) routine, with the particular vcuSend( ) routine being used depending upon the channel configuration of the channel involved in the data transfer. However, it should be noted that a vcuSend( ) routine that requires more information than another vcuSend( ) routine can preferably be substituted for that other vcuSend( ) routine.

For the routine int vcuSend(int destination, int channel, char* data, int dataSize, int flags), vcuSend( ) operates to send the data specified by data to the destination specified by destination through the channel specified by channel. The flags options identify the message's priority: VCU_MSG_NORMAL is the default flag for normal messages and VCU_MSG_URGENT is the flag used to identify messages having priority. The priority flag is written into the message's header. Urgent messages are moved to the front of the send and receive queues rather than the rear. With this vcuSend( ) routine, if the specified channel is configured such that data is pushed from the sending board (e.g., the "push to pool on receive" configuration or the "push to buffer on receive" configuration), an error will result. If the channel is configured to send data within the board (e.g., a "copy to self" configuration) and this vcuSend( ) routine is called, the simpler vcuSend( ) routine is substituted. In normal operation, this vcuSend( ) routine returns to the application that called it the value VCU_SUCCESS on a successful send, the value VCU_BAD_CHANNEL if the channel value is invalid, and VCU_POOL_FULL if no memory slot is available in the Tx memory pool. These values are set in the file vcuDefines.h.

For the routine int vcuSend(int destination, int channel, char *data, int dataSize, int &buffer, int id, int flags), vcuSend( ) operates to, on the initial call, send an announcement to the specified destination that new data is available. The data remains in the sending board's memory pool where it can be updated in an inexpensive manner. The location of this data in the memory pool is provided in the value of buffer. Subsequent calls to this vcuSend( ) routine operate to update the data by overwriting the data stored at buffer with a new value. If the receiver has not yet received the data, the system on the sender's side updates the data without sending a new announcement to the destination. If the receiver has already received the data, subsequent calls to this vcuSend( ) routine result in (1) the data update being written to a new buffer value and (2) a new announcement being sent to the destination (to thereby inform the receiving board where the new data can be found). The id value is preferably constant and unique to the application (at least unique to the application relative to the other applications also on the board) and is used to determine whether the destination has in fact received the data; when id differs from the application's id, then a new memory location is returned, as if the application made the initial call. The only indication that the application receives when a new memory location is selected is that the value of buffer changes.

The flag options for this vcuSend( ) routine are the same as described above in connection with the first vcuSend( ) routine. Further, it is worth noting that configurations using this vcuSend( ) routine directly cannot use multicast destinations. Further, if the specified channel is configured for sending data within a single board (e.g., a "copy to self" configuration), then the vcuSend( ) routine described below will be called instead. Also, if the specified channel is not configured to have data pushed from the sending board, then the first vcuSend( ) routine described above will be called instead. Further still, as with the first vcuSend( ) routine, this vcuSend( ) routine returns the value VCU_SUCCESS on a successful send, the value VCU_BAD_CHANNEL if the channel value is invalid, and VCU_POOL_FULL if no memory slot is available in the Tx memory pool.

Lastly, for the routine int vcuSend(int channel, char* data, int dataSize, int flags), vcuSend( ) operates to send the data specified by data to the local memory pool through the channel specified by channel. The flag values operate as they do with the other vcuSend( ) routines. This vcuSend( ) routine is used for sending data within a single board, and as such the channel should be configured with the "copy to self" configuration type. This vcuSend( ) routine returns the value VCU_SUCCESS on a successful send, the value VCU_BAD_CHANNEL if the channel value is invalid, and VCU_POOL-FULL if no memory slot is available in the Rx memory pool.

To receive data, the embodiment of the present disclosure preferably uses the vcuRecv( ) routine: int vcuRecv(int channel, char* &data, int &dataSize, int flags). The vcuRecv( ) routine operates to receive the next message waiting in the Rx queue for the channel specified in the argument, if such a message exists. The flag options for vcuRecv( ) are VCU_NO_BLOCK (which is the default setting) and VCU_BLOCK. When the flag is VCU_BLOCK, the vcuRecv( ) routine blocks until the data arrives. However, it is worth noting that a timeout option can be used to end the block after the passage of a specified amount of time.

If the specified channel is configured for "copy to buffer on receive", "push to buffer on receive", or "queue on send", then the vcuRecv( ) routine copies the data specified by the message in the Rx queue, for the channel specified in the argument, across the bus and into the location specified by data. The system assumes that the memory location specified by data has already been allocated by a call to the routine vcuAllocateBuffer( ) which is described in greater detail in FIG. 3. For other configurations, the data variable is set to point to the location of the data in a local memory pool on the receiving board. For any configuration, the size of the data transfer is written to dataSize.

In normal operation, the vcuRecv( ) routine returns (1) VCU_SUCCESS on a successful receive, (2) VCU_BAD_CHANNEL if the channel value is invalid, and (3) VCU_POOL_FULL if no memory slot is available in the Rx memory pool of the receiving board. On a non-blocking receive call to vcuRecv( ), VCU_RECV_EMPTY is returned if no message is queued. These values are set in the file vcuDefines.h.

The routine int vcuFree(int channel, const char *data) operates to free memory located on the receiver-side memory pool for the specified channel and the specified data location. However, it should be noted that this routine should not be called for the configuration types: "copy to buffer on receive", "push to buffer on receive", "queue on send", or "overwrite on send", all to be explained in more detail below. However, the system can be designed such that vcuFree( ) is called by an application after all vcuRecv( ) routines, wherein the vcuFree will have no effect for channels with configuration types that don't require the freeing operation.

Channel Configuration Types:

The embodiment of the present disclosure preferably allows user to define (and redefine) the transmission characteristics of at least one communication channel, and more preferably, each communication channel. It is preferred that the user be given the ability to define (and redefine) aspects such as: the number of communication channels, the maximum size of a single data transfer for each channel, the conditions under which DMA is used for data transfers across the bus, and how each channel is to handle data transfers.

In an implementation of the present disclosure, the user is provided with a plurality of selectable configuration types which include a variety of different settings for these aspects in a single package. The preferred configuration types for the present disclosure are: (1) "copy on send", (2) "copy to pool on receive", (3) "copy to buffer on receive", (4) "push to pool on receive", (5) "push to buffer on receive", (6) "queue on send", (7) "copy to self", and (8) "overwrite on send". FIG. 5 is a table that provides a description of how each configuration type can be handled on the sending side and receiving side. It is worth noting that it is preferable to use the sender side sequence for push to pool on receive for send calls with all configurations. Similarly, it is preferable to use the receiver side sequence for either copy to buffer on receive or push to pool on receive for receive calls with all configurations.

With reference to FIGS. 5, 6(a), and 7(a), the "copy on send" configuration type will now be described. Relative to the other configuration types, the copy on send configuration provides the lowest latency for receive calls. Further, the copy on send configuration does not allow for an application-defined buffer, and if the receiver-side memory fills up, the choice is between blocking for a free slot (which blocks all VCU communications) and losing the message. With the copy on send configuration, the receiving board operates to pull the data across the VME bus into a local memory pool as soon as the sending board sends the event indicating that data has arrived.

FIG. 6(a) depicts the sending sequence for this configuration. When vcuSend( ) is called from an application 108 so that the application 108 may send data across the VME bus 110 to a remote receiving board, a message request is enqueued with the VCU Tx Task within the communication utility 106. The VCU Tx Task waits for the enqueued message request, and when it reads the enqueued message request from the msgQ (action 1000), it copies the request's header and data to the Tx memory pool within the communication utility 106. Thereafter, the VCU Tx taskflushes the cache of the memory location in the pool.

Thereafter, mailbox handler for mailbox 1 on the receiving board is informed via an interrupt action 1002 of the memory location in the Tx memory pool of the header and data. On the destination board, then, the mailbox handler for mailbox 1 enqueues the received interrupt value and writes (action 1004) the received value (with the first byte indicating status) to mailbox 2 on the sending board.

Thereafter, the sending board VCU Tx Task reads from the msgQ of the sending board's mailbox 2 (action 1006), and returns a fail value if a timeout occurs. This status is then provided to the application 108 via action 1022.

Meanwhile, the destination board's VCU Socket Task reads the enqueued value from the msgQ for mailbox 1 on the destination board (action 1008), which is interpreted as a memory location on the VME bus. Next, via action 1010, the VCU Socket Task looks across the bus to read the channel, priority, and data size portions of the message header from the memory location value provided by mailbox 1 of the destination board. Thereafter, with action 1012, the VCU Socket Task copies the data across the bus, including the data size portion of the header, to the Rx memory pool (not shown).

Next, the VCU Socket Task converts the received memory location to indicate that the destination bord is sending this event and then adding 0x20000000 to indicate a memory release action, and writing (via action 1014) this converted value to the mailbox location for mailbox 1 on the sending board (thereby allowing the memory on the sending board to be freed).

On the sending board, the mailbox handler for mailbox 1 then writes the received value (with the first byte masked out) to mailbox 2 on the destination board (action 1016) to thereby acknowledge that the mailbox interrupt was received. Next the mailbox handler for mailbox 1 on the sending board enqueues the received value in msgQ. Meanwhile, back on the destination board, the mailbox handler for mailbox 2 enqueues the value it received from mailbox 1 of the sending board into msgQ.

Thereafter, the destination board's VCU Socket task reads the msgQ (action 1018) (an error is recorded if a timeout occurs) and enqueues the Rx memory pool memory location in the Rx queue.

On the sending board, the VCU Socket Task reads the enqueued msgQ (action 1020) and converted the value found therein to a local memory value. It thereafter releases this memory location in the Tx memory pool.

FIG. 7(a) illustrates the receiving sequence for the copy on send configuration. The application 108 calls vcuRecv( ) and enqueues a receive request with msgQ. The VCU Rx Task of the destination board's communication utility reads the request from the msgQ (action 1030) and in turn calls vcuSocket.Recv( ), which in turn receives from the Rx queue, based on the channel (each channel preferably has an Rx queue where messages sent to that channel reside until vcuRecv( ) is called). After reading the message stored in the Rx queue, the vcuSocketRecv( ) routine puts the data, data size, channel configuration, and receive status information found in the message into a reply structure. The VCU Rx Task then enqueues the reply structure in msgQ.

Meanwhile, the application's vcuRecv( ) call is waiting for this reply and reads it from the msgQ (action 1032). The data location and data size are written as arguments and a status is returned to the calling application.

With reference to FIGS. 5, 8(a), and 9(a), the "copy to pool on receive" configuration type will now be described. With the copy to pool on receive configuration type, the receiving board pulls the data across the VME bus when the vcuRecv( ) routine is called by an application resident on the receiving board. This data is pulled into a local memory pool on the receiving board.

In FIG. 8(a), the application 108 calls vcuSend( ) to enqueue a request to send data to a receiving board over a particular channel with msgQ. The VCU Tx Task thereafter reads the request from msgQ (action 1040) and calls the vcuSocket.Update( ) routine which operates to (1) copy the header and data from the message request to the Tx memory pool, (2) flush the cache of the memory location in the Tx memory pool, and (3) write the memory location in the Tx memory pool to which the data and header were written (as seen from the VME bus 110) to mailbox 1 on the receiving board (action 1042). On the receiving board, the mailbox handler for mailbox 1 writes the value received from the VCU Tx Task back across the VME bus to mailbox 2 on the sending board (action 1044), wherein the first byte written to the sending board indicates status. Thereafter, the mailbox handler for mailbox 1 on the receiving board enqueues the received value with msgQ.

Meanwhile, on the sending board, the mailbox handler for mailbox 2 enqueues the value received from the mailbox handler for mailbox 1 on the receiving board with msgQ. The vcuSocket.Update( ) routine then reads this value from the msgQ (action 1046). If a timeout occurs, an error is returned. From the value read from msgQ, the vcuSocket.Update( ) routine can identify the status of the message request sent by the application 108. This status is returned and enqueued with msgQ for subsequent reading by the vcuSend( ) routine called by the application 108 (action 1048).

On the receiving board, the VCU Socket Task reads the value enqueued with msgQ by the mailbox handler for mailbox 1 (action 1050). This value is interpreted as a memory location on the VME bus 110. Thereafter, the VCU Socket Task reads the channel and priority information from the header at the received memory location (action 1052). Thereafter, this memory location is enqueued in the vcuSocket queue.

FIG. 9(*a*) illustrates the receiving sequence for the copy to pool on receive configuration. An application 108 residing on the receiving board will call the vcuRecv( ) routine enqueue a receiving request with msgQ. Thereafter, the VCU Rx Task reads this enqueued request from msgQ (action 1054), and calls vcuSocket.Recv( ).

The vcuSocket.Recv( ) routine operates to receive a VME bus address that has been enqueued in the vcuSocket queue, based on the channel. Next, it reads the data size from the header at this memory location (action 1056), and copies the data at the VME bus address to the Rx memory pool (action 1058). Thereafter, it converts the received memory location to indicate the local board as sending this event, adds 0x20000000 to indicate a memory release action, and writes this converted value to the mailbox location of mailbox 1 on the sending board (action 1060).

Meanwhile, the mailbox handler for mailbox 1 on the sending board writes the received value (with the first byte masked out) to mailbox 2 on the receiving board (action 1062) and enqueues this received value with msgQ. The VCU Socket Task on the sending board then reads the enqueued value (action 1068) and converts the received value to a local memory value and releases this local memory location for this value from the Tx memory pool.

Back on the receiving board, the mailbox handler for mailbox 2 enqueues the value received from the mailbox handler for mailbox 1 on the sending board with msgQ. The vcuSocket.Recv( ) routine reads the enqueued value from msgQ (action 1064). If a timeout occurs, an error is recorded. The VCU Rx Task then puts the data location, data size, channel configuration, and receive status in a reply structure which is enqueued with msgQ for retrieval by the vcuRecv( ) routine called application 108 (action 1066). The vcuRecv( ) routine writes the data location and data size to input arguments and returns the status to the calling application.

Figure 11A:
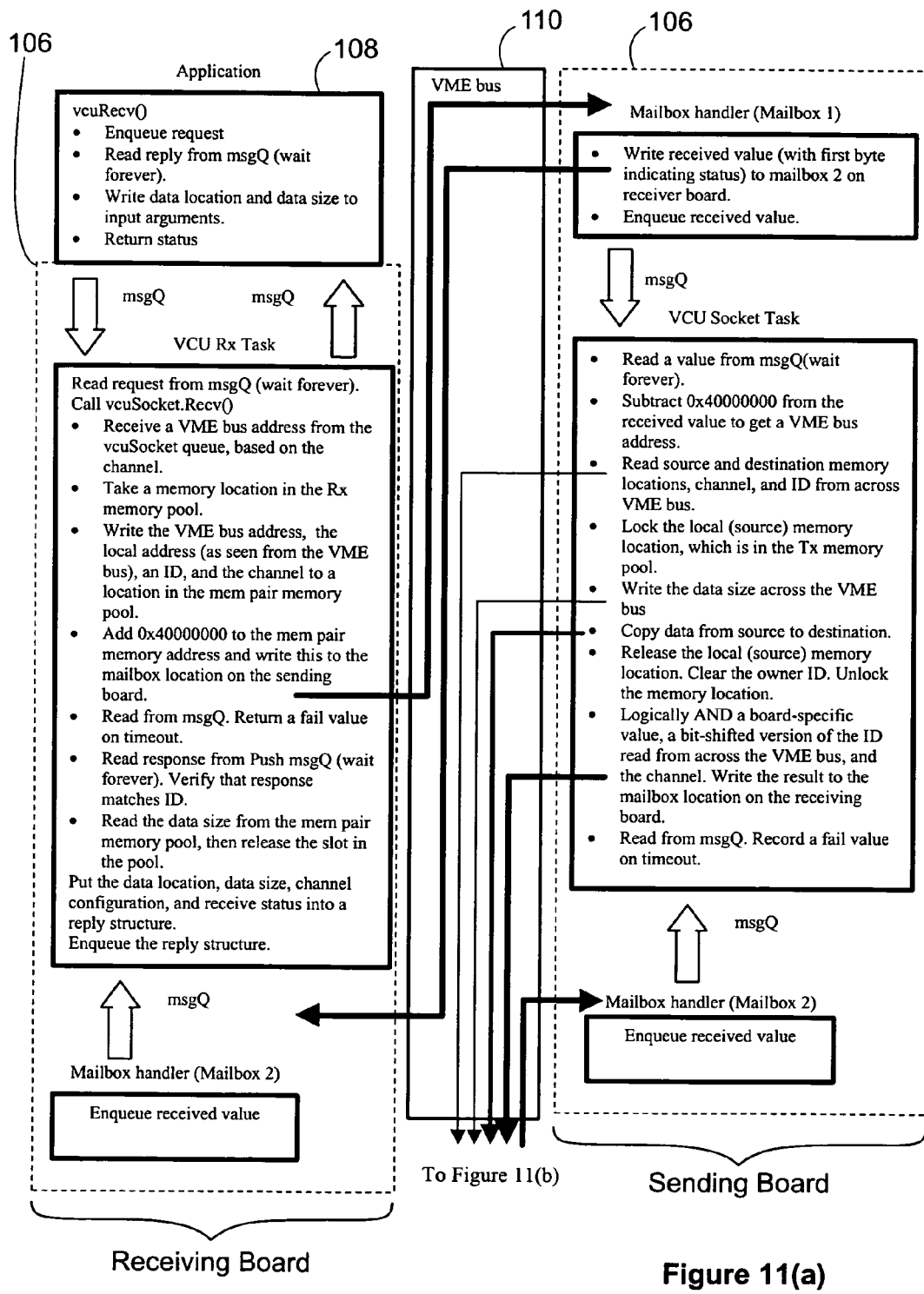
FIGS. 11(a) and (b) are block diagrams illustrating a preferred receiving sequence for the "push to pool on receive" configuration.

With reference to FIGS. 5, 10, 11(*a*), and 11(*b*), the "push to pool on receive" configuration type will now be described. This configuration provides the slowest per transfer rate of the different configuration types, but allows for fast high-speed updates of data waiting to be copies across the VME bus. It is also worth noting that this configuration does not allow for multicast transfers. With the push to pool on receive configuration, the sending board pushes the data across the VME bus when the vcuRecv( ) routine is called by an application on the receiving board. This push is orchestrated by a mailbox interrupt call made by the receiving board. With this configuration, the sending board can call the vcuSend( ) routine repeatedly to overwrite the previous data waiting to be sent, until the receiving board requests a data push. Overwriting data does not require any VME bus traffic, and as such is low latency compared to other data sends. It is invisible to the sending application whether the data updates overwrite old data or use a new memory location slot, unless explicitly checked. This configuration type is designed and preferred for use with data transfers where receipt by the receiving board of the most recent and accurate data is needed—such as with transfers of positional data.

FIG. 10 illustrates the sending sequence for the push to pool on receive configuration. Pertinent to this configuration are the actions by the vcuSocket.Update( ) routine in trying to update data on subsequent calls to the vcuSend( ) routine by the application 108. The sending board tries to use the same memory location for a high-speed update by overwriting the previously stored data. If an overwrite is possible, the sending board can rely on a previously sent interrupt to the receiving board because the receiving board will still find the updated data given the same memory location has been used for the update as had been used for the original data. However, if the original data has already been obtained by the receiving board and its memory location released, the VCU Tx Task uses a new memory location in the Tx memory pool for the updated data, thereby necessitating a new mailbox interrupt to the receiving board to inform the receiving board that it has newer data waiting. The receiving board can obtain this data on a subsequent vcuRecv( ) call.

FIGS. 11(*a*) and (*b*) illustrate the receiving sequence for the push to pool on receive configuration. When an application 108 on the receiving board calls the vcuRecv( ) routine, the receiving board retrieves the VME bus address for the message from msgQ, and takes a memory location in the Rx memory pool. The receiving board next pairs the VME bus address with the Rx memory pool location, and sends a mailbox interrupt across the VME bus to the sending board to request a push between the paired memory locations. After the sending board has pushed the data from the VME bus location to the paired Rx memory pool location, the sending board sends a mailbox interrupt to the receiving board to inform the receiving board that the push is complete. Thereafter, the sending board frees the memory location where that data had been stored. At this time, the data exists only on the receiving board in the Rx memory pool. The freed memory location is marked as unusable for updating so that subsequent updates of the data will have to be stored in new memory locations, thereby necessitating a new mailbox interrupt to the receiving board is an update actually occurs.

The "copy to buffer on receive" configuration type closely parallels the "copy to pool on receive" configuration type described above, with the exception that the receiving board pulls the data across the VME bus into a buffer specified by the vcuRecv( ) call rather than the Rx memory pool. Similarly, the "push to buffer on receive" configuration type closely parallels the "push to pool on receive" configuration type described above with the exception that the data copied across the VME bus is copied into a buffer specified in the vcuRecv( ) call rather than the Rx memory pool.

With reference to FIGS. 5, 12, and 13, the "queue on send" configuration type will now be described. This configuration is significantly faster than the other configuration types for messages that are less than 64 bytes in size, but it is significantly slower than the other configuration types for larger messages. Also, this configuration type requires an application-defined buffer. With reference to FIG. 12, the queue on send configuration, the receiving board pulls the data across the VME bus into a local queue as soon as the sending board sends the data. When an application 108 calls the vcuSend( ) routine, the receiving board is informed of the send by a mailbox interrupt, and thereafter copies the data to its own local queue, which is the same queue that delivers the data address in other configurations. After the copy completes, the receiving board uses a mailbox interrupt to so notify the sending board. The memory on the sending board can then be freed, and the data exists only on the receiving board. The location of the data on the receiving board is then enqueued by the receiving board, where it awaits the next vcuRecv( ) call.

With reference to FIG. 13, when the receiving board calls the vcuRecv( ) routine, the receiving board reads the data from the msgQ and copies it into a buffer that is specified in the vcuRecv( ) call.

With reference to FIGS. 5, 14, and 15, the "copy to self" configuration type will now be described. With this configuration, the data does not cross the VME bus; instead it is written into a local memory pool for incoming messages when vcuSend( ) is called. The location of the data is enqueued on the receiving board (which is the same as the sending board), where it awaits the next vcuRecv( ) call. When vcuRecv( ) is called, the board reads the data location from the queue and returns it to the application 108. FIG. 14 illustrates the sending sequence for this configuration, and FIG. 15 illustrates the receiving sequence. The "copy to self" configuration is useful for data transfers within a single board, and allows for development and deployment on a single board system before moving to a multi-board system.

With reference to FIGS. 5, 16, and 17, the "overwrite on send" configuration type will now be described. With this configuration, the receiving board pulls the data across the VME bus into a local buffer as soon as the sending board sends the data. This local buffer serves as a double buffer, with writes going to the back buffer, and with the buffers being swapped when the data is received (with reference to FIG. 2, the double buffer would be in the place of the incoming message pool for this configuration type). The overwrite on send configuration always provides data once any data has been sent. It operates as a "best available data" channel configuration. Further, with this configuration, no pools or queues exist to fill up and messages may be overwritten with every send. However, bandwidth on the VME bus is wasted because every message is copied across the VME bus, while some of them are overwritten on the receiving board, thereby resulting in waste of the time spent transferring the overwritten data.

FIG. 16 illustrates the sending sequence for the overwrite on send configuration. When an application calls vcuSend( ), the receiver board is informed of the send by a mailbox interrupt, and the receiving board then copies the data to the back local buffer. After this copy operation has completed, the receiving board uses a mailbox interrupt to inform the sending board that the memory location of the data on the sending board can be freed. After freeing the sending board's memory, the data exists only the receiving board side. No location needs to be queued by the receiving board because the receiving board will know which buffer is the front buffer and which buffer is the back buffer.

FIG. 17 illustrates the receiving sequence for the overwrite on send configuration. When the vcuRecv( ) routine is called by an application on the receiving board, the receiving board first checks whether new data has been written to the back buffer. If it has, then the front and back buffers are swapped and the address of the front buffer is returned.

Figure 6B:
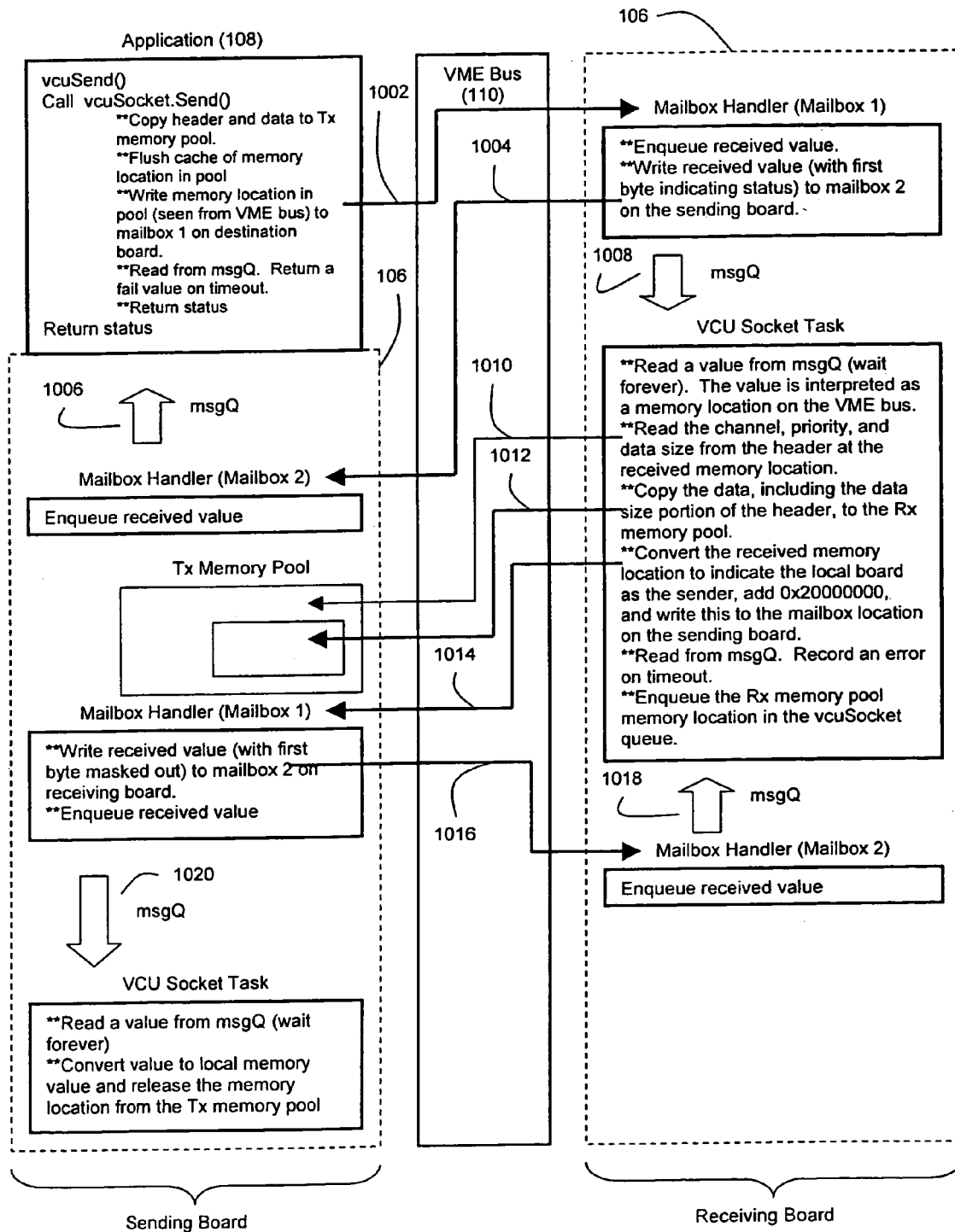
Figure 8B:
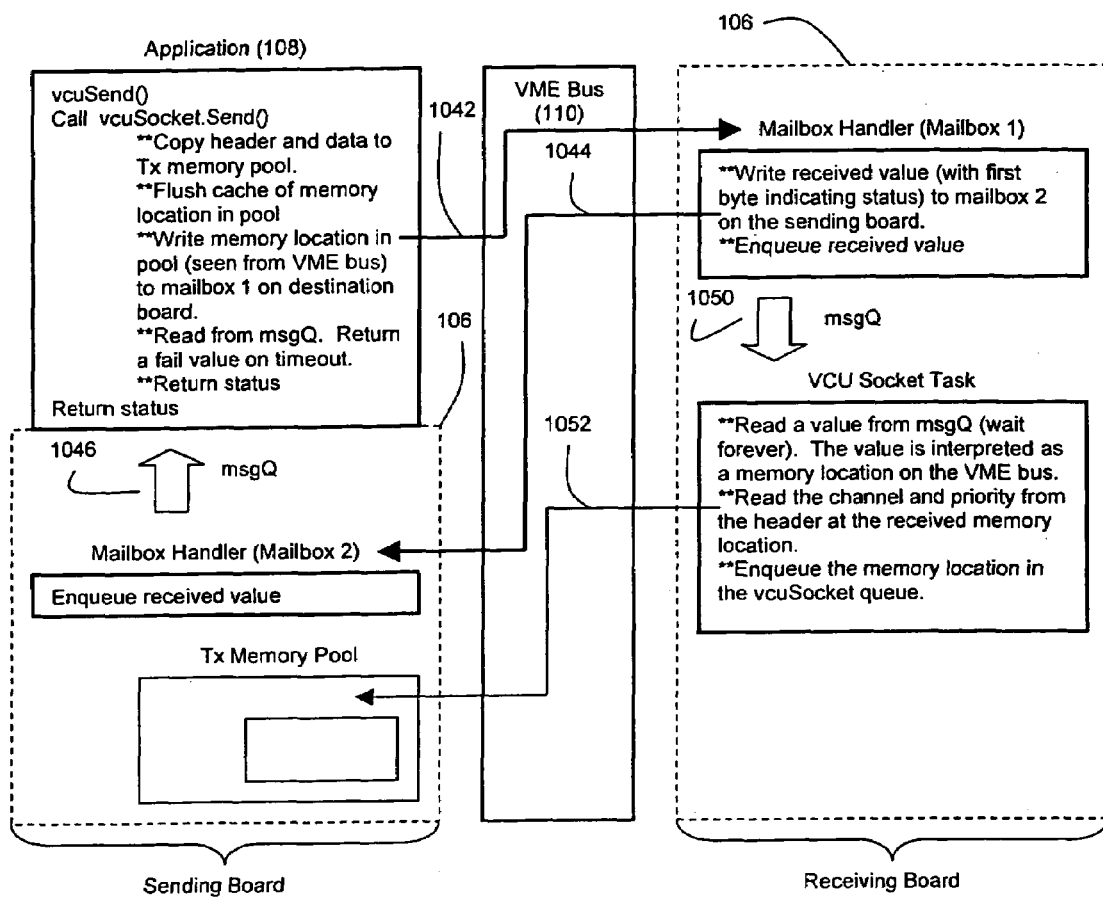
FIGS. 8(b) and 9(b) are block diagrams illustrating preferred modified sending and receiving sequences for the "copy to pool on receive" configuration, wherein the VCU Tx Task and VCU Rx Task have been removed.
Figure 9B:
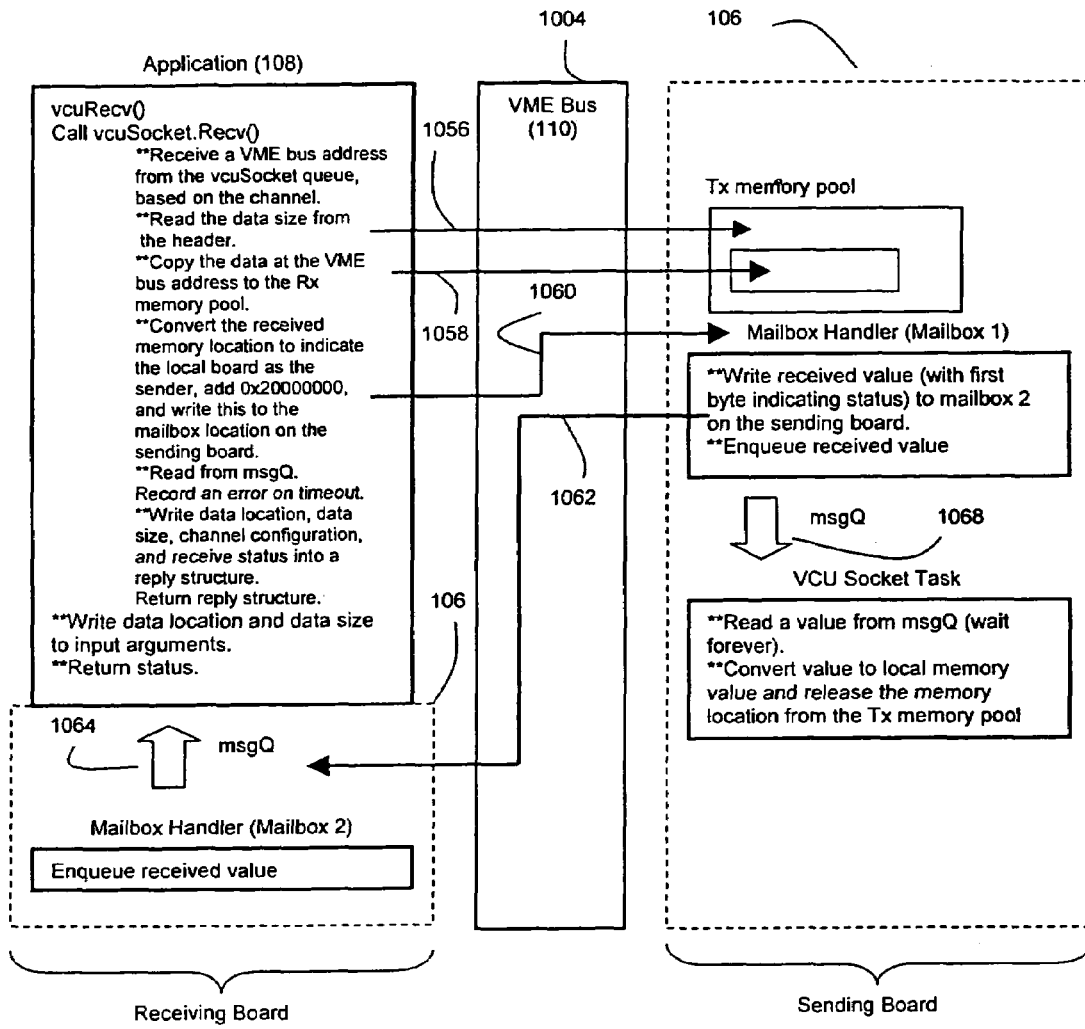

It is worth noting that the VCU Tx Tasks and VCU Rx Tasks depicted for the various configuration types can preferably be removed, with the functionality of those tasks being shifted to the vcuSend( ) and vcuRecv( ) routines respectively. FIGS. 6(b) and 7(b) depict this modification for the sending and receiving sequences for the copy on send configuration. FIGS. 8(b) and 9(b) depict this modification for the sending and receiving sequences for the copy to pool on receive" configuration. The other configuration types' sending and receiving sequences can be similarly modified. In doing so, messaging delays between the VCU 106 and vcuSend( ) and vcuRecv( ) routines are reduced. Also, with respect to the freeing sequence depicted in FIG. 18, it is worth noting that the messaging between the vcuFree( ) routine and the VCU 106 can also be eliminated by shifting the tasks of the VCU 106 in this sequence to the vcuFree( ) routine.

FIG. 18 illustrates the freeing sequence for the receiving board's Rx memory pool. When an application calls vcuFree( ), this freeing request is enqueued with msgQ. The receiving board reads this request from the msgQ and calls vcuSocket.Free( ), which releases the specified memory from the Rx memory pool, based on the channel.

User-Defined Configuration:

To define and redefine the configurations of the various channels in the communication utility, a VCU autoConfig parser can be used to generate three files that are part of the VCU software: vcuConfig.cpp, vcuConfig.h, and vcuInterface.h. The parser can be implemented in a graphical user interface (GUI) version that runs on a PC (see FIG. 19(a)). The parser can also be implemented in a command line version that runs on a Unix workstation (see FIG. 19(b)). The GUI version can read a configuration file such as the one depicted in FIG. 30 directly, and can also process user changes to the configuration file. That is, in addition to the creating the three files that are part of the VCU system from the configuration file, the GUI can also produce the configuration file itself. This action is indicated by the two-headed arrow in FIG. 19(a) that connects the configuration file with the parser. With the command line version of FIG. 19(b), the configuration file specified by user input is retrieved by the parser and parsed thereby to create the three VCU files. The same configuration file of FIGS. 19(a) and (b) can be used with either the GUI or the command line version.

Figure 19A:
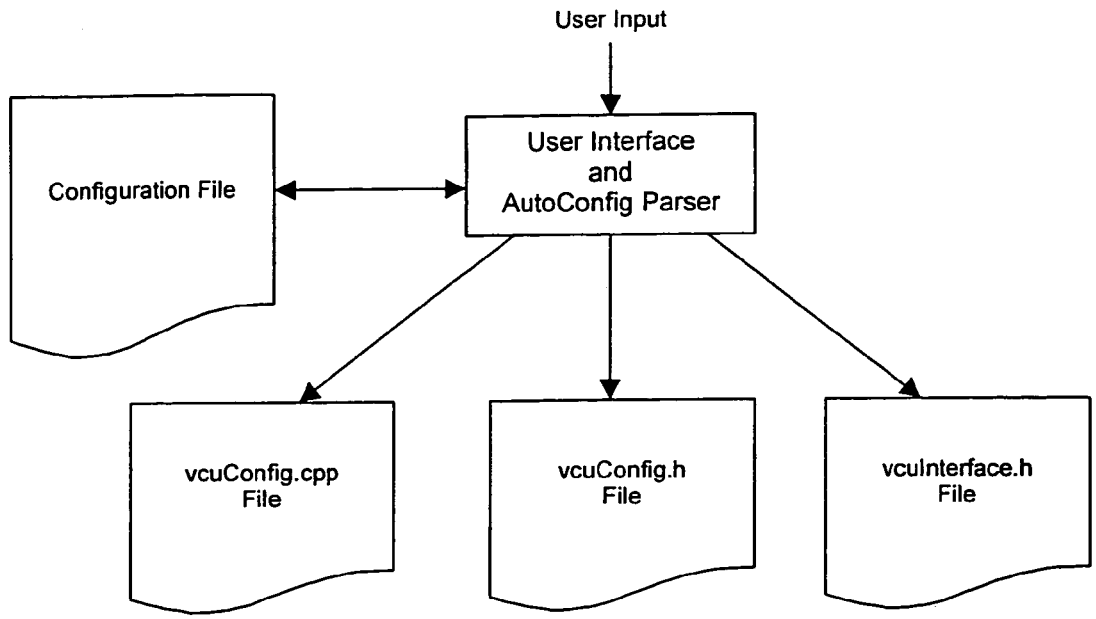
FIG. 19(a) depicts the generation of the VCU code through processing of a user-defined configuration file.
Figure 19B:
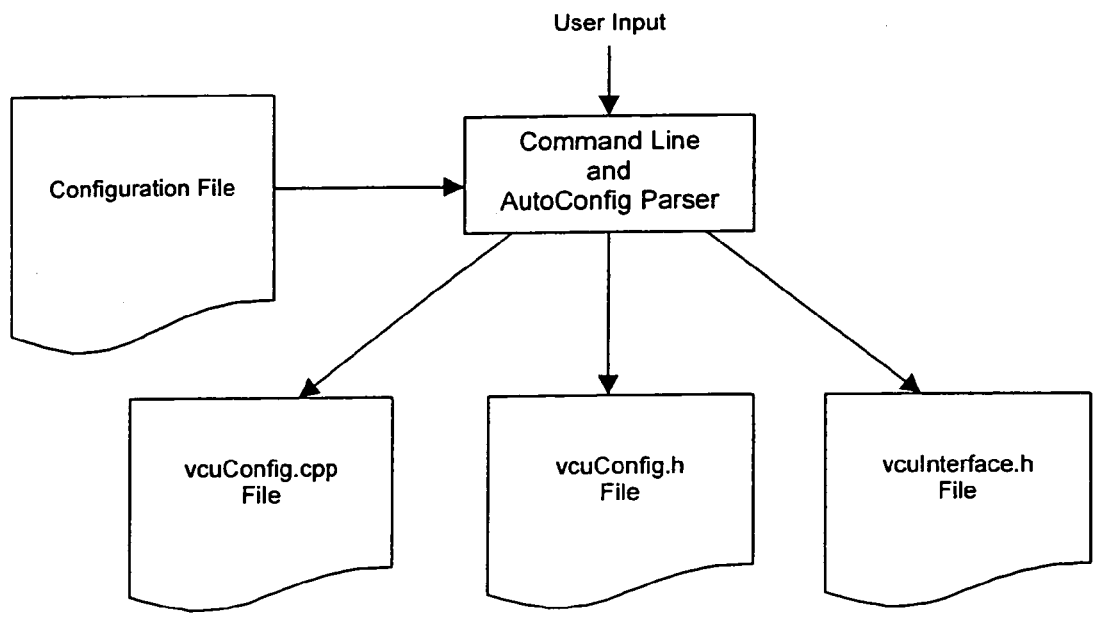
FIG. 19(b) depicts the generation of the VCU code through user-specification of a configuration file via a command line interface.

With FIGS. 19(a) and (b), once a user has indicated that the configuration file is to be processed by the parser, the autoConfig parser (1) takes in the configuration file as input, (2) parses and processes the configuration file, and (3) outputs the three VCU files needed for the system: vcuConfig.cpp, vcuConfig.h, and vcuInterface.h. FIGS. 20(a)-(d) illustrate the VCU configure file grammar Backus-Naur form (BNF) used by the parser in this process.

The GUI version of the parser and user interface will be discussed first. The GUI can be built and used on a PC, preferably using Microsoft Visual C++ version 6.0. The GUI can operate to (1) read a configuration file and display its values, (2) modify an existing configuration file, or (3) build up a configuration file from scratch. From the configuration information defined by a user, the GUI can write the three VCU files (vcuConfig.cpp, vcuConfig.h, and vcuInterface.h). The GUI can also write a configuration file to store the parameters for the channels' and system's configuration, wherein this configuration file is readable by both the GUI version and the command line version of the parser.

FIG. 21 depicts the initial window displayed for the GUI when the vcuConfig.exe application is started. A window 200 is shown through which the user can specify a configuration file to load. If no configuration file is specified, the GUI proceeds to display an empty configuration with no channels and default system values. If a configuration file is specified, the GUI proceeds to display the values in that file. If the specified configuration file includes formatting errors, then the load is cancelled and the GUI acts as if no file were specified.

FIG. 22 depicts the primary dialog window 202 of the GUI. From this window, the user can define the primary parameters for each channel's configuration. This window also provides access to dialog windows for controlling other configuration parameters, as will be explained below. The values found in the various fields of this window dictate the configuration file and the three VCU files.

Through fields 204, 208, and 212, and buttons 206 and 210, the user can control the number of communication channels for the system. Field 204 specifies the total number of channels. It is preferred that the maximum number of channels for the system be 4096, however, as would be appreciated by one of ordinary skill in the art, more or fewer channels can be used with the system. If the user enters a value greater than this maximum setting, the number of channels will be reset to zero. The "insert channel" button 206 operates to insert a channel immediately before the channel specified in field 208. The newly-inserted channel will be include identical settings as the channel of field 208, subject to any modifications provided by the user. The "delete channel" button 210 operates to delete the channel specified in field 212.

The user can specify the number of boards that will exist in the system via field 214. This parameter is preferably only used when board-specific parameters are set in the "Board Configuration" dialog window of FIG. 24.

The majority of space within the dialog window 202 is devoted to a listing of channels in rows, wherein each listed channel has a plurality of fields for controlling various channel parameters.

The user can define the maximum size of data that can be transported through a particular channel via fields 216, 218, and 220. Field 216 is an "untyped" checkbox. If this box has been checked, then the user defines the channel's maximum data size through the "size" field 218. If a channel's "untyped" box has not been checked, the channel's maximum data size is controlled through the "class" field 220. The class can be specified with "struct" or "class" preceding the name. If the class name is specified without one of these modifiers, the system assumes the name to be a class rather than a structure. The terms "class" and "struct" are used in accordance with their C++ syntax meanings.

The user can define the name of each channel in field 222. Further, in field 223, the user can define the channel's configuration type, preferably via a dropdown menu 226 that presents a list of available configuration types for the channel.

Through the "more" button 228, the user is presented with the dialog window of FIG. 23, from which the user can define additional parameters for a particular channel.

Through the "store values" button 230, the user is presented with the dialog window of FIG. 26 that aids in writing the current parameters for the channels to a configuration file. This button can also be used to store the values for later access. The written configuration file can also be used with the command line version of the autoConfig parser.

The "finish" button 232 is selectable by the user to open the dialog window of FIG. 27 which aids in writing the files vcuConfig.cpp, vcuConfig.h, and vcuInterface.h. If the write is not cancelled, user-selection of the finish button also closes the GUI.

The "cancel" button 234 is selectable by the user to close the GUI without performing any actions.

The "system config" button 236 is selectable by the user to open the dialog window of FIG. 25, through which the system's parameters can be set.

Lastly, the "step forward" button 238, the "step back" button 240, the "previous 32" button 242, the "next 32" button 244, the "jump to start" button 246, and the "jump to end" button 248 operate to correspondingly change the set of displayed channels. In an embodiment, the GUI only displays 32 channels at a time, but can manage a much larger number of channels (preferably 4096). The "step forward" button and "step back" button operate to, respectively, increment or decrement the channels in the displayed set by one. For example, when step forward is selected while channels 1-32 are displayed, the resultant channels will be 2-33. The "previous 32" and "next 32" buttons operate to increment or decrement in units of 32. The "jump to start" button operates to display channels 1-32, while the "jump to end" button operates to display the last set of channels. It is preferred that these buttons only be enabled when the number of channels exceeds 32.

FIG. 23 depicts a preferred dialog window 250 through which the user can define aspects of a communication channel other than those listed in the dialog window of FIG. 22. As noted above, the user is presented with window 250 upon selection of the "more" button for a channel in the dialog window 202. The user-definable parameters that are displayed are specific to the channel found in field 252, wherein that channel possesses the configuration type found in field 254.

Through fields 256, 258, 260, and 262 the user can define the size of the channel's receive queue, receive pool, transmit pool, and push queue respectively. FIGS. 28 and 29 describe the preferred setting for these sizes by configuration type. These preferred values assume worst-case application use, and best-case internal performance. If the system is so heavily loaded with data transfers that it does not have time to process one send before another starts, additional buffer space may be required. Because the transmit pool is especially dependent on the system load (a command to release a transmit pool slot comes from a remote board, so there is a delay between the command to release it and the actual release, wherein the delay is dependent upon the system load), its size should be given attention, and extra slots should be allocate thereto if the system is a heavily-loaded one. Also, while the values in FIGS. 28 and 29 are preferred values, it should be understood that practitioners of the disclosure may choose to select values other than those shown in FIGS. 28 and 29.

Checkbox 264 for "guaranteed delivery" is selectable by the user to control how the channel will handle overflow in cases where returning an error is not an option. When box 264 is checked (meaning that guaranteed delivery has been selected), the system will block transmissions across the VME bus until a slot becomes available. This blocking occurs such that the entire VCU system is blocked. When box 264 is not checked, messages that result in an error condition are lost. While the receiving board records the error, neither the sending board nor the receiving application are directly informed of the error.

The "event handler" is a routine that is called as soon as a new message is available. Checkbox 266 and field 284 are user-definable for "use event handler" such that whatever name is entered in field 284, if box 266 is checked, is called by the software. For most configuration types, the event handler is called immediately after a new message has been place in the queue. With the "queue on send" and "overwrite on send" configurations, the event handler is called before the sender is informed that the message has been pulled across the VME bus. The event handler can be thought of as an Interrupt Service Routine (ISR) because its actions occur in the midst of the primary receiving task, slowing its ability to respond to subsequent messages.

Checkboxes 268, 272, and 274, together with field 270 operate to provide the user with control over the conditions under which direct memory access (DMA) is used for VME bus data transfers. DMA tends to be more efficient for large blocks of data than other copy types, but it is less efficient for smaller blocks of data due to the overhead of setting up the DMA. Through boxes 272 and 274, the user can define the channel to either always use DMA for data transfers or never use DMA. Through box 268 in conjunction with field 270, the user can define the minimum message size at which DMA is used. The default values for field 270 for each configuration is preferably set to the empirically found values of: (1) 64 bytes for the "copy on send", "copy to pool on receive", and "copy to buffer on receive", and "overwrite on send" configuration types, and (2) 400 bytes for the "push to pool on receive" and "push to buffer on receive" configuration types. The "queue on send" and "copy to self" configurations preferably do not have a DMA option.

The "OK" button 276 operates to submit the user-defined values and returns the user to the primary dialog window 202 of FIG. 22. The "board info" button 278 operates to take the user to the dialog window of FIG. 24 through which board-specific channel parameters can be set. The board count in field 214 of the primary dialog window 202 must be set if a board-level configuration of the memory allocation is desired.

The "restore defaults" button 282 is selectable by the user to restore the default settings for the parameters of window 250 (based on the channel's default settings for its configuration type). Lastly, the "cancel" button is operative upon selection by the user to return the user to the primary dialog window 202 without submission of any user-defined settings in window 250.

FIG. 24 depicts a dialog window 290 for defining the board configuration for the system. As noted above, this window is reached after user-selection of button 278 in the dialog window 250 of FIG. 23. The parameters displayed in window 290 are specific to the channel identified in field 292, and will be stored for only that channel. By default, all boards in the system have the same memory allocated for sending and receiving messages. That is, each board will, by default, have the same number of queues and pools, with the sizing thereof being the same for each board. However, when memory space is a concern, it is inefficient to have unused send or receive buffers allocated because, depending upon the board's configuration and how the channels on a board are configured, not all queues and pools on a board will be needed (or at least, will not be as consistently used). Window 290 allows the system to have its memory more efficiently allocated.

Each board in the system that is listed in window 290 (existent boards are the ones with active boxes 294 and 296 and non-faded text, wherein the number of boards is controlled via field 214 of window 202) includes checkboxes 294 and 296 for "send enabled" and "receive enabled" respectively. Through these boxes, a user can specify whether data can be sent or received by a particular board over a particular channel. The drawback to configuring the system at board level is that every action requires a check to determine whether sending or receiving is enabled. This extra check preferably occurs only for the channel where sending or receiving is disabled on at least one board, but should be done on every board. An attempt to send data on a channel and board where sending is not enabled results in a "bad channel" error.

FIG. 25 depicts the dialog window 310 through which the user can define system-wide parameters. Window 310 is reached following user-selection of button 236 in window 202 of FIG. 22. Files specified by the user in the "include files" field 352 declare data types to be used in the system. Each such file causes a "#include" line to be added to the vcuInterface.h file. The filenames are preferably specified by the user by whitespace only—no commas. To include the paths at compile time, it is preferred that the VCU_IN-CLUDES environment variable be set to indicate the paths for the header files before compiling the VCU. For example, a user can type the following:

setenv VCU_INCLUDES "-I/home/user/navStruct -I/home/alldata/headers"

to include the paths "/home/user/navStruct" and "/home/alldata/headers" when compiling.

The handler files specified by the user in the "handler files" field 354 are added to the vcuConfig.cpp file so that they can be compiled as part of the core VCU code. Paths can be included at compile time as described for the "Include" keyword.

Through the "mailbox queue size" field 312, the user can define the size of the msgQ leaving the mailbox ISR (the msgQ operates to hold values received by the mailbox interrupt until those values can be processed by the system). The ideal value for this size depends on the loading of the VCU, with larger loading requiring more memory. On overflow of the msgQ, the sending board is informed by an error return value.

Through the "memory pair pool size" field 324, the user can define the size of the memory pool for memory pairs, which is used in the "push . . . " configuration types. This memory pool is a board-wide memory pool that is used by all channels. Conservatively, the value for this field should be set to the maximum number of local sources of vcu Recv( ) calls on channels that are configured for "push . . . ". On overflow of this pool, the vcuRecv( ) routine returns an error.

Through the "debug printing on" checkbox 356, the user can add a printout of every value received in the mailbox interrupt that is properly queued. This printout comes before any processing of the value.

Through the "socket task priority" field 328, the user can define the priority of the task that processes the mailbox interrupts, which includes the receiver-side of a vcuSend( ) call and a lot of the communication for a vcuRecv( ) routine in a channel configured for "push . . . ". A preferred priority value is 100 (on a 0 to 255 scale, with 0 being the highest priority and 255 being the lowest priority).

Through the "automatic ack" checkbox 336 and "fail after" field 338, the user can define whether the automatic acknowledgement system is enabled for the VCU. With automatic ack turned off, the VCU uses only one mailbox interrupt per board. The drawback is that the sending board does not get a response to indicate whether a receiving board has received the message. Overflows of the mailbox queue are not reported when automatic ack is disabled. Through field 338, the user defines the delay for an acknowledgement from the receiving board before the message is assumed lost. Also, it should be noted that the vcuPing( ) routine is meaningless without the automatic ack being enabled.

Through the "memory partition address" field 340, the user can define the location of the memory partition created by the VCU for the portions of the VCU that require VME bus accessibility. This memory is assumed to be in the section of the memory mapped to the VME slave window, but no check is made. The default value is 0xd00000 . . . , and it should be early in the memory space.

Through the "memory partition size factor field 342, the user can define the size of the partition used after a minimum size is calculated. The default value is 1.2, and the user defined value will depend upon the amount of buffer space expected to be consumed when receiving "push to buffer on receive" messages. The minimum size includes neither overhead (due to memory alignment requirements and partition marking) nor any memory allocated in the partition by the vcuAllocateBuffer( ) routine. Only memory for the "push to buffer on receive" configuration type is allocated in the partition by the vcuAllocateBuffer( ) routine. In case of overflow, the vcuAllocateBuffer( ) routine returns an error value. If overflow occurs during initialization, an error message is printed.

Through the "memory partition base size" field 344, the user can define the base size of the partition, which gets added to the minimum size calculated elsewhere. A preferred value is 100. The base size should be used in conjunction with the memory partition size factor to size the partition for the system.

Through the "mailbox for data transfer" field 346, the user can define, preferably via a dropdown menu, the mailbox used by the VCU for inter-board communication. It should differ from the "mailbox for acknowledgements" value defined by the user in field 348 (also preferably via a dropdown menu). The "mailbox for acknowledgements" field identifies the mailbox used by the VCU for automatic acknowledgements.

Through the "slave window size (VME)" field 350, the user can define the size of the slave windows for boards in the system. The default value, 0x04000000, allows for an 8 board system, but requires proper configuration of the kernel described in the board's board support package (BSP). When 0x08000000 is used, the system can only support 4 boards, but the default kernel configuration can be used.

FIG. 26 depicts the dialog window 360 that appears when the user selects the "store values" button 230 in the primary dialog window 202 of FIG. 22. Through this window 360, the user defines the file to which the configuration parameters set via windows 202, 250, 290, and 310 are written. The user defines the filename in field 362. If no filename is specified in field 362, the file defaults to "vcuconfig.txt". Upon selection of either the "OK" button or "Cancel" button, the user is preferably returned to the primary dialog window 202 of FIG. 22.

FIG. 27 depicts the dialog window 370 that appears when the user selects the "finish" button 232 in the primary dialog window 202 of FIG. 22. Through this window 370, the user, in field 372, defines the directory to which the 3 VCU source files (vcuConfig.cpp, vcuConfig.h, and vcuInterface.h) are written. If no directory is specified by the user, it is preferred that the directory default to directory where the GUI is running.

The command-line version of the autoConfig utility is preferably built and used on a Sun Unix workstation. This command line version operates to convert a configuration file into the three VCU files (vcuConfig.cpp, vcuConfig.h, and vcuInterface.h).

FIG. 30 depicts an exemplary simple configuration file. The configuration file 380 is read as a keyword 382 followed by a set of parameters 384. The expected number of entries depends on the keyword. In FIG. 30, each line begins with a keyword 382 followed by one or more parameters 384. FIGS. 31(*a*) and (*b*) are tables listing and describing the preferred keywords. Comments can be included in the configuration file so long as they do not contain a keyword found in FIGS. 31(*a*) and (*b*).

In FIG. 30, and with reference to FIGS. 31(*a*) and (*b*), the "Chan" keyword keys the channel's specification of data type, channel name, and channel configuration. The first parameter specifies the data type: a class. The channel will be size to the data of the class specified. If this second parameter is "struct" or "class", the third parameter specifies the data type, with the "struct" or "class" parameter becoming a modifier. The "class" modifier is ignored as the data type is expected to be a class. The "struct" modifier, however, is included and becomes part of the data type in the generated files. If the second parameter is "untyped", then the third parameter specifies the size, in bytes, of the channel. In FIG. 30, it can be seen that the data type for channel 1 ("chan 1") is "buttonPress", the data type for "chan 3" is the "NavData" with the modifier "struct", and channels 4-6 have channel sizes of 1024 bytes, 32 bytes, and 8 bytes respectively.

The next parameter for the "Chan" keyword specifies a macro for the channel name. For "chan 1", the channel name is BUTTON_PRESS_CHANNEL. For "Chan 5", the channel name is SMALL_RAW_DATA_CHANNEL.

The final parameter for the "Chan" keyword specifies the configuration type of the channel. For example, the configuration type for "Chan 6" is "queue on send", the configuration type for "Chan 2" is "copy on send", and the configuration type for "Chan 5" is "push to pool on receive".

The "Include" keyword keys the specification of an include file, for declaring a data type used in the VCU system. Each file so specified causes a "#include" line to be added to the vcuInterface.h file (see discussion above with respect to FIG. 25).

The "Hndlr" keyword keys the specification of a C or C++ file that is expected to contain a routine that is called when data arrives. Each file so specified causes a "#include" line to be added to the vcuConfig.cpp file, so that it will be compiled as part of the core VCU code. Paths can be included at compile time as described for the "Include" keyword.

Additional Features:

It is preferred that two BSP modifications be made for the VCU utility: (1) resizing the VME bus slave window (relative to the default settings in the board's BSP) and (2) relocating the VME bus slave window (relative to the default settings in the board's BSP). The kernel (that is, the operating system built from the BSP and running on the board's embedded hardware) should support VME DMA. If INCLUDE_VME_DMA is not defined, the line #define INCLUDE_VME_DMA should be added to the config.h file.

Preferably the VME bus slave window is resized so that the VCU can work across 8 boards instead of just 4 (which is the default setting of the VCU). As noted above, through the user interface, the system can be configured to work with full-size slave windows.

Figure 32:
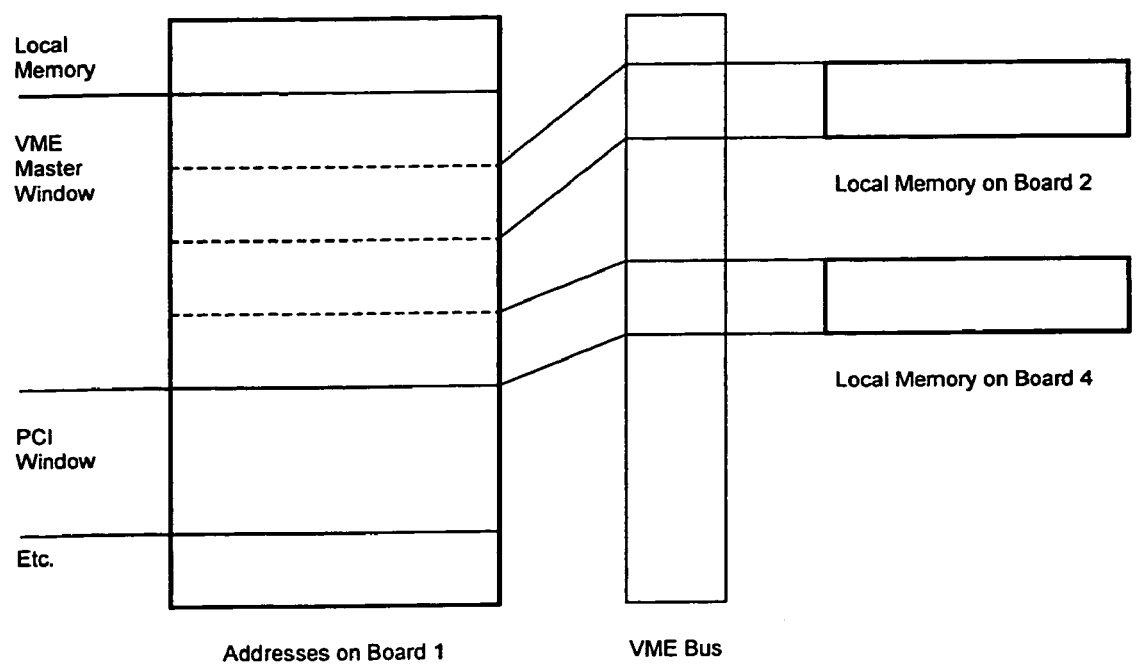
FIG. 32 illustrates the ability of boards to view the memory of other boards in the system.

By default, Dy4 boards have a VME master window that is 4 times the size of its VME slave window. This means that each board can see into the memory space of up to 4 boards (itself and three other boards), as shown in FIG. 32. Reducing the size of the slave windows (shown in FIG. 32 by dashed lines) by half allows each board to see into the memory space of 8 boards. With a BSP modification, therefore, an 8 board system can be built.

To resize the slave window, a developer can edit the config.h file in the kernel by changing the line that defines the VME-A32_SLV_SIZE, such that:
    #define VME_A32_SLV_SIZE (0x08000000) becomes:
    #define VME_A32_SLV_SIZE (0x04000000)

From a compiler that generates the code that runs on the boards (such as a Tornado compiler for WindRiver's VxWorks operating system), a person can make this modification using the project configuration tools.

As for relocating the VME bus slave window, to tie each board to a memory space, and allow boards to be removed or rearranged without disrupting the entire system, the BSP can be configured such that the processor number specifies the location of each board's slave window in the VME bus memory space. The processor number is set in the boot parameters of each board, which are accessible to configure how the embedded board boots up. Setting the VME slave window based on processor number requires modifications to the config.h and sysLib.c files in the BSP.

In the config.h file, the Dy4 AutoID must be overridden as follows:
    #define OVERIDE_DY4_AUTOID Also, USER_VME_A32_BASE and USER_VME_A24_BASE should be defined to be the same as the Dy4 AutoID used, with the exception that the value should be based on processor number rather than chassis slot.
    #define        USER_VME_A32_BASE
        (VME_A32_MSTR_BUS+\
        (VME_A32_SLV_SIZE*sysProcNumGet( )))
    #define USER_VME_A24_BASE (0)

In the sysLib.c, the system processor number should be set before the VME windows are defined. In the routine sysHwInit( ), the following lines should be added within the existing OVERIDE_DY4_AUTOID ifdefs, before USER_VME_A32_BASE or USER_VME_A24_BASE are used:
    UsrBootLineCrack(BOOT_LINE_ADRS, &params);
    If(_procNumWasSet!=TRUE)
    {
        sysProcNumSet(params.procNum);
        _procNumWasSet=TRUE;
    }

The variable "params" should be defined earlier in the sysHwInit( ) routine, where all of the variables are declared (if implemented as a C file, the variable declarations must precede any other operations).
    #ifdef OVERIDE_DY4_AUTOID
        BOOT_PARAMS params;
    #endif To remove the implicit declaration warning, the following declaration can be added anywhere before the sysHwInit( ) definition:
    #ifdef OVERIDE_DY4_AUTOID
        extern STATUS usrBootLineCrack(char * bootString,
            BOOT_PARAMS *pParams);
    #endif By defining OVERIDE_DY4_AUTOID, warnings are caused by unused variables. To remove these warnings, one can add the line:
    #ifndef OVERIDE_DY4_AUTOID before the declarations:
    LOCAL UINT vmeA32Size;
    LOCAL UINT vmeA24Size;

with an #endif added afterward.

Also, with older versions of the DY4 179 BSP, the file src/drv/vme/universe.c file does not allow an argument to be passed to the mailbox interrupts 1, 2, and 3. To allow an argument to passed to the registered ISR when the mailbox interrupt is triggered, the following three lines should be removed from the src/drv/vme/universe.c file:
    arg=sysMailbox1;
    arg=sysMailbox2;
    arg=sysMailbox3;

The preferred system of the present disclosure also preferably allows for multicasting in certain situations. Multicast is an efficient method of sending a message to multiple boards. With the VCU, multicast saves some processing time despite the bulk of the processing time coming when the data is moved across the VME bus, and when each board makes its own copy. The VCU multicast also makes it easier for a programmer to indicate multiple boards as well as saves memory space.

With multicast, the data is copies to the local memory pool of the sending board. The number of boards used in multicast is calculated. The sending board triggers interrupts on all of the receiving boards, and notes how many responses it expects to receive. Every time it receives a response, the sending board decrements this expected number. When all calls are received, the memory is released. Thus, each multicast message that is sent to N boards takes only 1 transfer pool slot, instead of N slots.

Written in pseudo-code, a multicast appears as:
    VcuSend(VCU_DEST_1|VCU_DEST_2, . . . )

wherein any number of destinations can be OR'ed together for a multicast so long as the sending board's number is not included. A multicast from a sending board that includes itself in the destination list will result in an error. Also, multicast is preferably not allowed with the "push . . . " configurations because the vcuRecv( ) calls are difficult to synchronize.

The priority of a message is set by a flag in the vcu Send( ) call. Priority options are "normal" and "urgent", wherein an urgent message is placed in the front of the queue of messages being sent, and, on the receive side, is placed in the front of the queue of the messages being received. Normal messages operate on a FIFO principle.

Where feasible and applicable, it is preferred that the VCU return error messages. In other cases, and in the case of internal errors, it is preferred that the error values be recorded in a VCU error storage class and error messages be printed.

The storage class preferably stores all errors in a queue. Access to the front of the queue proceeds through the API call vcuErrno( ). The routine vcuClearErrno( ) removes the errno at the front of the queue and returns it. The routine vcuLastErrno( ) returns the most recent errno, but does not clear it from the queue. The value in vcuErrno( ) can be read from other boards in the VCU system by a vcuRequestErrno( ) call, which takes the destination ID of the board as an argument. If vcuRequestErrno( ) is called as a multicast, the return value is zero for no errors and VCU_ERROR_NO_CODE if any board reports an error. The vcuRequest Errno( ) routine does require some VCU communication to be working in order to report errors from other boards. If the storage class fills up, subsequent error messages are lost. It is preferred to make the storage class have a size sufficient for 10 messages, however, it is even more preferred to make the storage class have a size that is user-configurable. FIGS. 33(a) and (b) list and describe the preferred error messages of the present disclosure, which are either return values from application calls to the VCU API routines or are error codes recorded inside the VcuSocket object. The values are all preferably defined in vcuDefines.h.

Figure 36:
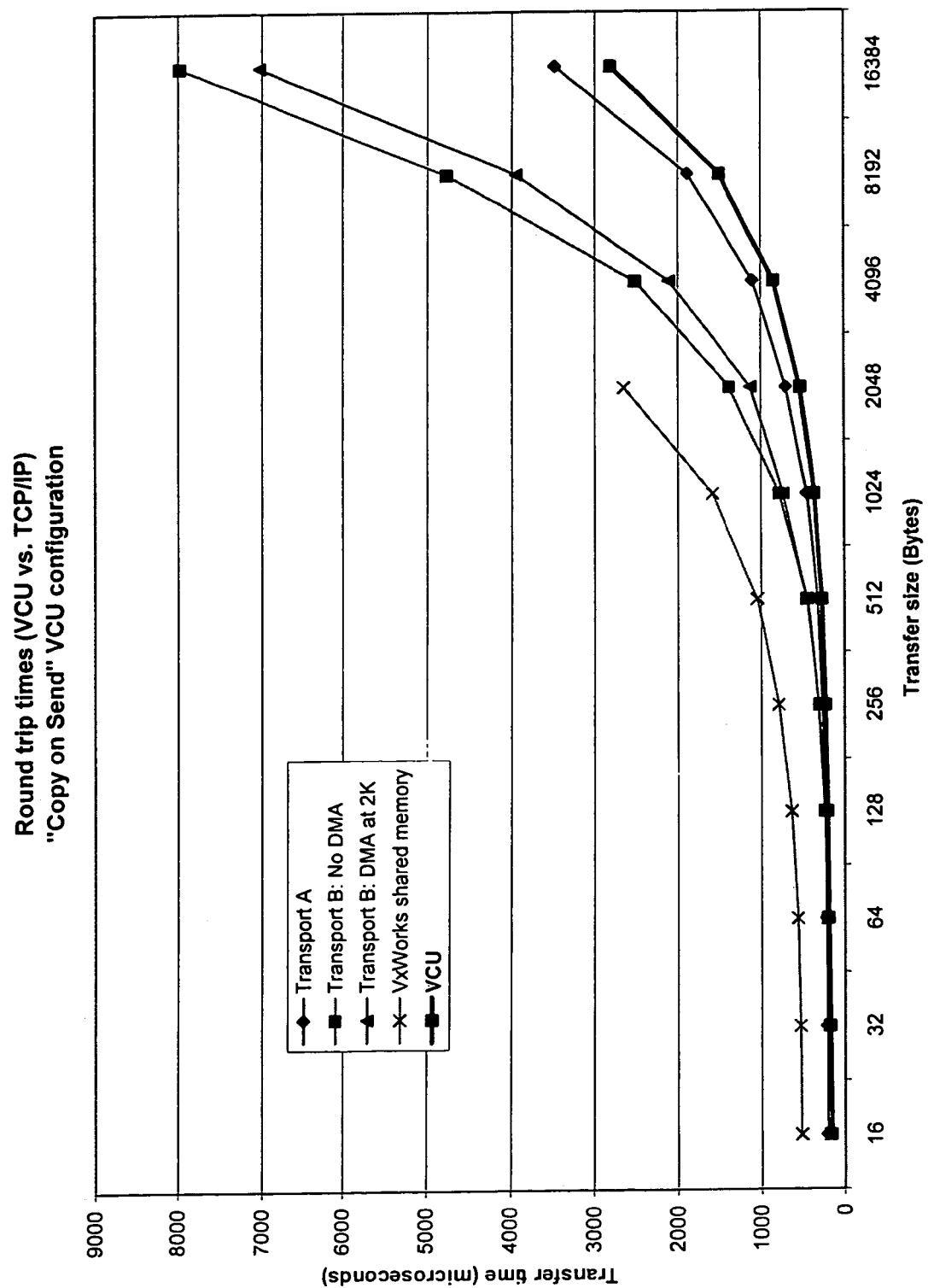
FIGS. 36-47 are comparative data charts indicating the performance of various configurations of the embodiment of the present disclosure relative to other communication utilities.
Figure 37:
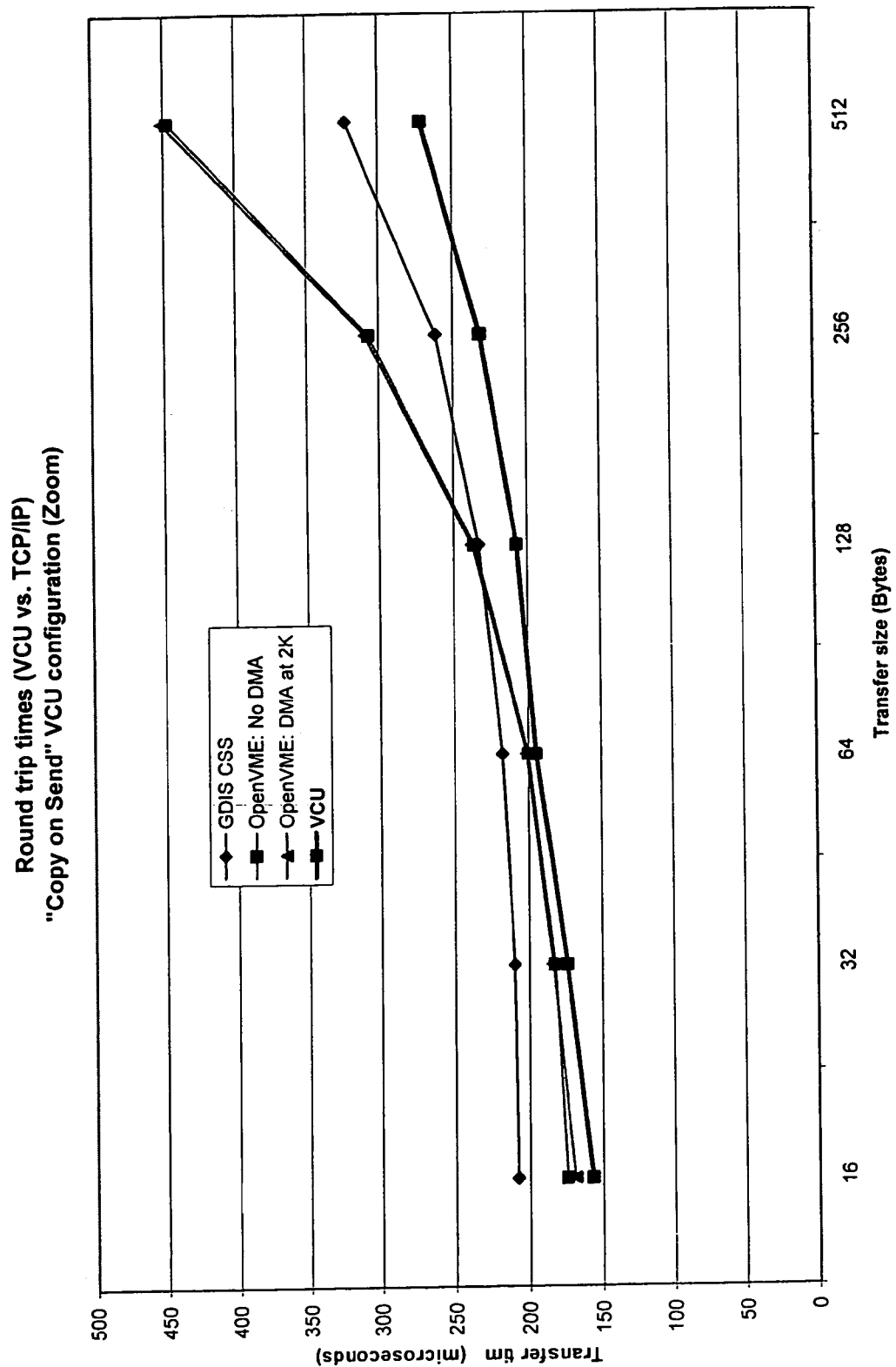
Figure 38:
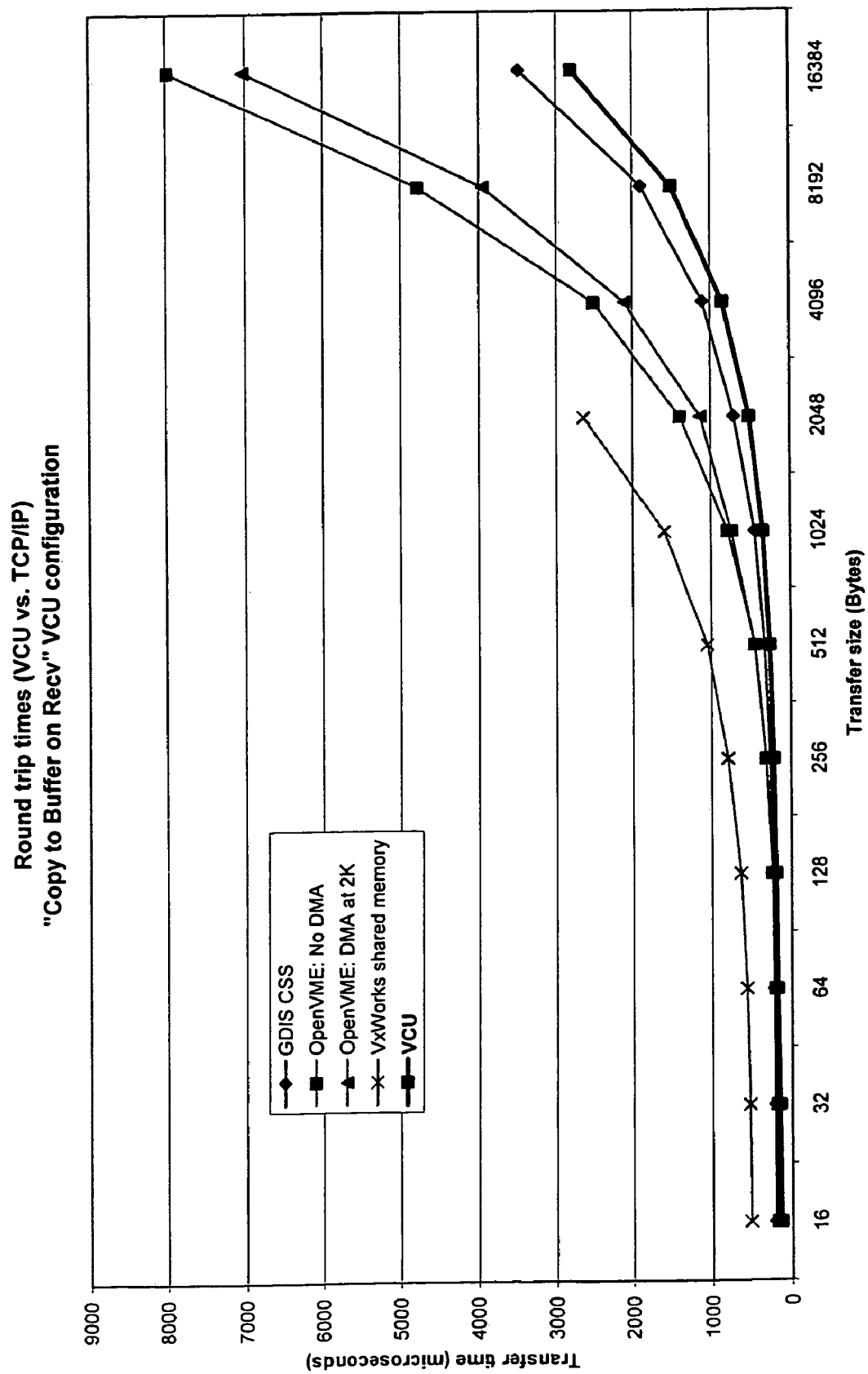
Figure 39:
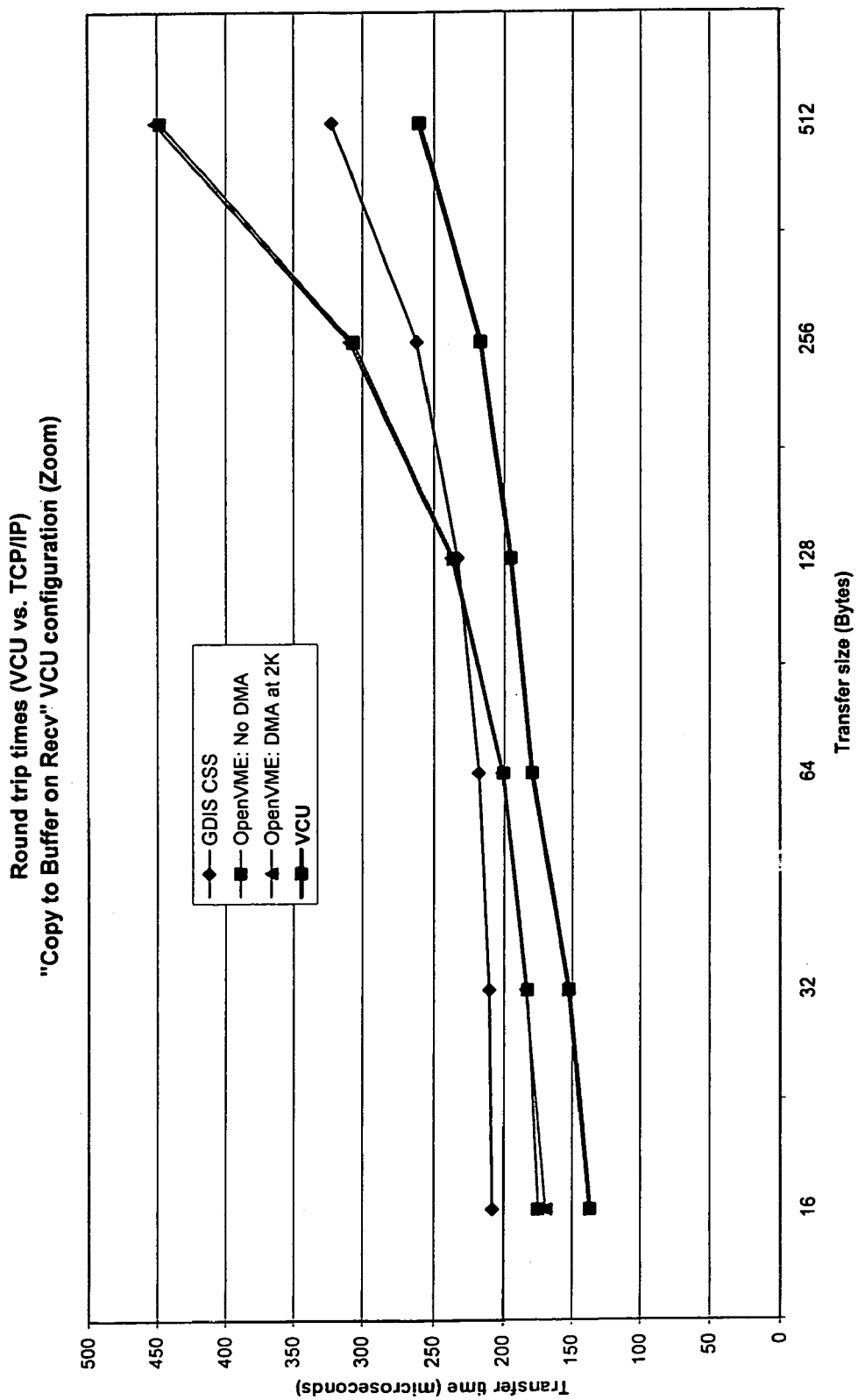
Figure 40:
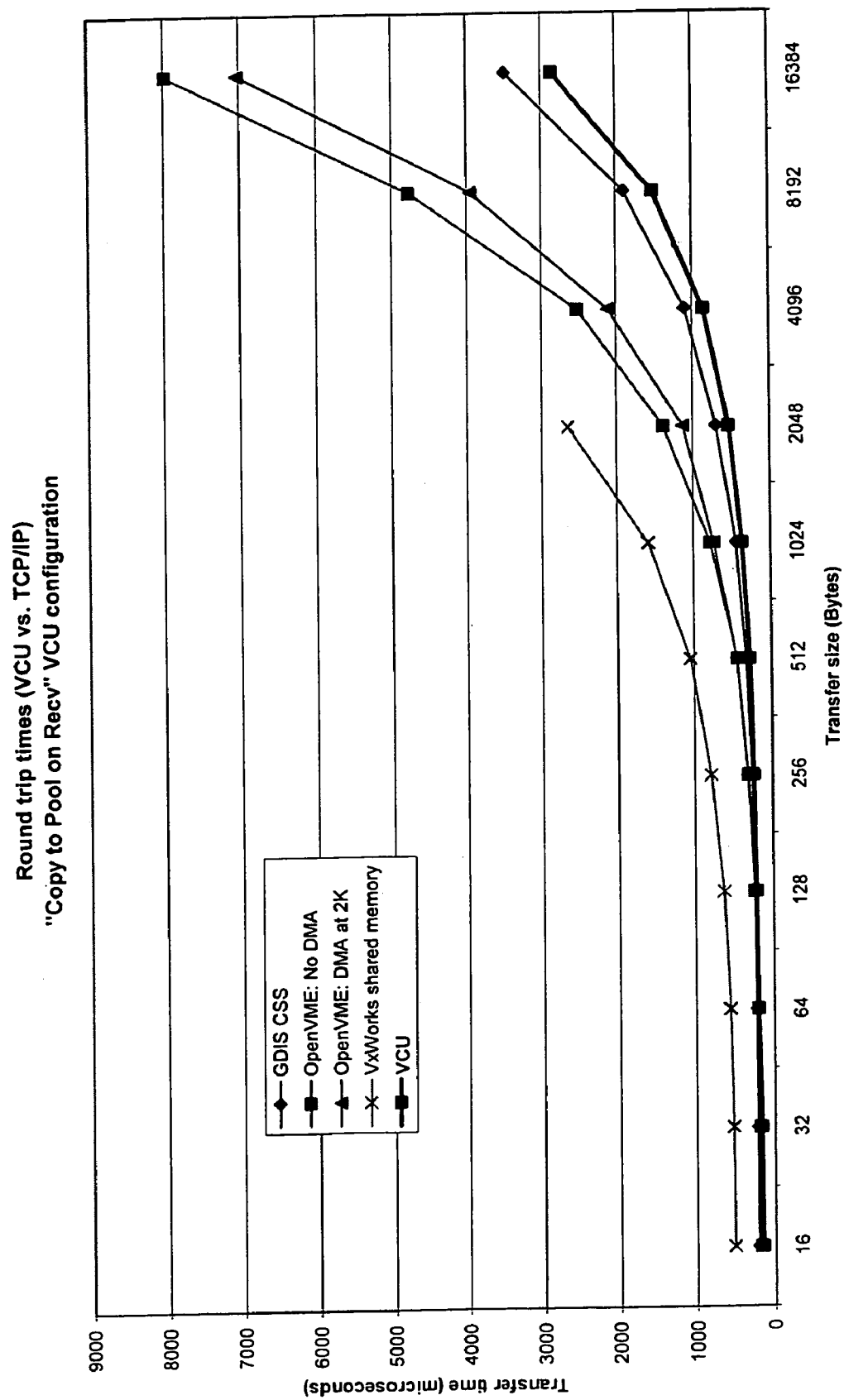
Figure 41:
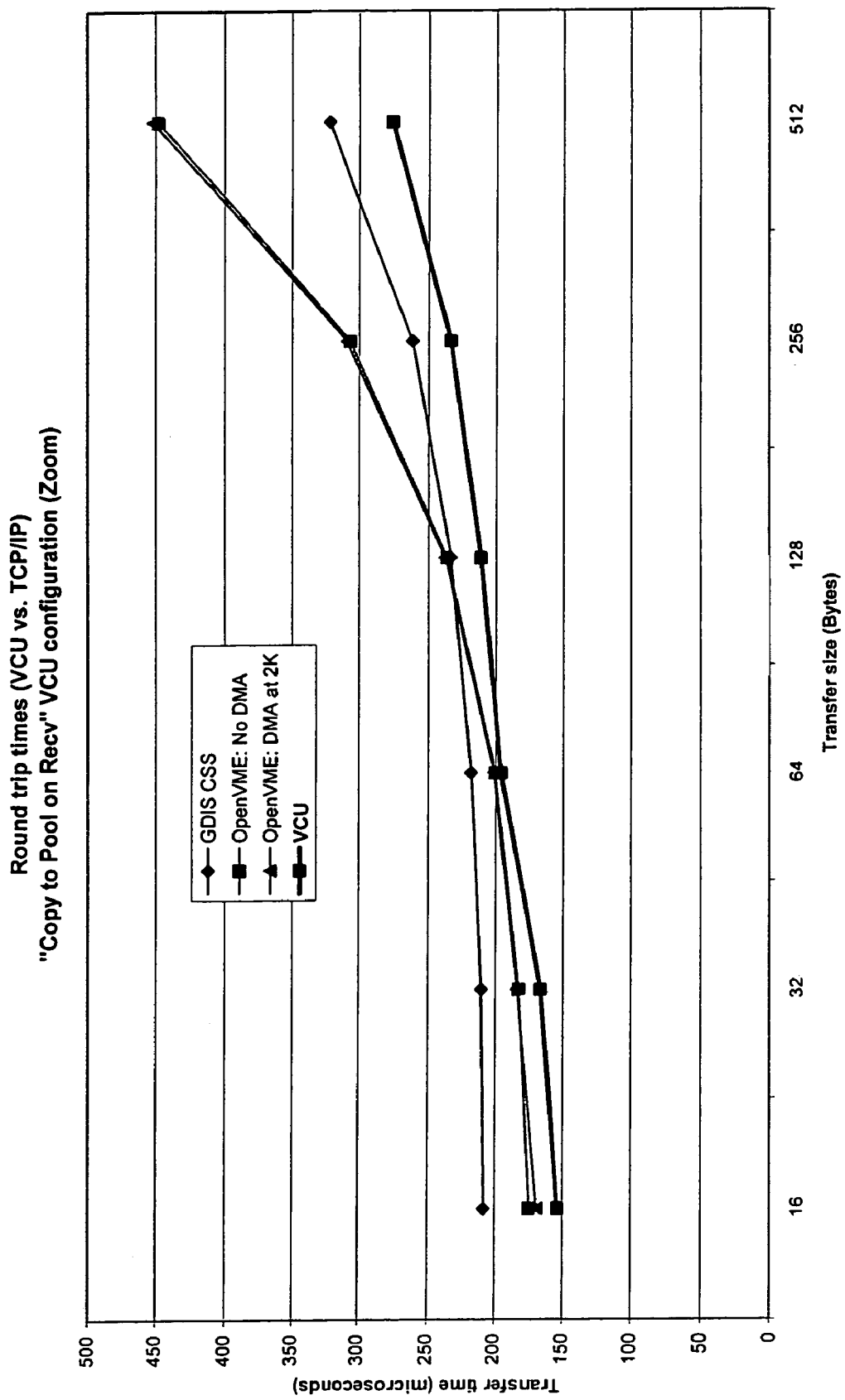
Figure 42:
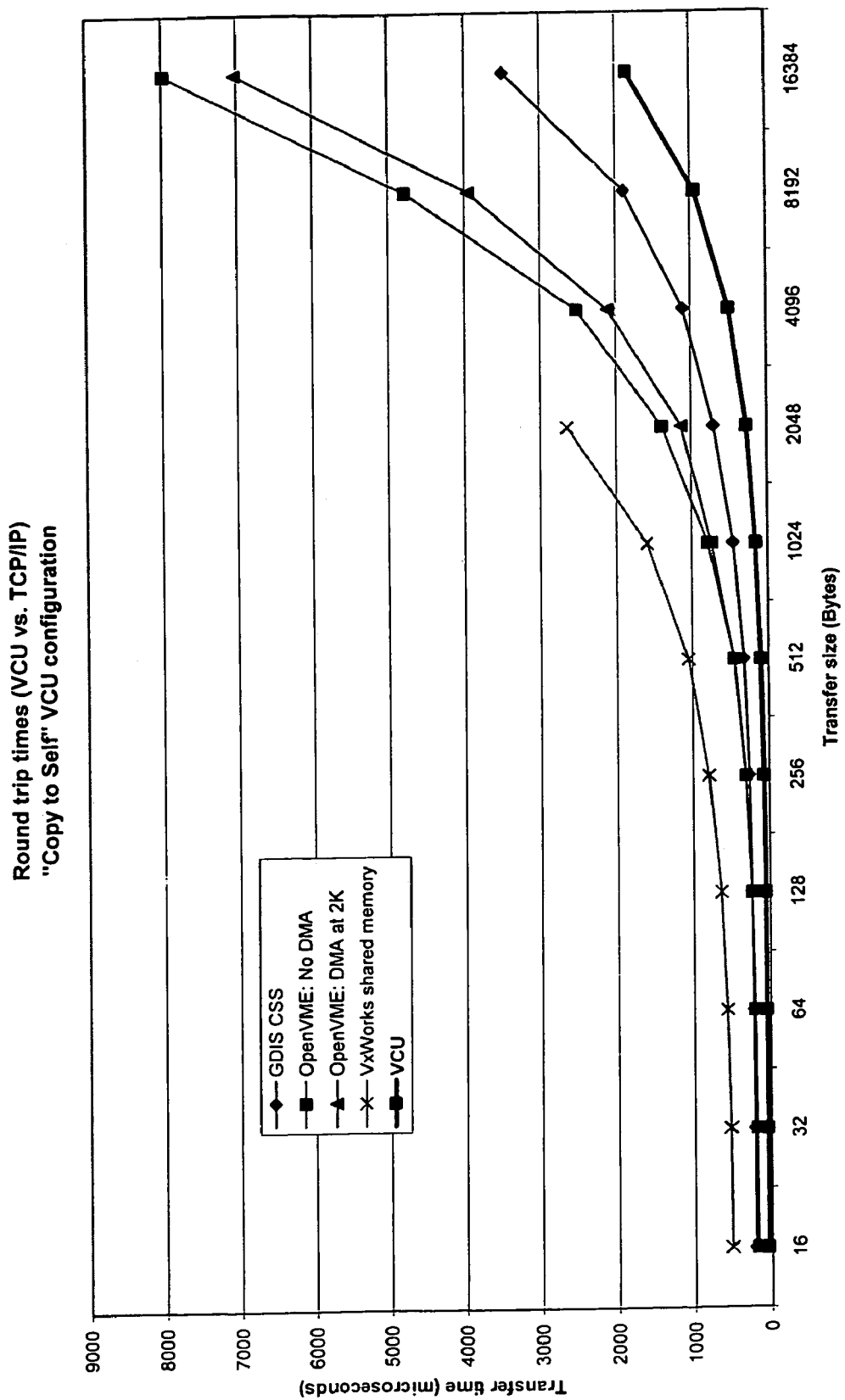
Figure 43:
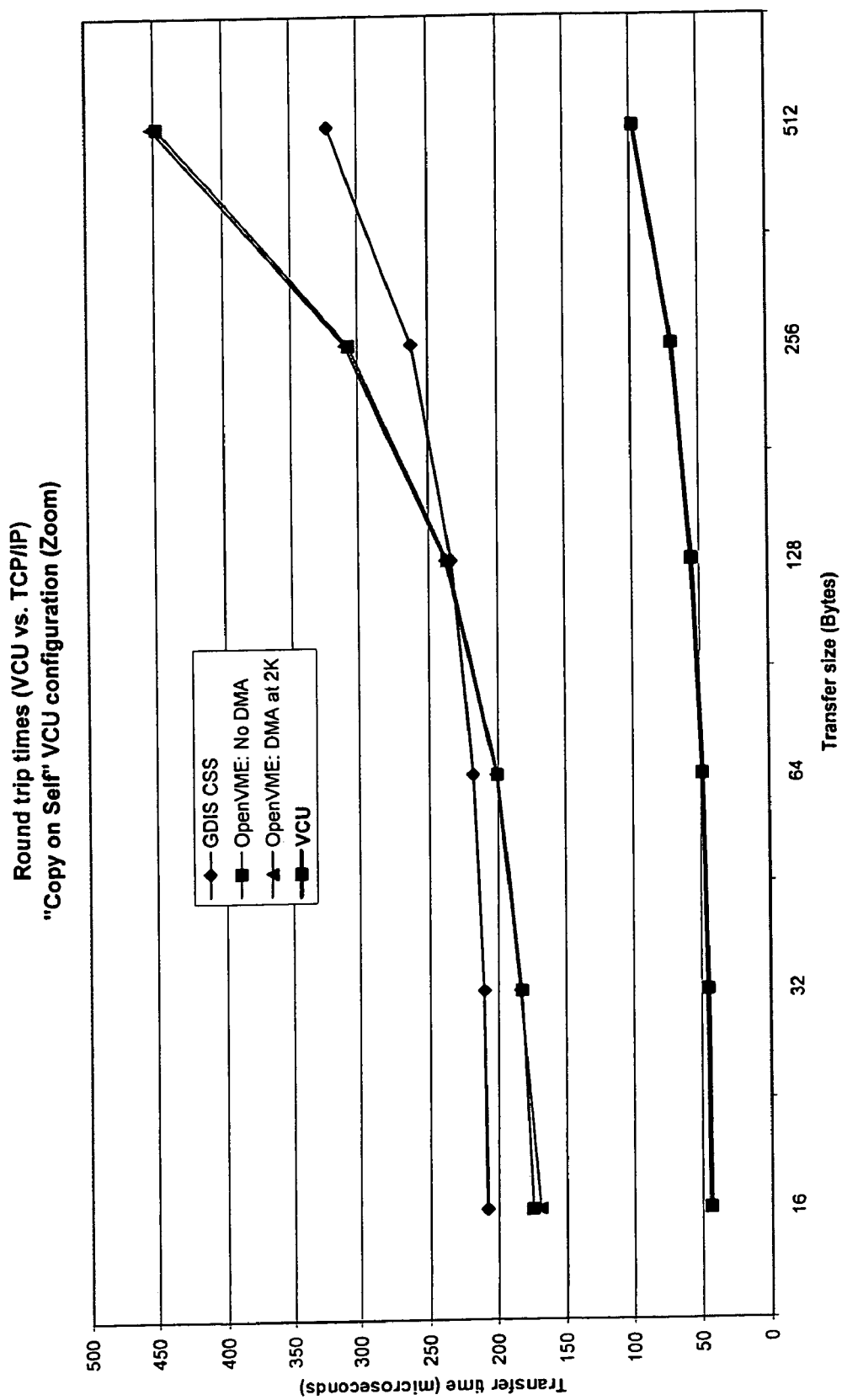
Figure 44:
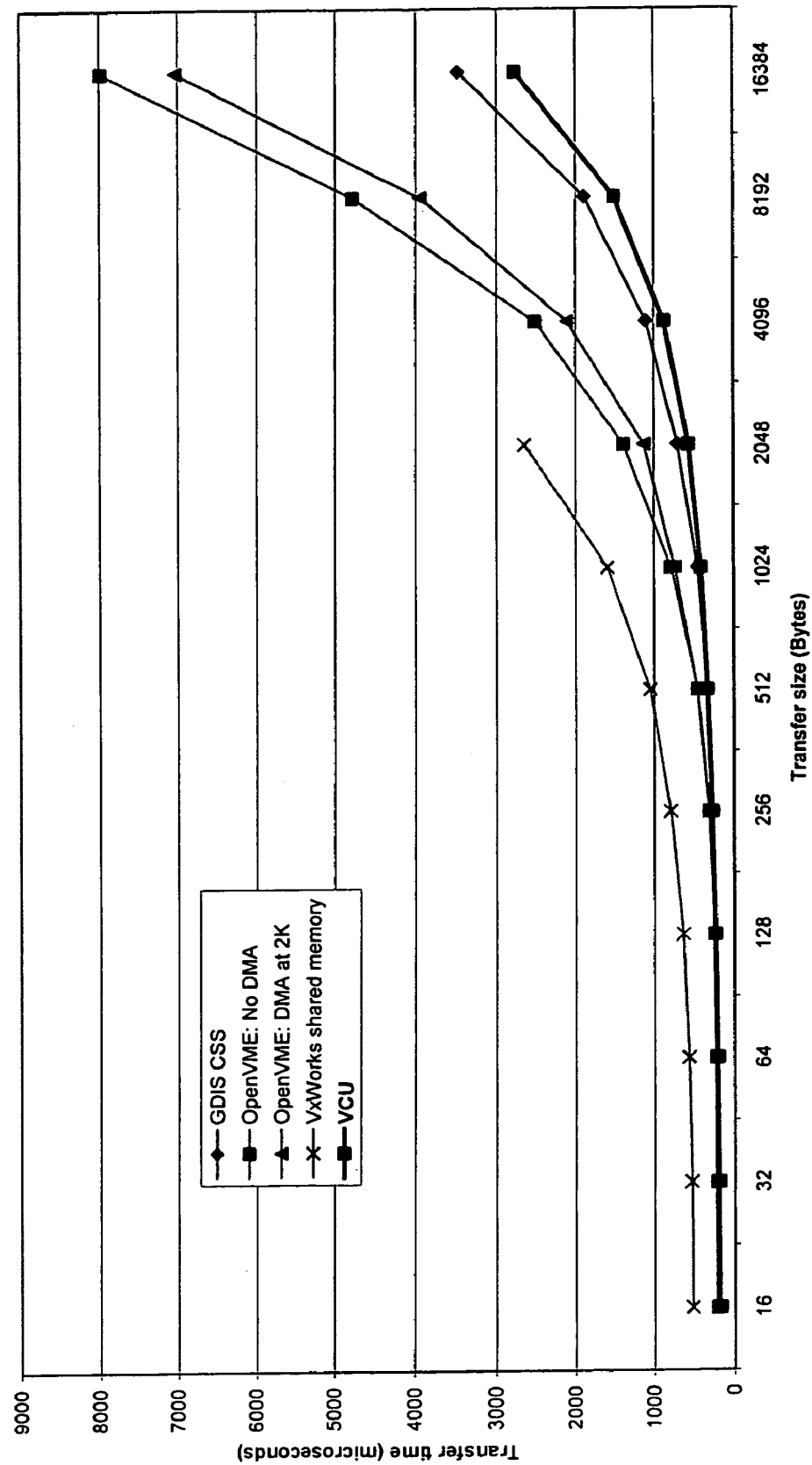
Figure 45:
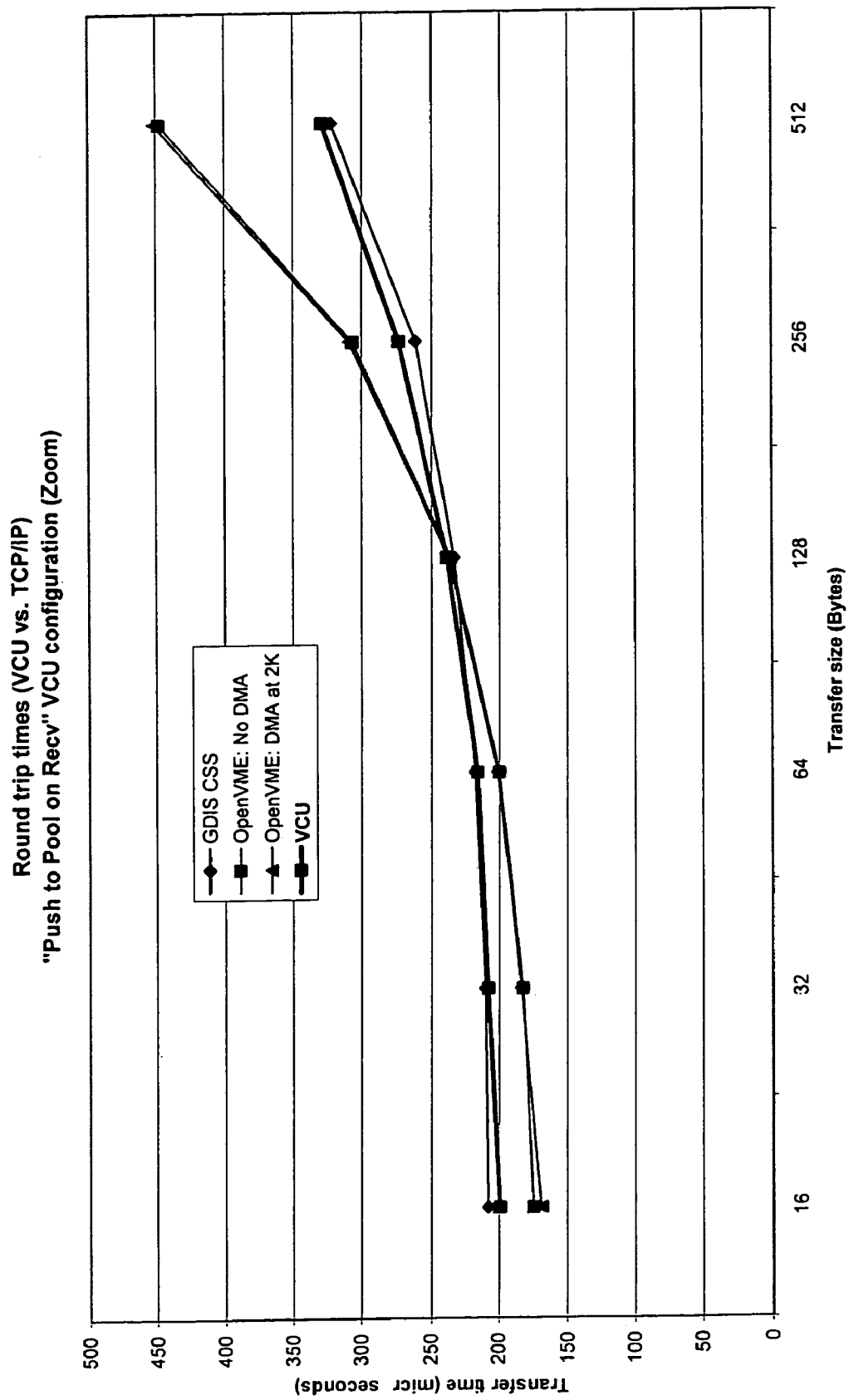
Figure 46:
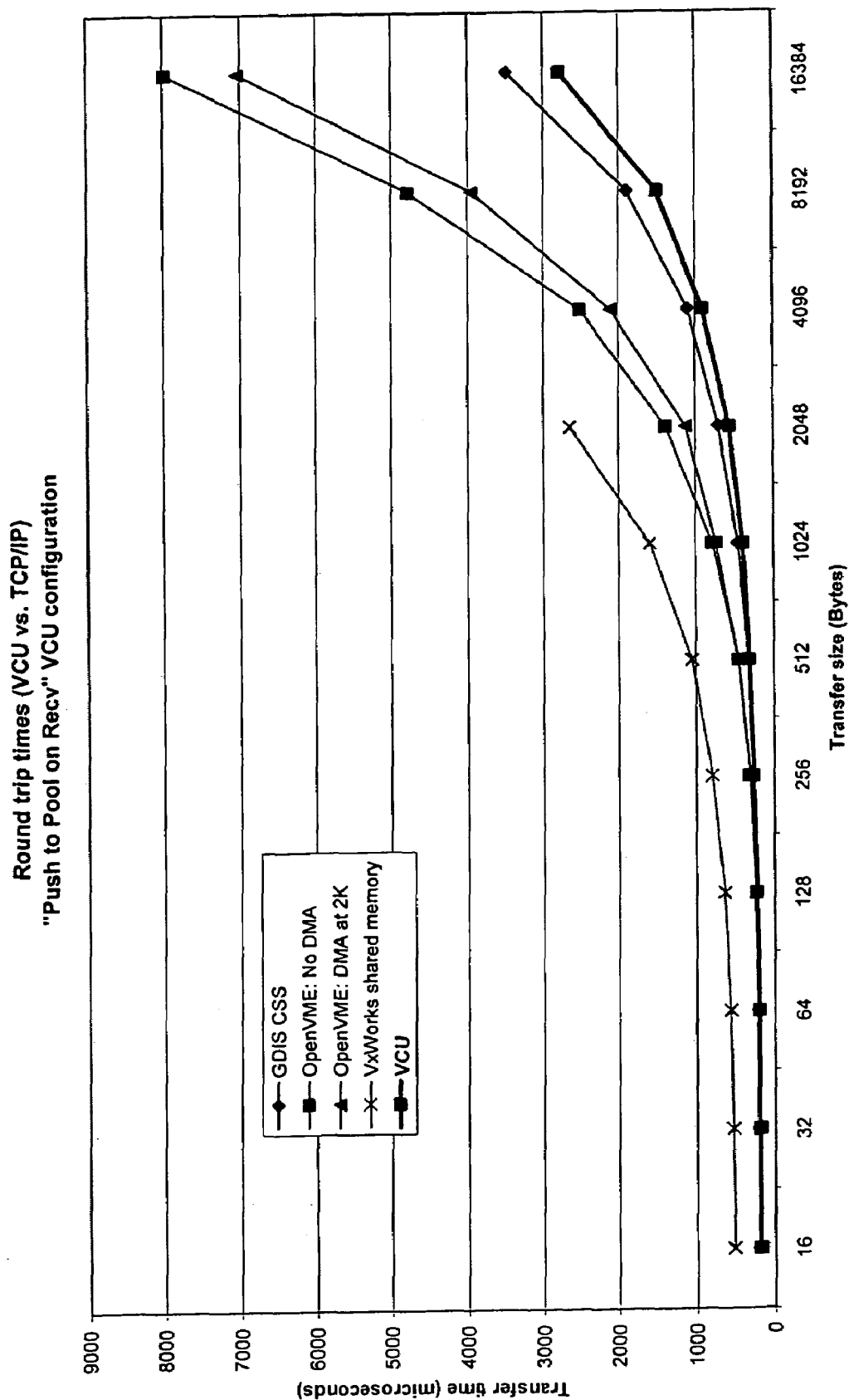
Figure 47:
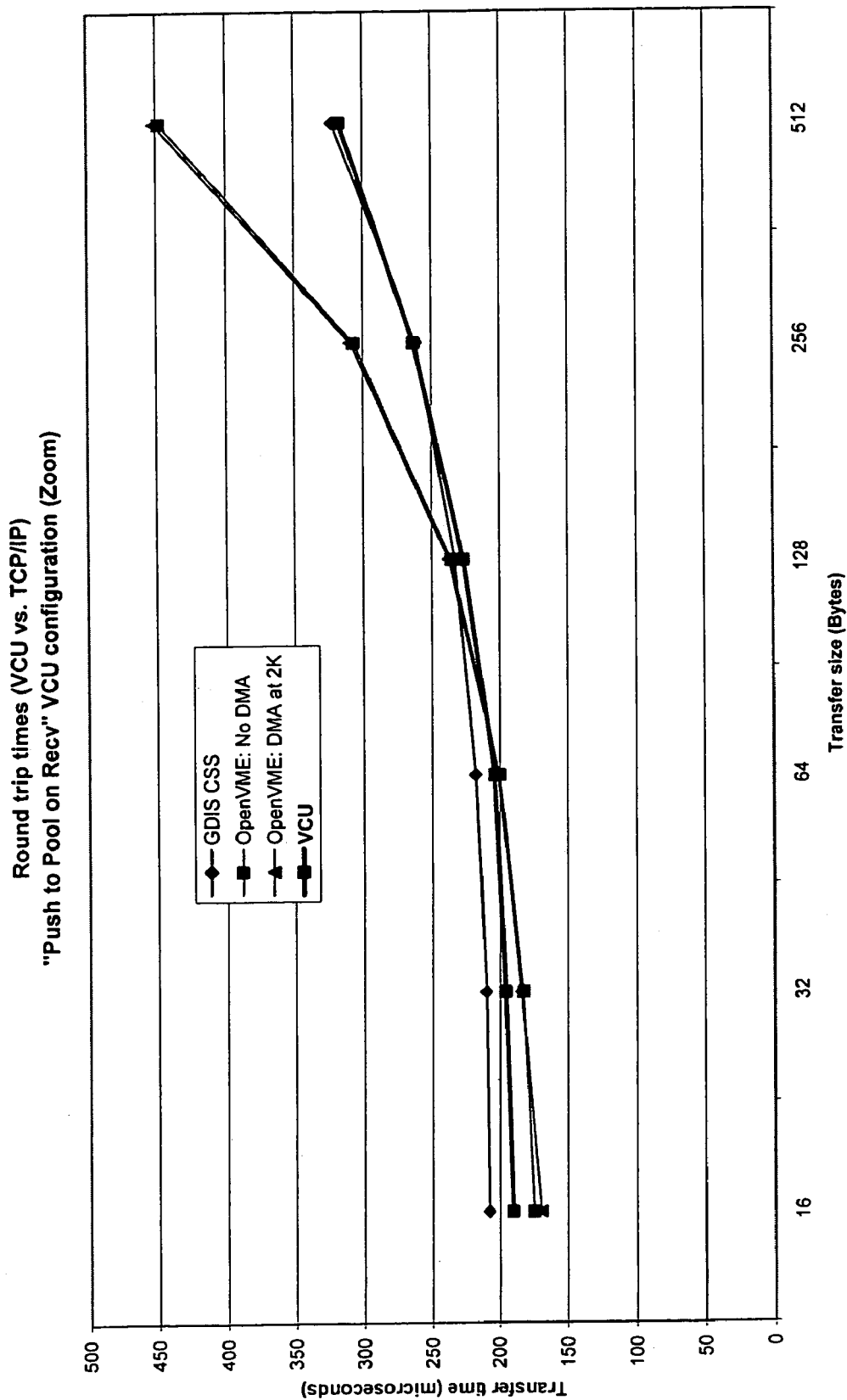

Thus, the present disclosure represents a highly efficient communication utility for managing communications over a bus between a plurality of data processing boards. Testing has indicated that the present disclosure's efficient user-definable configurations lead to greatly improved performance relative to other known communication utilities. FIGS. 36-47 are exemplary of the results of such testing. FIG. 36 illustrates transfer time (in microseconds) versus transfer size (in bytes) as measured for the present disclosure under the "copy on send" configuration and other communication utilities using the TCP/IP protocol to communicate over the shared bus. As can be seen, the present disclosure performs significantly better than the other techniques, particularly for larger transfer sizes. FIG. 37 is a zoomed-in view of the smaller end of the transfer size axis for the chart of FIG. 36. As can be seen, the present disclosure also outperforms the other techniques for smaller transfer sizes. FIGS. 38-47 illustrate similar phenomena, relative to current communication techniques, for the present disclosure under other configuration types such as "copy to buffer on receive", "copy to pool on receive", "copy to self", "push to buffer on receive", and "push to pool on receive".

While the present disclosure has been described above in relation to its embodiment, various modifications may be made thereto that still fall within the disclosure's scope, as would be recognized by those of ordinary skill in the art.

For example, additional configuration types can be added to the system such as a "queue to self" configuration type which is similar to the "copy to self" configuration type and differs therefrom as does "queue on send" from "copy on send". FIGS. 34 and 35, respectively, illustrate preferred sending and receiving sequences for a "queue to self" configuration type. The preferred settings for this configuration type would closely match those for the "copy to self" configuration. The queue to self configuration essentially combines the copy to self and queue on send configurations for sending small messages within a single board.

Further, various routines can be added to the system, and the user-definability of various system parameters can be added or removed as desired by a practitioner of the disclosure. Routines that can be added include a routine to clear all memory pools on the board (as a way of resetting the VCU), routines to create, destroy, send, and wait for multi-board events including possibly semaphores, a VcuLookup( ) to convert error numbers into descriptions, and a routine for printing of the CvcuDualBuffer class. Also, user-definability can be enhanced with the ability to define a maximum vcuEvent count to the configuration capabilities.

Such modifications to the disclosure will be recognizable upon review of the teachings herein. As such, the full scope of the present disclosure is to be defined solely by the appended claims and their legal equivalents.

What is claimed is:

1. A data processing apparatus comprising:
   a first data processing board;
   a second data processing board;
   a bus connecting the boards with each other;
   each board comprising a communication utility for communicating data over the bus to the other board, the communication utility communicates data according to a redefinable configuration such that a bus utilization percentage in a range from 13% to 25% is achieved for 8 Kbyte data transfers across the bus, the communication utility being configured to communicate data through a plurality of channels; and
   the plurality of channels have a user-redefinable configuration with the configuration being user-redefinable with one of a plurality of available configuration types, with each channel's configuration type is one selected from the group consisting of (1) a copy on send configuration type, (2) a copy to pool on receive configuration type, (3) a copy to buffer on receive configuration type, (4) a push to pool on receive configuration type, (5) a push to buffer on receive configuration type, (6) a queue on send configuration type, (7) a copy to self configuration type, (8) a queue to self configuration type, and (9) an overwrite on send configuration type.

2. The apparatus of claim 1 wherein at least one channel's configuration has a user-redefinable maximum data transfer size.

3. The apparatus of claim 1 wherein at least one channel's configuration has a user-redefinable board memory allocation.

4. The apparatus of claim 1 wherein the communication utility is user redefinable with respect to the number of channels through which data is communicated.

5. The apparatus of claim 1 wherein the communication utility is user-redefinable with respect to the number of data processing boards within the apparatus.

6. The apparatus of claim 5 wherein the communication utility is user-redefinable to define a number of data processing boards for the apparatus that is larger than the number of data processing boards actually used by the apparatus.

7. The apparatus of claim 1 wherein the first data processing board, the second data processing board, and the bus are implemented in a helmet for a pilot.

8. The apparatus of claim 1 wherein the boards are VME boards, and wherein the bus is a VME bus.

9. The apparatus of claim 1 wherein each channel's configuration is separately user-redefinable.

10. A method of communicating data comprising:
    defining, according to user input, a redefinable communication channel configuration for communicating data over a bus between a first data processing board and a second data processing board by:
      defining, according to user input, a plurality of redefinable communication channel configurations for a plurality of communication channels; and
      selecting a configuration type for at least one channel, with selecting the configuration type further comprising selecting a communication channel's configuration type from the group consisting of (1) a copy on send configuration type, (2) a copy to pool on receive configuration type, (3) a copy to buffer on receive configuration type, (4) a push to pool on receive configuration type, (5) a push to buffer on receive configuration type, (6) a queue on send configuration type, (7) a copy to self configuration type, (8) a queue to self configuration type, and (9) an overwrite on send configuration type; and
    communicating data according to the defined communication channel configuration from one board to the other over the bus.

11. The method of claim 10 wherein the communicating step comprises communicating data from one board to the other over the bus according to the defined communication channel configurations.

12. The method of claim 10 wherein defining the communication channel comprises defining each communication channel's configuration separately.

13. The method of claim 12 wherein defining the communication channel further comprises allocating, according to user input, board memory for each of the communication channels.

14. The method of claim 12 wherein defining the communication channel further comprises defining a maximum data transfer size for at least one communication channel.

15. The method of claim 12 wherein defining the communication channel further comprises, for at least one communication channel, defining the conditions under which it uses DMA to transfer data over the bus.

16. The method of claim 12 wherein defining the communication channel further comprises defining the number of communication channels.

17. The method of claim 12 wherein defining the communication channel further comprises defining a data processing board capacity for the bus.

18. The method of claim 10 wherein communicating the data further comprises communicating the data from one board to the other over the bus with a bus utilization percentage in a range of 13% to 25% for 8 Kbytes data transfers across the bus.

19. The method of claim 18 wherein defining the communication channel further comprises defining, according to user input, a plurality of redefinable communication channel configurations for a plurality of communication channels, and wherein the communicating step comprises communicating data from one board to the other over the bus according to the defined communication channel configurations.

20. The method of claim 19 wherein defining the communication channel further comprises defining each communication channel's configuration separately.

21. The method of claim 10 wherein the boards are VME boards and wherein the bus is a VME bus.

22. A method of configuring a communication utility for transporting data from a first processor to a second processor over a bus, the method comprising:
 defining a configuration for a channel through which data is communicated over a bus by a communication utility interfacing the first processor with the second processor, the channel configuration redefinable by a user based on at least one user input, the user input including at least one of a configuration for the transfer of data over the bus with the configuration including a plurality of channels through which data is communicated by the communication utility;
 selecting a configuration type for each channel from a plurality of available configuration types with one of the available configuration types including a copy on send configuration type; and
 in accordance with the defined channel configurations, compiling software for controlling the communication utility.

23. The method of claim 22 wherein one of the available configuration types is a copy to pool on receive configuration type.

24. The method of claim 22 wherein one of the available configuration types is a copy to buffer on receive configuration type.

25. The method of claim 22 wherein one of the available configuration types is a push to pool on receive configuration type.

26. The method of claim 22 wherein one of the available configuration types is a push to buffer on receive configuration type.

27. The method of claim 22 wherein one of the available configuration types is a queue on send configuration type.

28. The method of claim 22 wherein one of the available configuration types is a copy to self configuration type.

29. The method of claim 22 wherein one of the available configuration types is an overwrite on send configuration type.

30. The method of claim 22 wherein one of the available configuration types is a queue to self configuration type.

31. The method of claim 22 wherein defining the configuration further comprises selecting a maximum data transfer size for a channel.

32. The method of claim 22 wherein defining the configuration further comprises allocating memory space to a channel.

33. The method of claim 32 wherein defining the configuration further comprises selecting at least one from the group consisting of (1) a receive queue size for a channel, (2) a receive pool size for a channel, (3) a transmit pool size for a channel, and (4) a push queue size for a channel.

34. The method of claim 22 wherein defining the communication channel further comprises defining the conditions under which a channel uses a DMA data transfer.

35. The method of claim 22 wherein defining the communication channel further includes defining the number of channels through which data is communicated.

36. The method of claim 22 wherein the first processor resides on a first VME board, wherein the second processor resides on a second VME board, and wherein the bus is a VME bus.

37. The method of claim 22 wherein defining the communication channel further comprises defining the channel configurations according to data entry by a user via a graphical user interface (GUI).

38. A device comprising:
 a user interface through which a user provides configuration data; and
 a processor configured to receive the configuration data from the user interface and generate a configuration file therefrom, the configuration file comprising configuration information for a plurality of channels over a bus that interconnects a plurality of data processing boards, the configuration information including at least one of (1) a copy on send configuration type, (2) a copy to pool on receive configuration type, (3) a copy to buffer on receive configuration type, (4) a push to pool on receive configuration type, (5) a push to buffer on receive configuration type, (6) a queue on send configuration type, (7) a copy to self configuration type, (8) a queue to self configuration type, and (9) an overwrite on send configuration type.

39. The device of claim 38 wherein the user interface is a graphical user interface (GUI).

40. The device of claim 39 wherein the GUI receives user input to allow the user to define the number of channels through which data is communicated over the bus.

41. The device of claim 39 wherein the GUI receives user input to allow the user to define a configuration type for each channel.

42. The device of claim 41 wherein the GUI is further configured to (1) display a list of available user-selectable configuration types for each channel, and (2) receive user input corresponding to a selection of a configuration type from the list for a channel.

43. The device of claim 39 wherein the GUI is configured to allow a user to define a maximum data transfer size for each channel.

44. The device of claim 39 wherein the GUI is configured to (1) display a memory allocation for each channel, and (2) receive a modification to a channel's memory allocation from the user.

45. The device of claim 39 wherein the GUI is configured to (1) display the conditions under which a channel is to use DMA during data transfers over the bus, and (2) receive a modification to the conditions under which a channel is to use DMA during data transfers over the bus.

46. The device of claim 39 wherein the GUI is configured to, in response to user input, generate software in accordance with generated configuration file, the software defining how data is communicated over the bus between the boards.

47. A device comprising:
  a user interface through which a user specifies a stored configuration file, the configuration file comprising configuration information for a plurality of channels over a bus that interconnects a plurality of data processing boards the configuration file including at least one of (1) a copy on send configuration type, (2) a copy to pool on receive configuration type, (3) a copy to buffer on receive configuration type, (4) a push to pool on receive configuration type, (5) a push to buffer on receive configuration type, (6) a queue on send configuration type, (7) a copy to self configuration type, (8) a queue to self configuration type, and (9) an overwrite on send configuration type; and
  a processor configured to retrieve the specified configuration file and generate software in accordance with the retrieved configuration file, the software for controlling data communications over the bus between the boards.

48. The device of claim 47 wherein the user interface is a UNIX command line interface.

49. A computer-readable medium having stored thereon instructions, said instructions comprising:
  a plurality of instructions that are executable by a computer for managing data communication over a bus between a first data processing board and a second data processing board, the one or more instructions defining how the boards communicate data therebetween over the bus through a plurality of communication channels, including at least one of (1) a copy on send configuration type, (2) a copy to pool on receive configuration type, (3) a copy to buffer on receive configuration type, (4) a push to pool on receive configuration type, (5) a push to buffer on receive configuration type, (6) a queue on send configuration type, (7) a copy to self configuration type, (8) a queue to self configuration type, and (9) an overwrite on send configuration type, and
  at least one of the communication channels possesses a redefinable configuration.

* * * * *